(12) United States Patent
Ehrlich-Quinn

(10) Patent No.: US 11,151,549 B2
(45) Date of Patent: Oct. 19, 2021

(54) CRYPTOGRAPHIC AND FIAT CURRENCY MECHANICS

(71) Applicant: KRNC Inc., Woodland Hills, CA (US)

(72) Inventor: Clinton Edward Ehrlich-Quinn, Claremont, CA (US)

( * ) Notice: Subject to any disclaimer, the term of this patent is extended or adjusted under 35 U.S.C. 154(b) by 47 days.

(21) Appl. No.: 16/261,478

(22) Filed: Jan. 29, 2019

(65) Prior Publication Data

US 2019/0236594 A1 Aug. 1, 2019

Related U.S. Application Data

(60) Provisional application No. 62/623,226, filed on Jan. 29, 2018, provisional application No. 62/689,587, filed on Jun. 25, 2018, provisional application No. 62/755,287, filed on Nov. 2, 2018.

(51) Int. Cl.
*G06Q 20/36* (2012.01)
*G06Q 20/40* (2012.01)

(52) U.S. Cl.
CPC ....... *G06Q 20/3678* (2013.01); *G06Q 20/401* (2013.01); *G06Q 2220/00* (2013.01)

(58) Field of Classification Search
CPC ................................................. G06Q 20/3678
See application file for complete search history.

(56) References Cited

U.S. PATENT DOCUMENTS

| | | | |
|---|---|---|---|
| 8,457,367 B1 | 6/2013 | Sipe et al. | |
| 9,449,346 B1 | 9/2016 | Hockey et al. | |
| 9,519,901 B1 * | 12/2016 | Dorogusker | G06Q 20/202 |
| 9,858,781 B1 * | 1/2018 | Campero | H04L 63/0428 |
| 10,163,079 B1 * | 12/2018 | Brock | G06Q 20/381 |
| 10,269,066 B2 * | 4/2019 | Jain | G06Q 40/025 |
| 10,438,290 B1 * | 10/2019 | Winklevoss | G06Q 20/223 |

(Continued)

FOREIGN PATENT DOCUMENTS

| | | | | |
|---|---|---|---|---|
| WO | WO2016/072933 | | 5/2016 | |
| WO | WO2017145017 | * | 2/2017 | ............. G06Q 20/38 |
| WO | 2017145017 A1 | | 8/2017 | |

OTHER PUBLICATIONS

"Understanding Modern Banking Ledgers through Blockchain Technologies"; Gareth W. PetersJ, Efstathios Panayi, Nov. 2015; '16261478_NPL_Understanding Modern Banking Ledgers through Blockchain Technologies.pdf (Year: 2015).*

"Cryptocurrencies, Network Effects, and Switching Costs"; William J. Luther; Sep. 2013 (Year: 2013).*

Luther, William J., "Cryptocurrencies, Network Effects, and Switching Costs" (Sep. 2013). Mercatus Center Working Paper No. 13-17, pp. 1-37.

(Continued)

*Primary Examiner* — Patrick McAtee
*Assistant Examiner* — Jason B Fenstermacher
(74) *Attorney, Agent, or Firm* — Redbrick IP, P.C.

(57) ABSTRACT

A system and method for bootstrapping a cryptographic ledger based on stake in a fiat currency. Stake can be verified using proof of cash systems involving anti-spoofing, anti-counterfeiting, and remote verification and transaction functionality. Stake can further or otherwise be verified using proof of balance systems involving verification of one or more balances using a service of a financial institution or data provider. These systems, together or separately, can be utilized to implement a cryptographic currency and application platform enabling financial transaction and general computing capabilities, in accordance with various embodiments of the invention.

24 Claims, 49 Drawing Sheets

(56) References Cited

U.S. PATENT DOCUMENTS

| | | | | |
|---|---|---|---|---|
| 2008/0140547 | A1* | 6/2008 | Murphy | G06Q 40/12 |
| | | | | 705/30 |
| 2013/0021009 | A1 | 1/2013 | Kapoor et al. | |
| 2013/0054434 | A2* | 2/2013 | Shenkar | G06Q 40/00 |
| | | | | 705/35 |
| 2015/0170112 | A1* | 6/2015 | DeCastro | G06Q 20/381 |
| | | | | 705/39 |
| 2015/0271183 | A1* | 9/2015 | MacGregor | H04L 63/102 |
| | | | | 726/4 |
| 2016/0012424 | A1* | 1/2016 | Simon | G06Q 20/3674 |
| | | | | 705/67 |
| 2017/0046673 | A1* | 2/2017 | Shibata | G06Q 20/18 |
| 2017/0046806 | A1* | 2/2017 | Haldenby | G06Q 20/102 |
| 2017/0124542 | A1 | 5/2017 | Sharan | |
| 2017/0287072 | A1* | 10/2017 | Crosthwaite | G06Q 40/06 |
| 2017/0317997 | A1* | 11/2017 | Smith | H04L 9/0891 |
| 2017/0338967 | A1* | 11/2017 | Lewison | H04L 9/0643 |
| 2018/0101448 | A1* | 4/2018 | Ventura | G06F 11/1458 |
| 2018/0197172 | A1* | 7/2018 | Coburn | A63F 13/792 |
| 2018/0225639 | A1* | 8/2018 | Rosamilia | G06Q 20/3678 |
| 2018/0285983 | A1* | 10/2018 | Franaszek | G06Q 40/12 |
| 2019/0043043 | A1* | 2/2019 | Saraniecki | H04L 9/3239 |
| 2019/0158674 | A1* | 5/2019 | Nelson | H04L 63/123 |

OTHER PUBLICATIONS

Bank of International Settlements, "Cryptocurrencies: looking beyond the hype", Bis Annual Economic Report 2018, pp. 91-114.

Moser, Malte et al., «Bitcoin Covenants», Department of Information Systems, Financial Cryptography Workshops 2016, pp. 1-16.

Ji, Qian & Qian, Dongping & Zhang, Mengjie. (2007). "A Digit Recognition System for Paper Currency Identification Based on Virtual Instruments", 2nd International Conference on Information and Automation, ICIA 2006. 228-233.

Al-Gawda, Mohammed & Beiji, Zou & Nurudeen, Mohammed (2016). "Yemeni Mobile Counterfeit Detection System Using Support Vector Machines, Fuzzy Logic and Image Processing Techniques.", Journal of Computational and Theoretical Nanoscience. 13. 2965-2977. 10.1166/jctn.2016.4945.

Narayana R. Kocherlakota, (1996). "Money is memory," Staff Report 218, Federal Reserve Bank of Minneapolis. <https://ideas.repec.org/p/fip/fedmsr/218.html>.

International Search Report and Written Opinion received in PCT/US19/15732, dated Apr. 10, 2019 (9 pages).

Peters et al. "Understanding modern banking ledgers through blockchain technologies: Future A of transaction and smart contracts on the internet of money." In: Banking beyond 1-63 banks and money. Nov. 18, 2015 (Nov. 18, 2015), pp. 1-33.

* cited by examiner

Figure A: Before Scratching

Figure B: After Scratching

CRYPTOGRAPHIC AND FIAT CURRENCY MECHANICS

CROSS-REFERENCE TO RELATED APPLICATIONS

This application claims priority from U.S. Provisional Patent Application Ser. No. 62/623,226, entitled "Banknote Digitization", filed on Jan. 29, 2018, U.S. Provisional Patent Application Ser. No. 62/689,587, entitled "Proof-of-Cash Network", filed on Jun. 25, 2018, and U.S. Provisional Patent Application Ser. No. 62/755,287, entitled "Proof-of-Balance Network", filed on Nov. 2, 2018. U.S. Provisional Patent Application Ser. No. 62/623,226, U.S. Provisional Patent Application Ser. No. 62/689,587, and U.S. Provisional Patent Application Ser. No. 62/755,287 are incorporated by reference herein, in their entirety, and for all purposes.

BACKGROUND

It is possible to "fork" a circulating cryptographic currency by providing a new cryptographic currency to its owners in proportion to their holdings of the original currency at the time of the fork. This allows the utility of the information contained within a currency's distribution (i.e., how much of it is held by whom) to be disaggregated from the original representation of the information. A competing or alternate embodiment of the same information can be created and offered to holders of the original.

Currency forks have become a common occurrence since the introduction of blockchain-based cryptocurrencies. The information about how cryptocurrencies are distributed is already encoded digitally on a blockchain, so it can be copied and incorporated into a new cryptocurrency through a "hard fork." If the new version offers some advantage, it can compete against its parent. The greater the market capitalization of the parent currency, the more value can potentially be captured through a fork. The creators of forks therefore target the most popular currencies.

Existing technology only allows a currency to be forked when its distribution is already encoded in a blockchain. The creators of the fork capture a digital "snapshot" of the original blockchain at a designated block number, on which ownership of the cryptocurrency is specified by cryptographic key pairs, and they then create a new ledger where those key pairs unlock identical amounts of a new cryptocurrency.

SUMMARY

In general, in one aspect, embodiments relate to a system for bootstrapping a cryptographic ledger based on stake in a fiat currency, such that stakes are distributed in proportion to the existing allocation of the fiat currency, rather than being purely bootstrapped in the manner of existing cryptocurrencies. Stake can be verified using proof of cash systems involving anti-spoofing, anti-counterfeiting, and remote verification and transaction functionality, including automated inspection of banknotes by hardware-verifier machines and manual inspection of banknotes by designated parties. Stake can further or otherwise be verified using proof of balance systems involving verification of one or more balances using a service of a financial institution or data provider. These systems, together or separately, can be utilized to implement a cryptographic currency and application platform enabling financial transaction and general computing capabilities, in accordance with various embodiments of the invention. Each system includes one or more defined validation procedures for confirming the authenticity of data provided to the platform by remote computing devices, enabling the state of one or more digital ledgers to be altered based on users' stakes in fiat currency.

Implementations can include one or more of the following items, alone or in combination with other items listed below: methods and systems for anti-spoofing and anti-counterfeiting detection of banknotes. The systems can be utilized remotely and with general purpose or specialized mobile computing devices, to verify possession and authenticity of banknotes for the purpose of generating cryptographic tokens corresponding to the banknote(s). Proof of balance systems disclosed herein enable verification of one or more fiat (or digital) currency account balances, achieved using services of a financial institution or data provider. Both proof of cash and proof of balance systems make use of defined validation procedures, including criteria for which devices may be relied upon when attributing stake to users, and for what additional guarantees of authenticity must be provided when data is transmitted by untrusted devices, such as the inclusion in a message from an untrusted device of a credential conveyed by a trusted party, or the need to perform authentication events that enable reliable sensor data about user's stakes to be obtained even on untrusted hardware. A multi-phase and multi-feature implementation is disclosed involving a staking or "soft fork" period during which provisional transactions are conducted. Upon conclusion of the soft fork period, a "hard fork" can take place and may involve finalization or permanent recording of provisional transactions, commencement of provisional contracts, a completion or partial completion of token-issuance, commencement of non-provisional transactions and transaction types, and/or a variety of other triggering events.

In general, in one aspect, embodiments relate to a system for a system for bootstrapping a cryptographic ledger based on stake in a fiat currency. The system can include: a proof of balance engine configured to (i) designate a staking period representing a predefined duration of time, (ii) calculate, based on financial account data of a user, a staking value representing a stake of ownership in the cryptographic ledger, and (iii) record, after conclusion of the staking period, a first set of digital tokens on the cryptographic ledger representing the stake of ownership for the user, a client interface module configured to receive, from a computing device of the user, a request to verify financial account data of the user at a financial institution, and a balance interface module configured to programmatically request the financial account data from a service associated with the financial institution, wherein the financial account data is associated with the staking period.

In general, in one aspect, embodiments of the invention relate to a method for bootstrapping a cryptographic ledger based on stake in a fiat currency, The method may include (i) designating a staking period representing a predefined duration of time, (ii) receiving, from a computing device of a user, a request to verify financial account data of the user at a financial institution, (iii) programmatically requesting the financial account data from a service associated with the financial institution, wherein the financial account data is associated with the staking period, (iv) calculating, based on the financial account data, a staking value representing a stake of ownership in the cryptographic ledger, and (v) recording, after conclusion of the staking period, a first set of digital tokens on the cryptographic ledger representing the stake of ownership for the user.

In general, in one aspect, embodiments of the invention relate to a computer-readable storage medium including instructions for bootstrapping a cryptographic ledger based on stake in a fiat currency. The instructions can be configured to execute on at least one computer processor to: (i) designate a staking period representing a predefined duration of time, (ii) receive, from a computing device of a user, a request to verify financial account data of the user at a financial institution, (iii) programmatically request the financial account data from a service associated with the financial institution, wherein the financial account data is associated with the staking period, (iv) calculate, based on the financial account data, a staking value representing a stake of ownership in the cryptographic ledger, (v) and record, after conclusion of the staking period, a first set of digital tokens on the cryptographic ledger representing the stake of ownership for the user.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1:
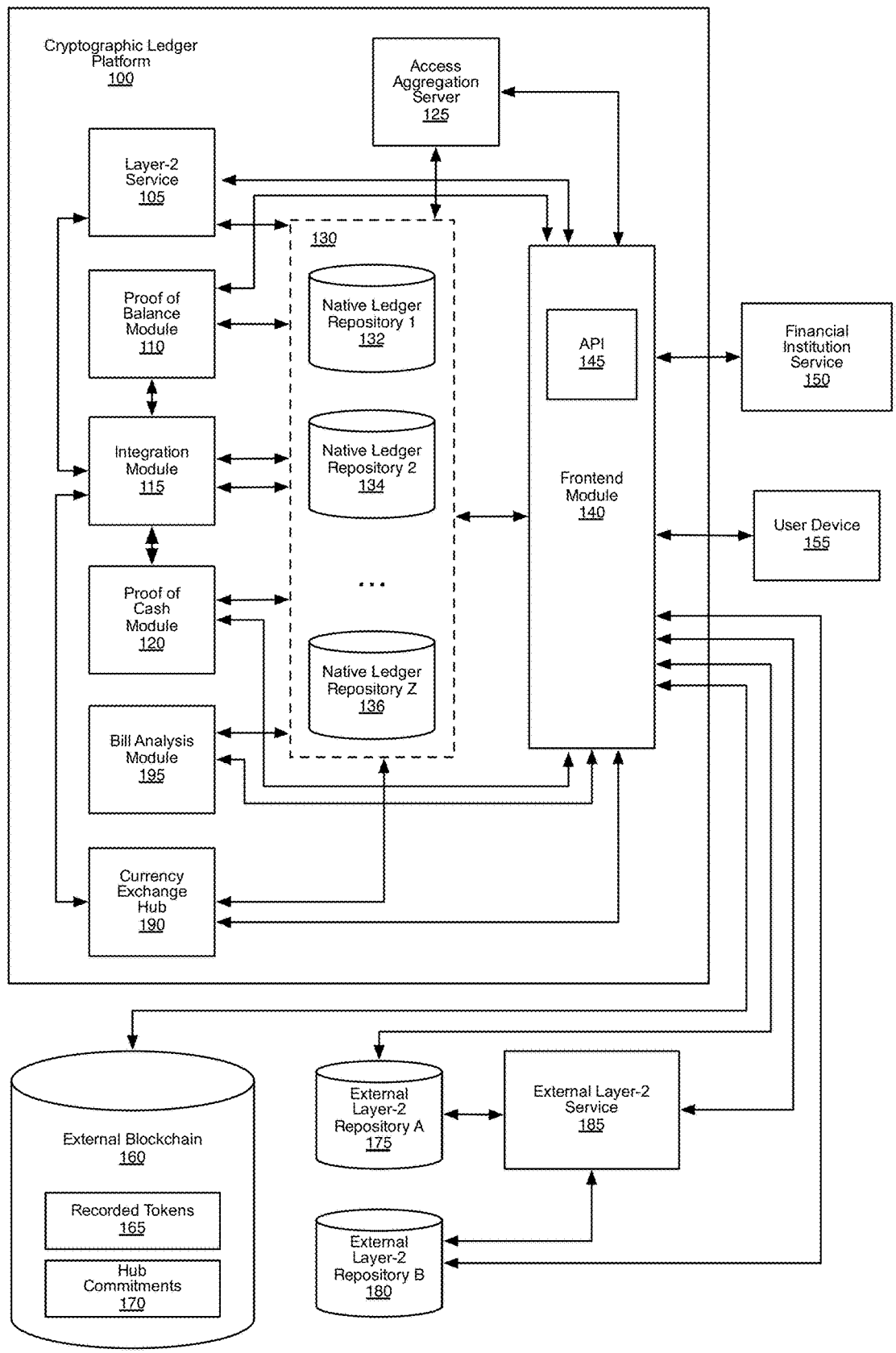
FIG. 1-8 show schematic diagrams of systems, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods, systems, and interfaces relating to fiat banknotes, fiat digital accounts, private cryptographic currency platforms, and decentralized cryptographic currency platforms. More specifically, embodiments of the invention enable bootstrapping a cryptographic currency by allowing users to claim and verify possession and/or ownership of one or more fiat currencies in order to obtain stake in a cryptographic currency in accordance with a predefined release or distribution schedule. Verification of fiat funds can include systems and methods of anti-spoofing, anti-counterfeiting, and remote verification.

FIG. 1 shows a cryptographic ledger platform 100, a financial institution service 150, a user device 155, an external blockchain 160, external layer-2 repositories (175, 180), and a layer-2 service 105, in accordance with one or more embodiments. As shown in FIG. 1, the cryptographic ledger platform 100 has multiple components including a frontend module 110 with an application programming interface (API) 112, a proof of balance module 110, a proof of cash module, an integration module 115, an access aggregation server, and a variety of native ledger repositories (132, 134, 136). Various components of the cryptographic ledger platform 100 and associated components of FIG. 1 can be located on the same device (e.g., a server, mainframe, virtual machine, cloud-based service, desktop Personal Computer (PC), laptop, mobile phone, kiosk, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the cryptographic ledger platform 100 is a platform for facilitating and recording transactions in one or more verifiable ledgers, and for issuance and exchange of cryptographic tokens between one or more entities. For example, the cryptographic ledger platform 100 may store and exchange tokens and/or contracts involving millions of accounts of individuals, businesses, and/or other entities. Accounts can include privately stored and administered financial accounts, digital or cryptographic accounts secured by one or more private keys, or any other mechanism for recording transactions or balances. One or more users of each account may use the cryptographic ledger platform 100 to send cryptographic tokens to other accounts inside and/or outside of the cryptographic ledger platform 100. The cryptographic ledger platform 100 may be configured to exchange tokens or to record and execute cryptographic contracts in "real-time", i.e., to exchange value with other users with a minimal delay and to conduct transactions with one or more other users during concurrent sessions. The cryptographic ledger platform 100 can further enable multi-signature transactions, loans, liens, promissory notes, and a variety of other financial and/or computational contracts between users and accounts.

In one or more embodiments of the invention, the cryptographic ledger platform 100 enables "forking" a parent currency to bootstrap a cryptographic currency. The underlying technology employed to perform a "soft fork" of a parent currency using proof of balance and/or proof of balance functionality disclosed herein is not actually related to software modifications such, e.g., as the addition of SegWit to Bitcoin. Rather, in one embodiment, during a soft fork all authentic banknotes within the parent (e.g., fiat) currency are virtually embedded with cryptographic tokens corresponding to their face value (e.g., all $20 USD Federal Reserve Notes would contain a minimum of 20 cryptographic tokens), and the network does not permit users to remove those cryptographic tokens during the soft fork. Multiple staking or "soft fork" periods can be utilized, in accordance with various embodiments of the invention. The phrase "final staking period" can refer to a staking period immediately preceding a hard fork event.

In one or more embodiments of the invention, the cryptographic ledger platform 100 comprises a proof of cash module 120 configured to perform proof of cash functionality and/or a proof of balance module 110 configured to perform proof of balance functionality. One or both of said modules may be optionally implemented. Cryptographic tokens may be issued by the proof of balance module and/or the proof of cash module by recording ownership in the native ledger repositories 130 where cryptographic token data is stored. In an embodiment that can be utilized to reduce double counting, proof of cash verification is permitted during the staking ("soft fork") period, but after the staking period only retrospective proof of balance verification is permitted.

For purposes of this disclosure, the term "blockchain" can refer to any repository for representing transaction data associated with a cryptographic currency. For example, various uses can designate a cryptographically decentralized ledger, without any intention to exclude implementations using alternate data structures such as Directed Acyclic Graphs. In examples where an external blockchain is shown for illustrative purposes, it should be understood that this represents the many current and future external blockchains that may interact with the cryptographic ledger platform 100. Some or all portions of the cryptographic ledger platform 100 may themselves be implemented on blockchains or other decentralized computing platforms. While the cryptographic tokens stored in the cryptographic ledger platform 100 depicted in FIG. 1 may be described as residing in a centralized ledger for illustrative purposes, this is not intended to exclude other implementations.

In some embodiments, cryptographic tokens are issued directly from the proof of balance module 110 and/or proof of cash module 120 to an external blockchain or other distributed ledger (e.g., external blockchain 160). In one embodiment, a custodial layer-2 service 105 is employed. In this embodiment, the layer-2 service may be used to issue and manage cryptographic tokens both prior to and after the creation of one or more layer 1 blockchains. The layer-2 service 105 can be an internal module 105 configured to issue tokens in the native ledger repositories 130 or can be an external module 185 utilized by the cryptographic ledger platform 100 to issue and manage tokens in an external layer-2 repository (175, 180).

Figure 6:
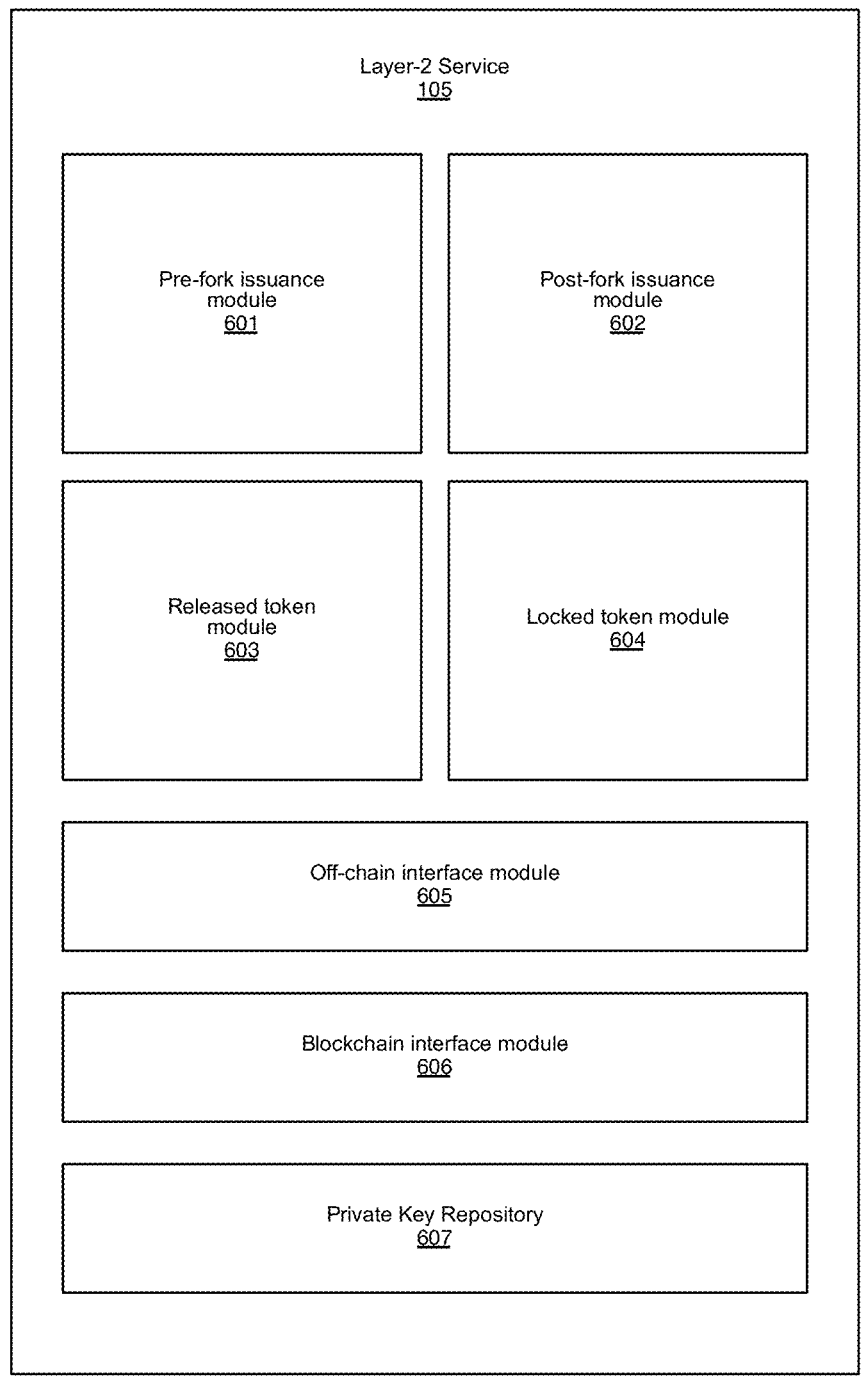

FIG. 6 depicts a layer-2 service including seven submodules. For purposes of this disclosure, a layer-2 service 105 is a service enabling transaction functionality associated with one or more cryptographic ledgers. The term "layer-2" can describe any services built on top of a cryptographic ledger protocol such as Bitcoin or Ethereum. Examples of external layer-2 services include, but are not limited to, Lightning Network, Ethereum Plasma, Colored Coins, decentralized exchanges and payment channels such as Bitshares, and application layer protocols even higher in the technology stack. The external layer-2 service 105 can be operated by a trusted entity, third party service provider, or can be decentralized and configured to operate without a counterparty. The external layer-2 service can include or be associated with any number external layer-2 repositories (175, 180, etc.) storing transaction and other data required for operating the service and enabling an interface between the service and its underlying blockchain(s).

The pre-fork issuance module 601 allows cryptographic tokens to be issued for fiat funds staked during staking windows prior to the final staking period used to fork the parent fiat currency. In one embodiment, the pre-fork issuance module 601 operates only prospectively, so that funds must be staked through the system in advance in order for users to earn pre-fork crypto-interest on them. In one or more embodiments, the post-fork issuance module 602 allows cryptographic tokens to be issued for fiat funds staked during the final staking period. The post-fork issuance module 602 can be configured to operate retrospectively, so that users who did not participate during the staking period may retroactively acquire cryptographic tokens by performing proof of balance verification of the funds in their financial accounts during the staking period.

In one or more embodiments, the cryptographic ledger platform 100 permits cryptographic tokens to be locked on the ledger or released to its owner's control. In some embodiments, some or all cryptographic tokens may initially be locked upon initial issuance, and portions of it may later be released by the cryptographic ledger platform 100. Locking can refer to preventing any movement of funds, preventing pre-specified transaction types, or preventing withdrawal to an external blockchain 160, in accordance with various embodiments of the invention. The schedule for releasing cryptographic tokens may be predetermined or dynamic.

The cryptographic ledger platform 100 can be configured to perform fixed or pro-rata releases of cryptographic tokens equally for all users, or to apply different release schedules or policies to certain classes of users or individual users. In some embodiments, the release schedule may be controlled by a price stability module (not illustrated), which receives external economic data through the off-chain 605 and blockchain interface modules 606 and accelerates or decelerates the unlocking schedule to maintain a price target, range, or schedule. For example, exchange-rate data from centralized or decentralized exchanges, CPI or other economic indicator data from centralized oracles or decentralized prediction markets can be used. In some embodiments, the cryptographic ledger platform 100 can be configured to issue different types of cryptographic tokens and to peg each type of token to the inflation adjusted value held by its parent currency at the time of the hard fork.

In one or more embodiments of the invention, the cryptographic ledger platform 100 includes functionality to re-lock released cryptographic tokens after their release. For example, in the event of attempted theft or a dispute over ownership, the cryptographic ledger platform 100 may be configured to enable cryptographic tokens to be locked until the controversy is resolved through a dispute-resolution mechanism such as arbitration, mediation, or litigation. In some embodiments containing a price stability module, the supply of available cryptographic tokens can be contracted by the cryptographic ledger platform 100 by permitting owners of released cryptographic tokens to opt-in to locking portions of their tokens in order to earn interest on the locked token's principal. Depending on the embodiment, such locked tokens may be released after a fixed period of time (e.g. 5 years), released at an unknown time but in a fixed order (e.g. first-locked, first-released), released in a dynamic time and dynamic order (e.g., first-locked, first-released within 5-year window, after which demoted to overflow que such that later locked tokens may "cut in line") or potentially never released (e.g., first-locked, first-released within 5-year window, after which permanently locked).

In one or more embodiments of the invention, the off-chain interface module 605 enables the cryptographic ledger platform 100 to participate in transactions and/or data transfers with non-blockchain platforms, including but not limited to receiving or transferring fiat and crypto assets with financial institutions or receiving price information from centralized exchanges. In one or more embodiments, the blockchain interface module 606 enables the cryptographic ledger platform 100 to participate in transactions and/or data transfers with decentralized ledgers and computing platforms, including but not limited to smart contracts, atomic swaps, side-chain transfers, and token issuance and redemption. The private keys managed by the cryptographic ledger platform 100 are presented as a distinct module (private key repository 607), but varied mechanisms of private-key control and storage may be employed consistent with the knowledge of those ordinarily skilled in the art. In one embodiment, the private key repository 607 is a component of one of the native ledger repositories 130. Private keys can allow the cryptographic ledger platform 100 to, among other things, sign messages and pre-commitments, control cryptographic tokens stored on external blockchains, and control cryptographic tokens stored on native blockchains wherein tokens are the staked resource used for consensus.

In FIG. 1, multiple native ledger repositories 130 are shown to illustrate that each parent currency can potentially be forked onto a separate native blockchain. In some embodiments, the largest international currencies such as the Dollar and the Euro may receive their own native blockchains, and smaller currencies may then be forked through issuance of tokens on those shared blockchains. In some embodiments, multi-chain protocols may be implemented to permit movement of among native blockchains and external blockchains.

In some embodiments, multiple currencies may be forked together onto a single blockchain, with all of their owners receiving the native asset of the blockchain. This can be accomplished by acquiring exchange-rate information (e.g., via the offchain interface module) from one or more exchanges or other financial entities, and then crediting holders of different currencies with stakes proportionate to the contemporaneous market value of their currency holdings. In one preferred embodiment, when a staking period is used, the exchange rates between the currencies are determined based on the values at the points in time when each of the past balances are measured. A holder of one type of fiat currency, such as the Euro, may thereby "fork" a Euro balance yet receive units of forked Dollars. On the cryptographic ledger, these may be nominally recorded as forked Euros, yet actually represent a fixed quantity of forked Dollars, or they may simply be recorded as forked Dollars. In either embodiment, the substantive result is the same. The advantage of forking multiple currencies together in this manner is that the quantity of fiat currency forked onto a single blockchain may thereby be significantly increased, which can greatly enhance the security of the ledger, because an adversary would need to acquire a much larger quantity of fiat currency in order to achieve the super-threshold stake required for what is popularly referred to as a 51% attack.

In the embodiment shown in FIG. 1, cryptographic tokens may be issued on an external blockchain 160. This enables users to fork their fiat funds onto the cryptographic ledger platform's centralized layer-2 ledger, then remove their tokens from the centralized ledger by storing it on an external decentralized platform. In some embodiments, upon the creation of native blockchains in the native ledger repositories 130, the external tokens may be redeemed for native tokens. The integrity of data stored on a centralized ledger controlled by the cryptographic ledger platform 100 may also be enhanced in some embodiments via the cryptographic ledger platform 100 publishing signed commitments on external blockchains. In FIG. 1, the commitment is shown on an external blockchain, but commitments may also be published on native blockchains within the cryptographic ledger platform 100.

In one or more embodiments of the invention, a commitment on an external blockchain is used to designate a hierarchical deterministic key from which child-keys will be generated for the cryptographic ledger platform 100 to commit to the authenticity of data stored on a layer-2 ledger. A user and the cryptographic ledger platform 100 may create a private hash-chain documenting user authorization for, and platform execution of, changes to the state of an account (e.g., a reduction in balance due to transferring funds to another user). This scheme does not prevent funds from being stolen by the cryptographic ledger platform 100, but it guarantees that the user will have unforgeable proof of the fraud. In some embodiments, the reliability of the centralized ledger may be further enhanced by the cryptographic ledger platform 100 committing funds to a smart contract on a decentralized ledger from which funds will be paid out to any user who presents the aforementioned proof of fraud.

In one or more embodiments, the proof of cash module 120 is a module for enabling users to claim possession of physical banknotes in exchange for cryptographic tokens. The proof of cash module 120 can enable any number of users to claim possession of physical banknotes, issue cryptographic tokens corresponding to the banknotes, and perform various transactions using those cryptographic tokens, in accordance with various embodiments of the invention.

Proof of cash technology makes it possible for people to acquire virtual money by using an application on their smartphones to scan their cash and receive corresponding cryptographic tokens. It will allow an unprecedented portion of the public to be onboarded to a shared platform for transacting virtual money, using mobile and other devices.

Figure 2:
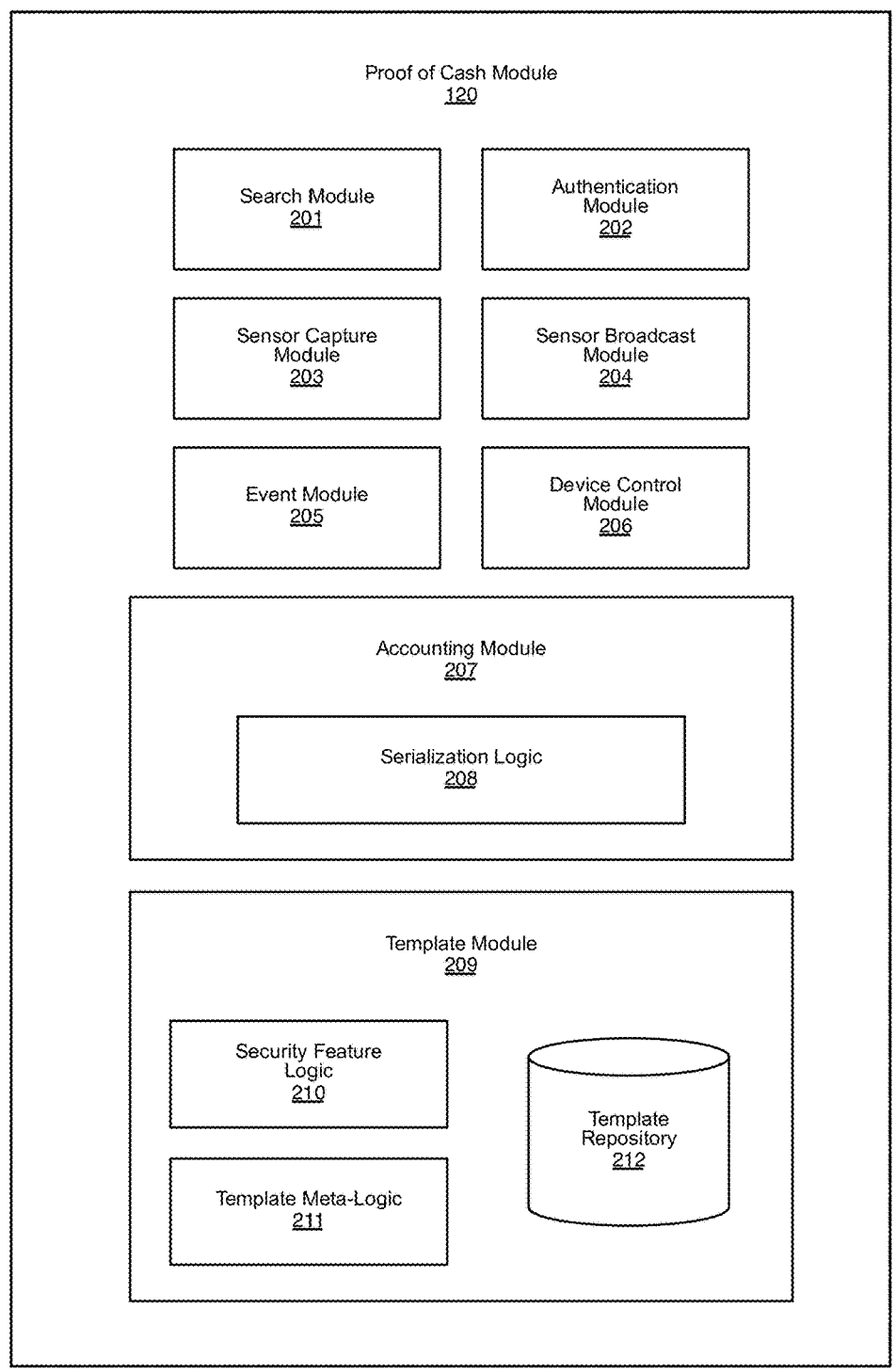

FIG. 2 shows expansion of a proof of cash module 120, in accordance with one or more embodiments. As shown in FIG. 2, the proof of cash module 120 has multiple components including a search module 201, authentication module 202, sensor capture module 203, event module 205, device control module 206, and a sensor broadcast module 204. Various components of the proof of cash module 120 can be located on the same device (e.g., a server, mainframe, virtual machine, cloud-based service and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments of the invention, the proof of cash module 120, in conjunction with a user device, includes functionality to enable users to seamlessly convert their cryptographic money into whatever form of cash was accepted by local merchants. A user can simply convert a portion of their crypto account balance into cash by transacting with other users in the local area, and then spend the cash wherever they wanted. The vast majority of global consumer transactions are still performed in cash. This functionality makes the cryptographic money immediately usable, as merchants do not need to separately "opt in" to accepting it as a form of payment.

In one or more embodiments of the invention, the proof of cash module 120 includes functionality to enable cash to be conveniently deposited and exchanged for other currencies, not merely withdrawn, such that users could rely on the cryptographic ledger platform 100 for a full range of banking and money-transfer services. Instead of using a fiat checking account at a bank, users can hold their money in cryptocurrency, then convert it back and forth into cash as needed.

In one or more embodiments of the invention, the proof of cash module 120 receives a request from a user device to transfer cryptographic tokens from a first user to a second user in exchange for fiat banknotes. The first user can initiate the transaction by opening a mobile application and entering details of the proposed transaction. The first user can enter an identifier of account address of the second user, and initiate the transaction. Upon receiving the transaction request, the proof of cash module 120 is configured to send a verification request to a user device of the second user. In one embodiment, the verification can be performed via local device to device communication (e.g., via Bluetooth or NFC protocol), whereby the doubly signed transaction request is sent to the proof of cash module 120. Transactions can include any amount of cryptographic tokens transferred from one account to another, and/or any amount of physical banknotes exchanged. In this way, users can bypass traditional currency-exchange booths simply by depositing one type of cash (e.g. USD), storing their money as cryptocurrency, and then traveling to a different country and withdrawing a different type of cash (e.g. EUR), either from a cryptographic ledger platform or from other users in the local area.

In one or more embodiments of the invention, the proof of cash module 120 includes functionality to enable payments to be made to third parties (non-users of the platform). In this way, the cryptographic ledger platform 100 could provide the money-transfer and remittance services currently supplied by intermediaries such as Western Union and Moneygram. A user of the mobile device in the aforementioned figures can initiate a remittance transfer with another user by entering an amount, proposed exchange rate (optionally set by the platform 100), and identification information of a recipient in the receiving location. The cryptographic ledger platform 100 receives the request for the remittance transfer and matches the request to a provider (e.g., another user who had indicated their willingness to provide exchange services). Once the match is made, the cryptographic ledger platform 100 deposits cryptographic currency tokens from the account of the sending user into an escrow account within one of the native ledger repositories 130, and notifies the provider of the pending transaction. Upon receiving the notification of the pending transaction (e.g., via their mobile device), the provider contacts the recipient of the remittance and schedules delivery or pickup of the funds. This can include a digital transfer in the local currency or transfer of fiat banknotes to the recipient. Once the transfer is made, the provider can send proof of completion of the transaction (e.g., photographic evidence, signature confirmation, digital signature) to the cryptographic ledger platform 100 in order to release the cryptographic tokens from escrow. The tokens are then transferred to the provider and the remittance is completed. As shown in this example, the cryptographic ledger platform enables a sender in one country to deposit cash, which is then transferred on the network as cryptographic money, and then provided as local cash to a recipient in a different country or geographic location. Providers in the example shown, and in other embodiments of the invention, can be individual users and/or businesses with physical locations. Existing merchants can easily act as providers in the exemplary system, practically no required investment or associated startup costs.

In one or more embodiments of the invention, the proof of cash module 120 enables its own users to act as mobile providers of currency-conversion services. That functionality could be delivered using the smartphones and other mobile devices that initially joined the network to participate in the proof of cash protocol. The number of users on the network available to provide services could exceed the world's combined supply of conventional bank branches, ATMs, currency-conversion booths, and money-transfer locations.

There are significant unsolved problems that have prevented banking from being offered as an on-demand mobile service in the gig economy. Cash cannot simply be delivered using the technologies that companies like Lyft and Uber rely on to provide e.g. ride-sharing services or food delivery, due to significant security challenges.

First, cash cannot be tendered upon delivery in the same manner as e.g. a pizza, because the counterparty can simply pocket the fungible banknotes. This is a "double-credit attack"—the counterparty retains the funds previously credited to his account, while also acquiring the corresponding cash. Similarly, in a "fake tender attack" a provider may falsely claim to have dispensed cash, and thereby lay claim to funds he never earned. Like a double spending attack, these techniques thwart the consistency of double entry bookkeeping, because they allow nodes to receive credit without incurring the corresponding debits.

Simply tracking the location of the user and service provider does nothing to prevent these exploits, since recording the fact that the parties met in person does not provide any proof of whether cash actually changed hands. Nor does requiring that the user and provider both confirm transaction completion by, e.g., exchanging pre-issued credentials, do anything to solve the problem. Once the cash has been pocketed, or once a provider has falsely claimed to have dispensed cash, each party will claim to have been wronged by the other, and the system has no way to resolve the dispute. The attacking party may even summon the police and point the finger at the victim. Thus, mobile in-person cash transactions can only be performed between trusted parties.

Proof of cash functionality enables untrusted parties to perform in-person exchanges with one another, because it allows the party possessing cash to document ownership of specific serialized banknotes before tendering them to the counterparty. If the counterparty attempts to pocket the money, he will be unable to convincingly pretend that the banknotes were not provided to him by the tendering party, because the tendering party will have access to a verifiable record of the fact that the banknotes are his property and that they were only provided to the counterparty as part of a proposed exchange.

Returning to the forking functionality of the invention, in one embodiment, continuity with the "forked" parent currency is maintained, because all authentic notes are guaranteed to contain at least the quantity of cryptographic tokens corresponding to their face value. However, some notes may be embedded with additional cryptographic tokens, in accordance with various embodiments of the invention. In some embodiments, the cryptographic ledger platform 100 includes functionality to distribute this additional token value in notes through a predictable pattern (akin to a scavenger hunt for specific known bills), while in other embodiments the distribution may be performed randomly or pseudo-randomly by the cryptographic ledger platform 100. The latter option permits holders of banknotes to participate in a sweepstakes, i.e., a game of chance with financial rewards but no consideration.

In one or more embodiments of the invention, the proof of cash module 120 includes functionality to perform a sweepstakes and to distribute additional cryptographic tokens to a subset of addresses during the soft fork period. For example, the proof of cash module 120 may distribute additional cryptographic prize tokens to addresses corresponding to banknotes that are claimed by users during the staking period. In some embodiments, the value of all notes within the meta-serialization range may be assigned at the outset of the sweepstakes. This permits the value data to be stored locally on user devices when desired. However, it also requires knowledge of the meta-serialization range of extant currency. Even where records are available of the notes introduced and removed from circulation, some notes will have been lost or destroyed by their owners, so some portion of the additional cryptographic tokens offered as sweepstakes prizes will be assigned to meta-serialized notes that will never be redeemed. In other embodiments, when that is undesirable, the proof of cash module or other network hub may assign sweepstakes prizes dynamically in response to queries.

In one simple implementation, the proof of cash module 120 utilizes a source of initial entropy to specify prize values at unpredictable positions in a sequence, and those values are assigned to meta-serialized bills based on the sequence of queries submitted by users (e.g., a pseudo-random number generator (PRNG) is used to determine in advance that a 100 token prize will be awarded to the 5th discrete meta-serialized bill whose value is queried). In more complex implementations, multiple prize assignment sequences may be generated by the proof of cash module 120 for different types of notes and each received query will be mapped by the proof of cash module 120 to the corresponding sequence for its note type. (e.g., a separate prize sequence may be created for each denomination, such that the 3rd $1 note will receive 5 tokens and the 17th $1 note 25 tokens, while the 7th $100 note will receive 1 million tokens, and the 9th $100 note will receive 5 tokens).

In other implementations, rather than predetermining the sequence of prize values that will be assigned, the proof of cash module 120 may assign prize token value mapped to a given position in the sequence dynamically at query time. This may be accomplished either by introducing entropy from conventional sources, such as PRNGs, or by incorporating query attributes as entropy sources, including query timing and query content. For example, denomination, serial number, user identity, user location, user device type, or device attributes such as battery level, signal strength, etc. can be used. In some implementations, additional user-created entropy may be included with queries, e.g., by prompting users to choose "lucky" numbers, shake their devices to produce unpredictable accelerometer/gyroscope data, rub the screen, and etc.

In one or more embodiments of the invention, the proof of cash module 120 includes functionality to execute a multi-stage sweepstakes in accordance with a specified schedule. Thus, rather than assigning a single sweepstakes value to each bill, a bill's ultimate sweepstakes value is a function of multiple values assigned and/or revealed at different points in the sweepstakes contest.

The exact implementations of soft and hard forks may vary. In one or more embodiments of the invention, the proof of cash module 120 can be configured to implement a hybrid period during which some but not all cryptographic tokens can be removed from bills. In one embodiment, this hybrid period permits the additional cryptographic tokens deposited via a sweepstakes to be removed from bills, while the base-amount of cryptographic tokens guaranteed by the bills' face value remains trapped inside each note. In one or more embodiments, the proof of cash module 120 permits certain classes of users to upload cryptographic tokens first, restricts claiming to certain types or classes of bills, and/or limits the quantity and/or type of cryptographic tokens that some or all users or devices may claim during a given period. For example, the proof of cash module 120 may initially only allow claiming of $1 USD bills or may temporarily cap claiming to 10,000 tokens per day per user.

In one or more embodiments, the financial institution service 150 stores financial data of any number of users. The financial institution service 150 can be owned and operated by a financial institution (e.g., a bank) or can be a third-party data aggregator/provider configured to obtain the financial data from one or more financial institutions. This disclosure refers to "banks" for illustrative concision, but it should be understood that in some embodiments, Proof of balance technology may be applied to fiat balances maintained by users on ledgers at non-bank institutions.

Users' fiat balances are stored on the ledgers of their banks or other bank-like financial entities, in various accounts. This disclosure refers to "banks" or "financial institutions" for illustrative concision, but it should be understood that in some embodiments of the invention can be applied to fiat balances maintained by users on ledgers at non-bank institutions and need not be restricted to funds stored in a particular type of account. In some embodiments, it may be applied to balances of checking accounts, savings accounts, money-market accounts, escrow accounts, brokerage accounts, and/or any other accounts where fiat balances are maintained. The term "fiat" is also used for illustrative purposes to refer to the balances being forked, but in some embodiments the inventive concepts may be employed to fork balances on ledgers where entries represent other embodiments of value, including but not limited to other types of currencies, virtual or physical commodities, securities, personal property, real property, or other assets and/or units of account.

In one embodiment, the financial institution service 150 includes an externally accessible application programming interface (API) for providing the financial data to one or more authorized third-party clients (e.g., via a REST API). Any other mechanism for programmatically sending/receiving data can be used. The balances of the financial accounts typically correspond to fiat currency holdings such as the US Dollar or the Euro, but can optionally include any form of digitally recorded and transferable asset.

Figure 5:
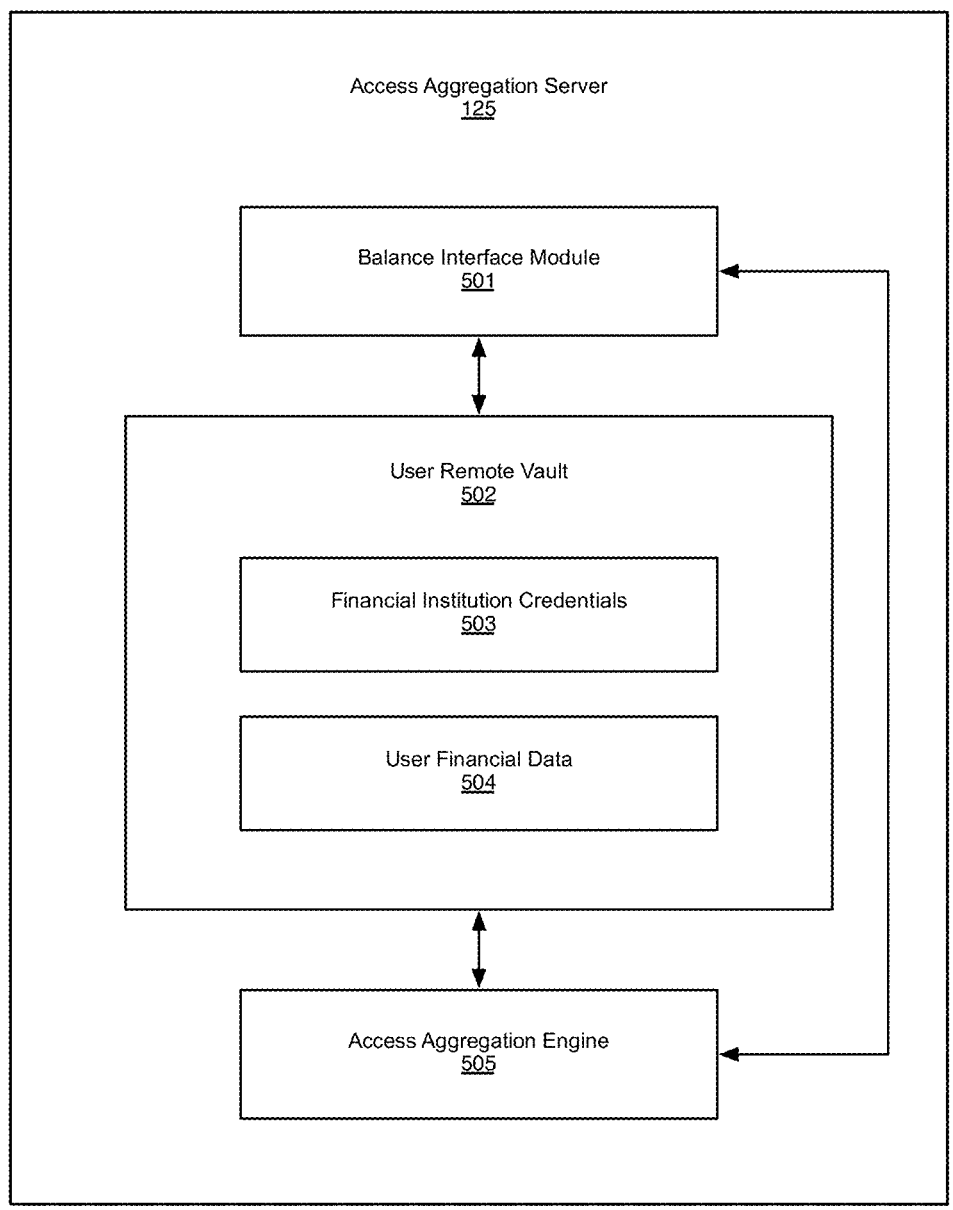

Some financial institution services may support access delegation. (via e.g. OAuth, OpenID, JSON Web Tokens, Macaroons, etc.) Other financial institution services may lack this capability, requiring user credentials to be transmitted in order for balance data to be accessed. The systems and methods of the present disclosure may be employed with either type of service. For financial institution services that support access delegation, the access-granting token(s) may be stored and used to fetch balance data from bank ledger servers. For bank ledgers that do support access delegation, the user may be prompted to input the required credentials (e.g., username and password) manually each time they are needed, or the credentials themselves may be stored securely for re-use. In many embodiments, individual users may have some accounts accessible by financial institution services that support access delegation, and other accounts accessible by financial institution services that require user credentials for data access. The term financial institutions credentials 503 of FIG. 5 is intended to depict both access tokens and user credentials for individual users.

Storage of credentials and/or tokens may occur locally on user devices, externally on outside devices, or a combination of both. The embodiment shown in FIG. 1 illustrates both local and external storage, the former on a user device 155 and the latter on an access aggregation server 125. These examples are illustrative, not limiting. In some embodiments, credentials and tokens may be stored locally and/or remotely on different system components, including on distributed computing platforms or within the cryptographic ledger platform 100.

In one or more embodiments of the invention, the user device 155 in FIG. 1 can be implemented with a balance query module, for fetching balance data from external financial institution services 150, and a balance forwarding module, for transmitting the acquired balance data to the cryptographic ledger platform 100. The balance query module and the balance forwarding module can be comprised by a balance interface module configured to perform the functionality of balance interface module 302 of the proof of balance module 110 of FIG. 2, in accordance with various embodiments. Thus, the balance interface module can be implemented on the user device, within the cryptographic ledger platform 100, and/or some combination of both as desired.

In some embodiments, the user device 155 can be implemented with private keys stored locally, allowing it to interact directly with blockchains secure off-chain multi-party computation protocols (e.g., mutually signing changes to its balance with the cryptographic ledger platform), but in some embodiments private keys may be stored elsewhere or omitted entirely from the user's possession, with the cryptographic ledger platform 100 assuming full custodial control. In one embodiment, the credentials, access tokens, and private keys are stored within a secure digital vault on the user device 155. In some embodiments, the contents of vault may be password-protected and/or encrypted, so that they cannot be accessed without an additional security factor controlled by the user. In some embodiments, for even greater security and remote-attestation ability, a secure enclave (e.g. Intel SGX) may be employed.

The balance interface module 302 is an interface for communicating and transmitting data between financial institution services 150 and with the cryptographic ledger platform 100. Like other components optionally implemented on the user device 155, the access aggregation server 125 can be implemented as a component of a mobile application associated with the cryptographic ledger platform 100. The access aggregation engine 505 is a component for executing computational logic associated with accessing remote and local modules and for operating a service using the underlying modules of the access aggregation server 125.

The other option for credential and token storage depicted in FIGS. 1 and 5 is the access aggregation server 125, on which multiple sets of financial institution credentials 503 (e.g., user credentials and tokens) may be stored in a user remote vault 502.

FIG. 5 shows expansion of the access aggregation server 125 of FIG. 1, in accordance with one or more embodiments. As shown in FIG. 5, the access aggregation server 125 has multiple components including a balance interface module 501, an access aggregation engine 505, and a user remote vault 502 including financial institution credentials 503 and user financial data 504. Various components of the access aggregation server 125 can be located on the same device (e.g., a server, mainframe, virtual machine, cloud-based service and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, user financial data from a remote financial institution service 150 may be stored in the user remote vault 502 and shared with the cryptographic ledger platform 100. For example, this may be represented as separate secure remote vaults for User A and User B. In this example, equivalent credentials and tokens are present in User B's digital vault as User A's. The inclusion of two users is intended to illustrate that credentials and/or tokens from arbitrarily many users may be aggregated on a single server. In some embodiments, credentials and tokens from a single user may be stored in separate digital vaults, and credentials and tokens from multiple users may be stored in a single vault.

In one or more embodiments of the invention, the balance interface module 501 of the access aggregation server 125 enables communication between other components of the cryptographic ledger platform 100 and the access aggregation server 125. For example, the balance interface module 501 may generate authentication of requests to outside entities such as the financial institution service 150 originating from other components of the cryptographic ledger platform 100 which require access to protected user data. In one or more embodiments of the invention, the access aggregation engine 505 includes all controller logic of the access aggregation server 125 outside of the balance interface module 501.

Figure 3:
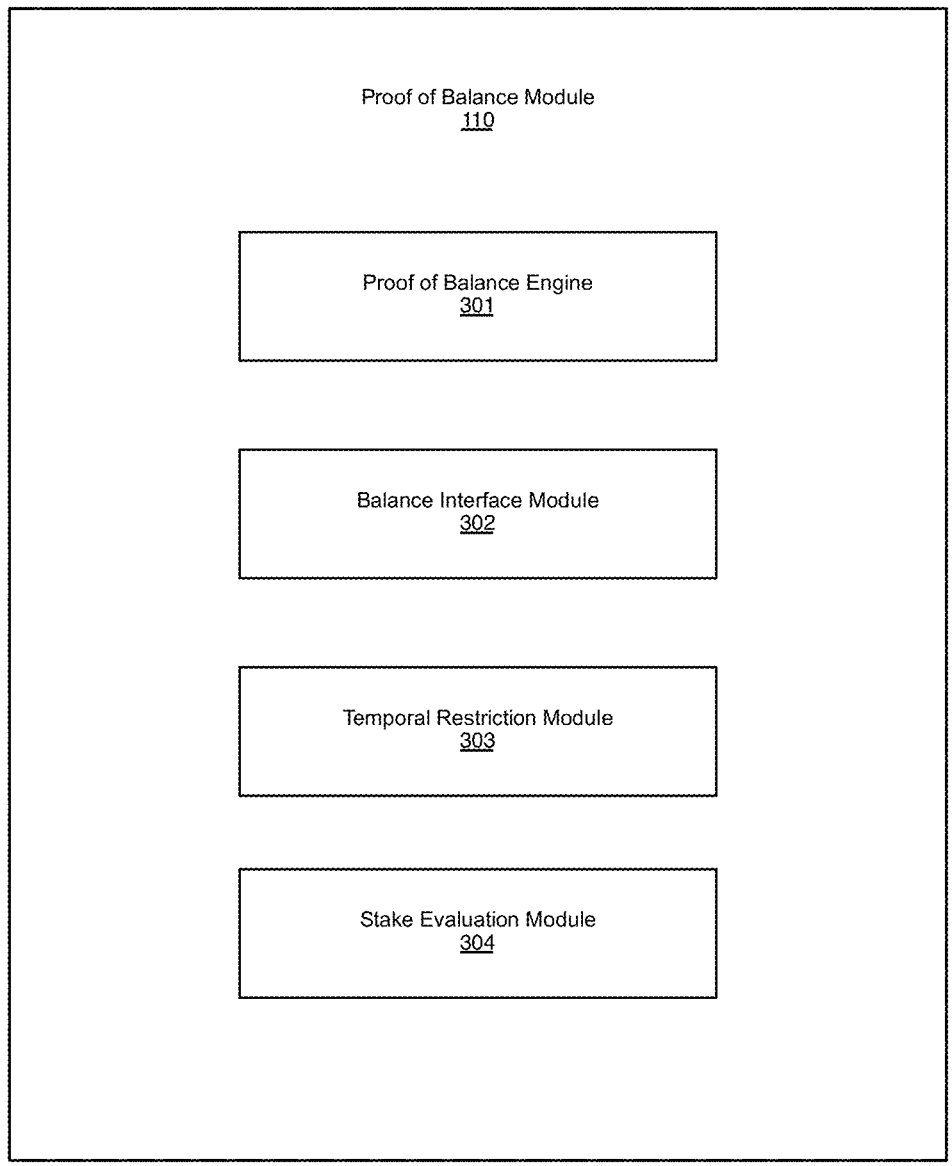

Only a single access aggregation server 125 is shown in FIGS. 1 and 3, but in many embodiments the tokens and credentials relied on by the cryptographic ledger platform 100 may be distributed across a large number of servers. These servers may be operated by the cryptographic ledger platform 100 or by third parties. In some embodiments, both physical servers and virtual servers running on general-purpose cloud-computing platforms may be combined. In some embodiments, some or all components of the access aggregation server 125 may be integrated into the cryptographic ledger platform 100, as displayed in FIG. 1 and/or on the user device 155.

The financial account data need not be restricted to funds stored in a particular type of account. In some embodiments, it may be applied to balances of checking accounts, savings accounts, money-market accounts, escrow accounts, brokerage accounts, and/or any other accounts where fiat balances are maintained. The term "fiat" is also used for illustrative purposes to refer to the balances being forked, but in some embodiments the inventive concepts may be employed to fork balances on ledgers where entries represent other embodiments of value, including but not limited to other types of currencies, virtual or physical commodities, securities, personal property, real property, or other assets and/or units of account.

In the Figures of the present application, for simplicity, arbitrary numbers of ledgers, accounts, users, clients, and other modules may be shown. For example, only a single user device 155 is shown in FIG. 1, but this should be understood to represent an arbitrarily large number of users and devices. Similarly, arbitrarily large numbers of financial institution services 150, layer-2 services (105, 185), external layer-2 repositories (175, 180), external blockchains 160, and other modules can be utilized. In the forthcoming flowcharts and methods, for illustrative purposes, the bank ledger data is depicted with the data of single user, or a particular set of users and accounts. This is intended to convey that any number of users can exist, and that users may have multiple accounts at a single bank, as well as accounts at multiple banks, and that each banks ledger may have balance data from multiple users. For illustrative simplicity, joint and institutional accounts are not depicted in FIG. 1, but many embodiments will include multi-user accounts. Balance data for billions of accounts at financial institutions around the globe can be included when performing the disclosed methods.

In one or more embodiments of the invention, the cryptographic ledger platform 100 is configured to define or designate a "soft fork" period of time. For purposes of this disclosure, the soft fork period is a period of time during which pre-specified functionality of the cryptographic ledger platform 100 is enabled. The soft fork period can interchangeably be referred to as a staking period. The pre-specified functionality can include, but is not limited to, provisional claiming of cryptographic currency by claiming possession of fiat banknotes and/or proof of balance verification with a financial institution service 150, provisional transactions involving various mechanisms for exchange of tokens tied to banknotes or fiat account balances, money multiplier and other staking mechanisms (further described in the forthcoming sections of the present disclosure), and more.

In one or more embodiments of the invention, the cryptographic ledger platform 100 is configured to detect conclusion of the soft fork period. Upon conclusion of the soft fork, a hard fork is said to have occurred signifying commencement of the hard fork period, also known as the post-staking period. For purposes of this disclosure, the hard fork period is a period of time during which pre-specified functionality of the cryptographic ledger platform 100 is enabled. The soft fork period and the hard fork period each have different, distinct, and optionally overlapping functional properties, in accordance with various embodiments. In a typical embodiment, the hard fork period is ongoing with no predefined time or date of conclusion. In this way, the hard fork can refer to a transition from one state of the cryptographic ledger platform to a different state which runs in perpetuity.

In one or more embodiments of the invention, the cryptographic ledger platform 100 is configured to receive a request to verify financial account data of a user at a financial institution. The request can be received from an application executing on a user device (155) and configured to transmit the request via the API 145. For example, the user may decide to perform "proof of balance" verification by enabling remote verification of a fiat savings account balance using an app installed on the user device 155. In this example, the user enters mobile banking credentials into the mobile application and completes a user interface sequence authorizing the cryptographic ledger platform 100 to obtain financial account data for the checking account. The sequence is configured to communicate with a financial institution service 150 which programmatically provides access to the financial account data of the user. Upon completing the sequence, the financial institution service 150 obtains a token enabling temporary access to the financial account data.

In one or more embodiments, the proof of balance module 110 is a module for enabling users to claim possession of fiat currency held by one or more financial institutions. The financial institution service 150 can provide programmatic access to external clients for obtaining financial data of said fiat currency.

In one or more embodiments, the proof of balance module 110 obtains authorization (e.g., via a token or API key) to obtain the financial account data from the financial institution service 150 either on demand and/or at one or more predefined times. The proof of balance module 110 can send a request for financial data corresponding to the soft fork period at one or more times before, during, or after the soft fork period. For example, the proof of balance module 110 can obtain a beginning balance upon first receiving authorization, and can submit a second request after conclusion of the soft fork period to obtain an average daily balance of the user's account(s). Any other timeline or mechanism for balance verification can be used, in accordance with various embodiments of the invention.

In one or more embodiments of the invention, a single day may be used as a staking period. This simplifies the calculation of the staked balance, because the ending-daily balance records may be input into the system without further processing. However, without certain mitigating functionality, there may be potential limitations to the use of a single staking day. First, some users may artificially inflate their fiat balances on that day (e.g., by taking out short-term high-interest loans), and may thereby acquire greater quantities of cryptographic tokens than would be proportionate to their actual fiat wealth. Second, if funds from large numbers of accounts are being staked, there is the potential for significant anomalies and inaccuracies in single-day balance data, particularly due to variances in international time zones, which may produce overlapping "daily balances" for funds transferred between accounts. Third, if retroactive staking is enabled, then measuring balances during only a single time or day in the past may produce unfair results, due to the extreme quantity of noise present in such a small sample, from e.g. random fluctuations in balance due to some users making a large payment or receiving a large deposit. This may not only cause users to refuse to participate in the system, but may also present a security vulnerability, by causing the allocation of stake within the system to diverge from the realistic allocation of liquid capital within the economy.

In one embodiment, these challenges may be addressed by enforcing a longer staking period, such as one month, six months, one year, or some other extended period of time. The temporal restriction module 303 includes functionality to eliminate balance data from outside that period and the stake evaluation module 304 processes the remaining balance data. In one embodiment, the stake evaluation module 304 identifies the lowest balance recorded during the staking period, and that number is used to determine the staked fiat balance. In other embodiments, a different algorithm may be employed for determining the staked fiat balance, such as the average daily balance during the staking period.

Storage of credentials and/or tokens may occur locally on user devices, externally on outside devices, or a combination of both. The embodiment shown in FIG. 1 can utilize both local and external storage, the former on a user device 155 and the latter on an access aggregation server 125, as depicted in FIG. 3. These examples are illustrative, not limiting. In some embodiments, credentials and tokens may be stored locally and/or remotely on different system components, including on distributed computing platforms or within the cryptographic ledger platform.

Figure 7:
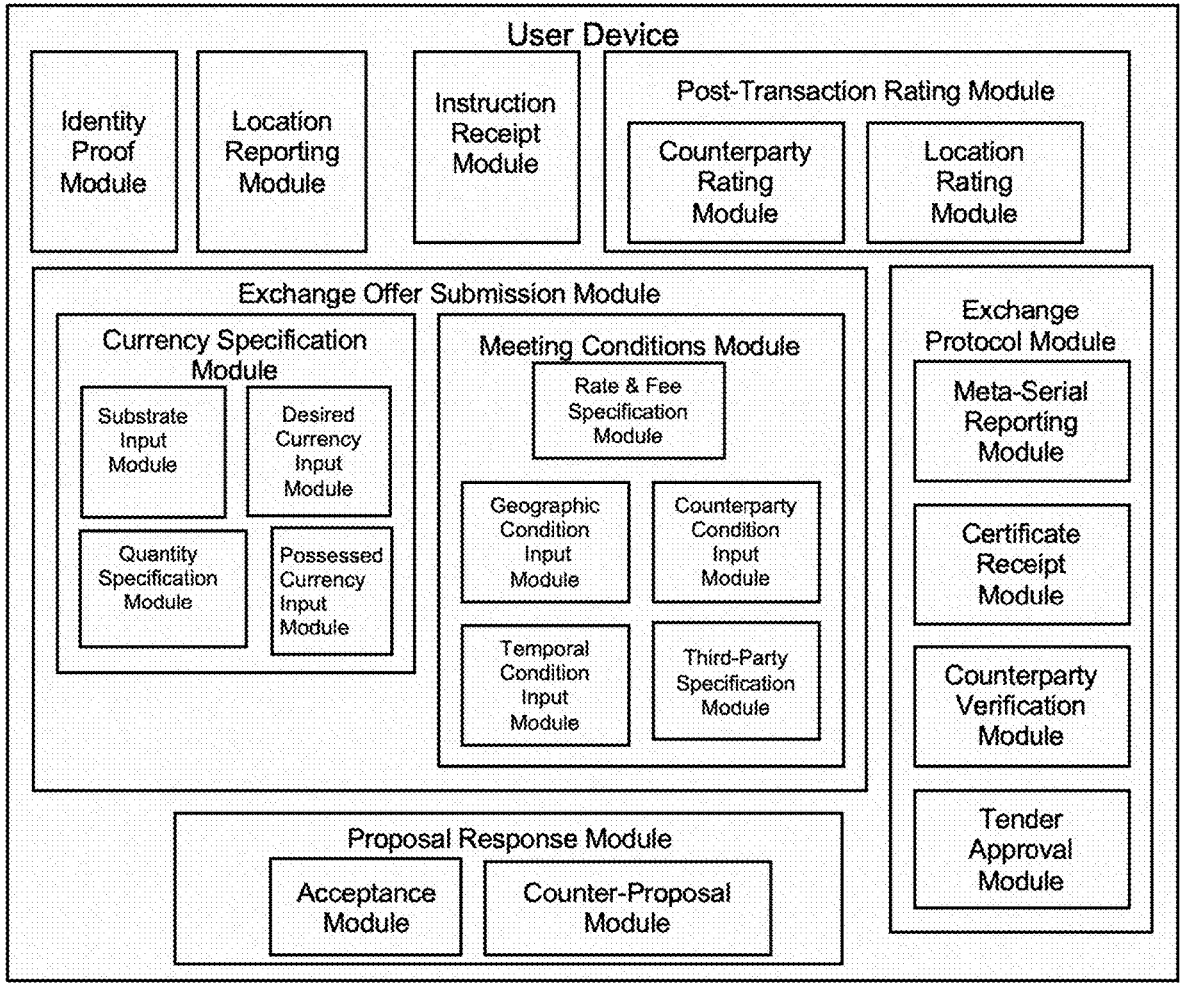

FIG. 7 shows a user device 155, in accordance with various embodiments. The user device 155 can be configured to remotely verify possession and authenticity of banknotes, perform transactions, authenticate a user, and perform other functionality as described elsewhere in the present disclosure.

The user device depicted in FIG. 1 and FIG. 7 may represent a smartphone, a tablet, a notebook, a desktop, or any other computing user-controlled device where online-banking credentials and/or tokens may be stored and through which balance data may be transmitted to the cryptographic ledger platform. In some embodiments, tokens, credentials, or private keys may be stored off of the user device 155, such as on a hardware wallet, which may be connected to the user device 155 as needed.

In one or more embodiments of the invention, the cryptographic ledger platform 100 is configured to calculate, based on the financial account data, a staking value representing a stake of ownership in the cryptographic ledger. The staking value can be calculated upon completion of the soft fork period or can be calculated even prior to knowing the amount of fiat currency "claimed" during the soft fork. In a first example, a token value is calculated upon receiving the financial account data. The percentage of the total issued tokens may not be known at this time, and may continue to increase due to an inflation schedule and/or "claiming" and issuance of new tokens via the mechanisms described herein.

In one or more embodiments of the invention, the cryptographic ledger platform 100 is configured to record a set of digital tokens on the cryptographic ledger representing the stake of ownership corresponding to the financial account data. Recording the set of digital tokens can be performed in response to any number of triggering events. For example, the set of tokens can be recorded upon conclusion of the soft fork period, and/or after final verification of financial account data via the financial institution service 150. In another example, the digital tokens can be recorded as a provisional transaction that locks the tokens from being moved without certain requirements being met. During the soft fork period, the provisionally recorded tokens can be "transferred" or transacted to one or more other users, but with mutually agreed-upon conditions such as one or more lien(s) or independent counterparty guarantor certifications. For purposes of this disclosure the tokens can be any digital record representing value in the cryptographic ledger corresponding to the "claimed" financial account data.

In one or more embodiments of the invention, the external blockchain 160 is a decentralized ledger based on a cryptographic consensus protocol such as Proof-of-Work (PoW), Proof-of-Stake (PoS), or Proof-of-Storage. The external blockchain 160 can be a component of the cryptographic ledger platform 100 or can be a third party blockchain upon which transactions and computational logic is performed. For example, Bitcoin, Ethereum, Ripple, Litecoin, and Stellar are examples of external blockchains 160, any number of which can be utilized. Transactions and cryptographic hash values can be recorded on the external blockchain 160 in order to provide verifiable proof of funds. The external blockchain 160 can further be utilized for adding funds to and removing funds from the cryptographic ledger platform 100.

FIG. 3 shows expansion of a proof of balance module 110, in accordance with one or more embodiments. As shown in FIG. 3, the proof of balance module 110 has multiple components including a proof of balance engine 301, a balance interface module 302, a temporal restriction module 303, and a stake evaluation module 304. Various components of the proof of balance module 110 can be located on the same device (e.g., a server, mainframe, virtual machine, cloud-based service and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the proof of balance module 110 is configured to enable bootstrapping a cryptographic currency by utilizing financial data of a fiat currency. The proof of balance module 110 can be implemented as a collection of software modules executing on specialized hardware configured for computational logic described in the present disclosure, and storage related thereto.

The proof of balance engine 301 is responsible for executing business logic not encapsulated by the balance interface module 302, temporal restriction module 303, and stake evaluation module 304, in various embodiments. The proof of balance engine 301 is configured to obtain fiat financial data and stake evaluation data based on said financial data, and communicate between other components of the cryptographic ledger platform 100. The balance interface module 302 is configured to communicate with entities and components external to the proof of balance module 110. For example, the balance interface module 302 can be configured to communicate with one or more financial institution services (150) via the frontend module 140 in order to obtain financial data of a user. The balance interface module 302 can obtain said financial information using credentials of the user stored either in a native ledger repository (132, 134, 136) or on an external device of a user. Any mechanism for authentication/authorization can be used in accordance with various embodiments of the invention.

In one or more embodiments, the temporal restriction module 303 includes logic for restricting financial data based on time related restrictions associated with one or more staking rules or periods. For example, the temporal restriction module 303 can exclude portions of the financial data containing balances outside of the relevant staking period, e.g., prior to a hard fork.

In one or more embodiments, the stake evaluation module 304 is configured to calculate a stake value corresponding to financial data obtained for a user. The stake value can be a preliminary stake value such as a number of cryptographic tokens, or can be an estimate or other predicted stake amount calculated at a particular moment in time. The stake evaluation module 304 can further calculate a final stake value which is subsequently recorded in a final ledger of the cryptographic ledger platform 100 upon detection of a hard fork event. The stake evaluation module 304 can be implemented as a separate module configured to utilize both the proof of balance module 110 and the proof of cash module 120 obtain financial data and calculate corresponding cryptographic stake values.

In one or more embodiments, the stake of fiat currency attributed to the user may be mapped on a 1-to-1 basis to units of currency on a cryptographic ledger. However, in one or more other embodiments, the fiat stake of the user may be employed as an input subject to other ratios or transformations. For example, as previously explained, attribution of stake in one fiat currency may be used to assign a user units of a different forked fiat currency.

Returning to FIG. 1, in one or more embodiments, the frontend module 140 is a service configured to receive programmatic requests from a variety of different entities. The frontend module can include an application programming interface (API) 145 including endpoints configured to receive said requests in a predefined format or protocol (e.g., REST) and to provide data for communicating with said entities (e.g., in JSON). The frontend module 140 can further include a load balancer and/or components of a content delivery network (CDN) for accessibility via the Internet or one or more private networks.

In one or more embodiments, the system of FIG. 1 includes one or more native ledge repositories (132, 134, 136, etc.). The native ledger repositories are databases and/or storage services residing on one or more servers. For example, the advertising repository (120) can be implemented as a containerized storage service in a cloud computing environment and configured to receive requests for data and to provide requested data to other components of the cryptographic ledger platform 100. In another example, the native ledge repositories (132, 134, 136, etc.) can include one or more tables in a distributed database management system (DBMS), a clustered database, a standalone flat file, and/or any storage software residing on one or more physical storage devices. Examples of a storage device may include, but are not limited to, a hard disk drive, a solid-state drive, and/or other memory device. Any type of database or storage application can be used, in accordance with various embodiments of the invention.

In one or more embodiments, the integration module 115 includes functionality to integrate functionality of the proof of cash module 120 and the proof of balance module 110. In this way, the integration module 115 can be configured to obtain and calculate aggregate data such as cryptographic token amounts, staked dollar amounts, fiat currency amounts, and other information stored in the native ledge repositories. In this way, the integration module 115 can be implemented as a backend service configured to perform aggregate or other calculations requiring both proof of cash and proof of balance inputs, and to provide them to the cryptographic ledger platform 100 and/or any other modules thereof. Calculation and retrieval of said data can include, but is not limited to, calculating a total claimed fiat value for a user upon execution of a hard fork, retrieval of multiple preliminary cryptographic token values and/or fiat values for purposes of enabling preliminary transactions (lien transactions, transfers, loans, etc.), and a variety of other operations.

In one or more embodiments, the external blockchain 160 can be optionally utilized to record evidence of ownership of cryptographic tokens in the cryptographic ledger platform 100. Users can record evidence of ownership for purposes of proof of funds verification, or can remove and lock funds entirely within the external blockchain 160. In order to remove funds, a payload of the transaction recorded on the external blockchain 160 can be used. Alternatively, simple movement of the token in the recorded address or proof of possession of a private key corresponding to the recorded address can be used. For example, an address corresponding to the external blockchain 160 can be initially generated. The cryptographic ledger platform 100 then records a transaction for that address in the external blockchain 160. The payload of this transaction includes a reference to cryptographic tokens locked in the native ledger repository (132, 134, 136). In order to move or unlock those funds, the user possessing private keys corresponding to the address can record a second transaction on the external blockchain 160 unlocking those funds or moving them back into a different address within the native ledger repository (132, 134, 136). Any number of different operation types can be executed based on predefined transaction types (e.g., op codes) of the cryptographic ledger platform 100.

The owner of a banknote, such as User A, may connect to the network via a smartphone, tablet, or other computing device. The device may transmit information about the banknote to the Proof of cash module 120, including information input by User A, as well as data captured by the sensors on User A's device. The Proof of cash module 120 may transmit instructions to User A and execute operations via User A's devices. In some embodiments, the Proof of cash module 120 may interact with two or more of User A's devices at the same time. The Proof of cash module 120 processes the sensor data from User A's device(s) to verify that User A possesses an authentic serialized banknote. This may include verification of not only the fact that the note is genuine, but also that its serial number has not been altered.

The Proof of cash module 120 may transmit that information to other nodes on the network, including to computers operated by third parties, such as e.g. User B's desktop, or any other suitable computing device. The outcomes of remote-verification attempts may be recorded as inputs in a digital ledger stored within the native ledger repositories 130 or remotely. In one embodiment, to fork a currency, the cryptographic ledger module 100 makes an entry in the ledger upon the first verification of each unique serialized banknote, and corresponding digital money is issued to the holder of that note. Where and how ownership of the forked money is recorded depends on how the system is configured. The cryptographic ledger platform 100 may record the forked money directly on a distributed blockchain, e.g. by issuing a token on the Ethereum virtual machine. However, this may be too slow for users, and the fees it incurs may exceed the value of some digitized banknotes. In one embodiment, the cryptographic ledger platform 100 first issues the money in a non-distributed ledger. Money on that ledger may be exported to the external blockchain 160, either to an address controlled by the owner of the money, or to an address controlled by the platform in a "hosted wallet" arrangement (e.g., in the native ledger repositories 130). Alternatively, digital money may be stored on the non-distributed ledger, while the integrity of that ledger is secured by storing certain cryptographic outputs on the external blockchain 160. For example, portions of the ledger (e.g., account balances, serial numbers of verified notes) may be hashed and then stored on the external blockchain 160. Likewise, User A and the cryptographic ledger platform 100 may publish public keys on the external blockchain 160, then use the corresponding private keys to create hash chains of debits and credits to User A's accounts on the ledger. In these embodiments, the speed and convenience of a centralized database are preserved, but Users can retain unforgeable proof of their account balances.

Many other implementations employing multi-signature wallets and/or smart contracts will occur to those skilled in the art. As an alternative or supplement to mobile verification, User A may also demonstrate possession of a specific serialized banknote by physically presenting it to a trusted verifier, an entity or institution whose representatives assess banknotes for others. The concept of a trusted verifier may be illustrated by a bank, but the same role can be filled by any group or person whose assessments are trusted by one or more other nodes on the network. It could be an exchange booth, a supermarket, a convenience store, or even a stranger providing on-demand mobile services. The trusted verifier may use a private key to sign messages on the network, including e.g. a message certifying that User A presented certain authentic serialized notes.

User A may also submit the banknote to a hardware verifier, a machine that proximately authenticates banknotes (e.g., using ultraviolet, magnetic, or infrared sensors) and determines their serial numbers (e.g., optically, magnetically, or via other encodings such as brail). Some ATMs and cash-sorting machines already possess these capabilities, and equivalent components can be added to legacy systems or included in new ones. The hardware verifier may use a private key to sign messages on the network, including e.g. an automated message that a banknote presented by User A was determined to be counterfeit. The machine may be stationary, towable, self-propelled, or incorporated into a vehicle, may be operated by humans or computers, and in some embodiments, may travel to fulfill requests from users. Multiple verifiers may share access to a permissioned ledger.

In some embodiments, the cryptographic ledger platform 100 may act as a certification authority, using a private key to sign messages issuing or revoking other verifiers' authority to issue digital money with their private keys. The cryptographic ledger platform 100 may also refer User A to a trusted verifier or hardware verifier if it us unable to adequately authenticate the banknote using the sensors on User A's mobile devices.

Figure 4:
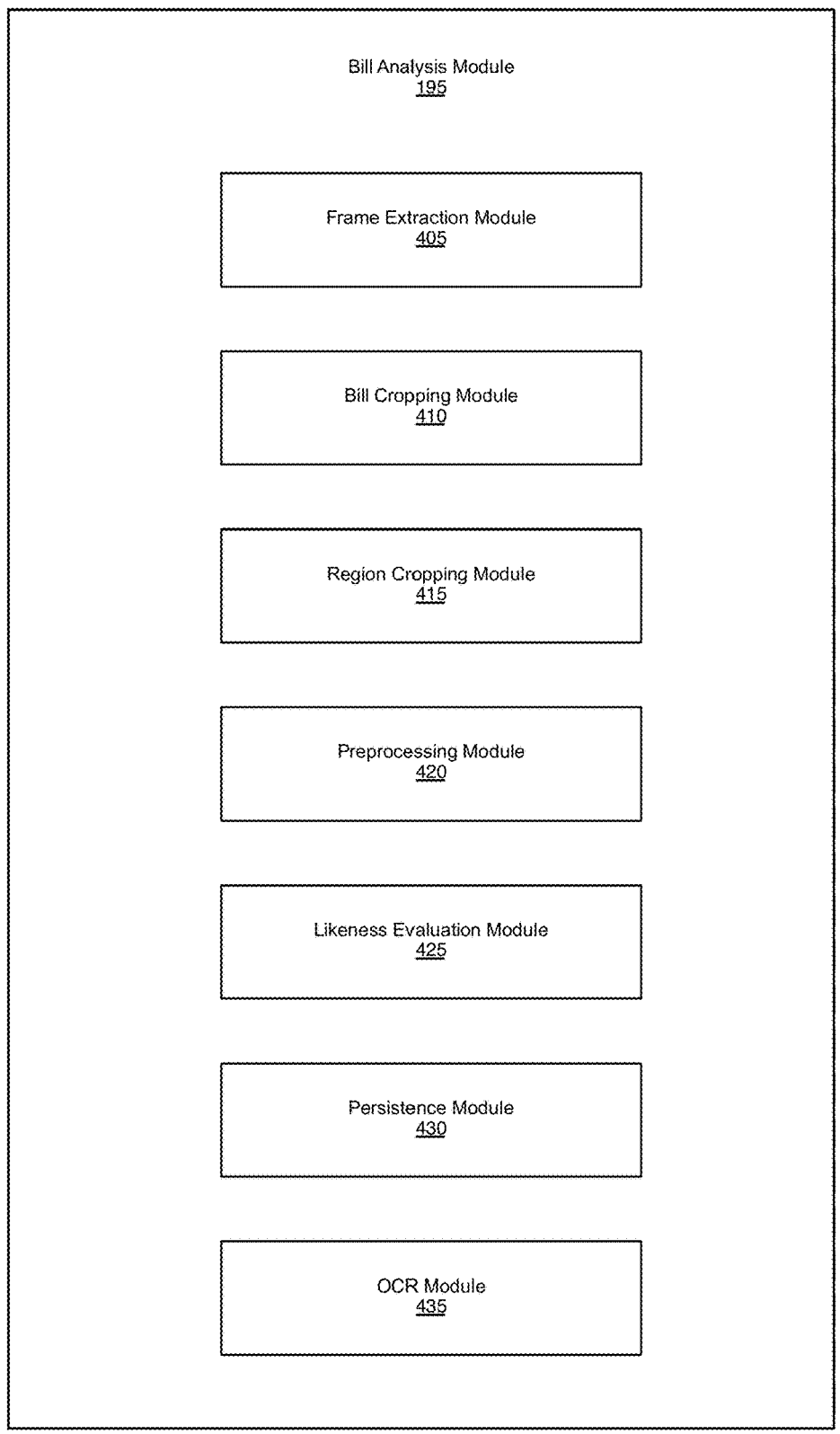

FIG. 4 shows a bill analysis module 195, in accordance with one or more embodiments. As shown in FIG. 4, the bill analysis module 195 has multiple components including a frame extraction module 405, bill cropping module 410, region cropping module 415, preprocessing module 420, likeness evaluation module 425, persistence module 430, and an optical character recognition (OCR) module 435. Various components of the bill analysis module 195 can be located on the same device (e.g., a server, mainframe, virtual machine, cloud-based service and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments of the invention, the frame extraction module 405 includes functionality to extract frames as data points from media captured in the process of performing remote verification of banknotes. These frames can be utilized as input data for the processes of anti-counterfeiting and anti-spoofing processes of the platform.

In one or more embodiments of the invention, the bill cropping module 410 includes functionality to identify the presence and individual boundaries of one or more banknotes within an image such that each portion of an image that appears to depict a banknote can be algorithmically extracted from the other portions of the image.

In one or more embodiments of the invention, the region cropping module 415 includes functionality to identify the presence and individual boundaries of one or more regions of a banknote, including but not limited to regions containing denomination identifiers (e.g., the corners of a bill, the portrait region of a bill), regions containing serialization information (e.g. serial numbers, series numbers, printing dates, names and signatures of government officials), regions containing anti-counterfeiting features (e.g., security threads, seals, micro-printed areas, watermarks, holograms) or regions selected for anti-spoofing verification (e.g., bill areas chosen for illumination, folding, or creasing), such that each region of interest within the portion of an image depicting a banknote can be algorithmically extracted from the other regions therein.

In one or more embodiments of the invention, the pre-processing module 420 includes functionality to alter the characteristics of an image or image section such that one or more altered versions may be processed more accurately and/or efficiently than the unaltered version by one or more of the other modules. The alteration techniques may include but are not limited to, either separately, in sequence, or in parallel, modifications of image size, dimensions, color, brightness, sharpness, contrast, geometry, morphology, and/or noise filtering or insertion.

In one or more embodiments of the invention, the likeness evaluation module 425 includes functionality to calculate the strength of the resemblance between one or more received images and/or image sections and one or more real or composite exemplars of various authentic and counterfeit banknotes and/or banknote regions, such that a determination may be made algorithmically regarding whether the threshold for a match has been satisfied. In one or more embodiments of the invention, the algorithmic comparisons performed by the module may include the degree of similarity, as measured by one or more variables or trained functions, between sensor data and exemplars associated with authentication events or inter-frame object persistence.

In one or more embodiments of the invention, the persistence module 430 includes functionality to analyze a sequence of frames and determine whether the continuous presence of a banknote or region of a banknote can be verified throughout the sequence. Techniques for detecting a persistence violation may include, but are not limited to, mapping and tracking points on the surface of the object or region to determine its location and orientation and/or detecting anomalous changes in its characteristics, the background surrounding it, or the frames themselves.

In one or more embodiments of the invention, the OCR module 435 includes functionality to recognize the location, identity, and characteristics of printed or handwritten text appearing on banknotes or banknote regions.

FIG. 7 shows structural details of a user device that interacts over the network with the cryptographic ledger module 100 in FIG. 1 to provide trustless peer-to-peer in person cash conversion, deposit, withdrawal, and delivery. They should be understood in relation to one another, since they are depicted in a compatible configuration. Many components known to those skilled in the art have been omitted to avoid obscuring the invention (e.g., memory, operating system, sensors, modules for remote verification, etc.).

Starting with the user device in FIG. 7, the identity proof module contains or interfaces with one or more authentication factors that the user employs to verify his or her identity. These factors may include passwords, digital tokens, physical tokens, asymmetric private keys, device-collected biometrics (e.g., facial recognition or fingerprints on smartphone) externally collected biometrics (e.g., gait analysis from user's exercise tracker), credentials on other networks (e.g., social-media account), email or SMS verification codes, access to other devices (e.g. Bluetooth connection to user's smart-watch), substitutes evident to those skilled in the art, and/or combinations of the above.

The location reporting module determines the user device's location and reports that location to the cryptographic ledger platform 100 (of FIG. 1) and/or other users' devices according to the specific protocol being executed. location may be determined using conventional means for mobile services (e.g. triangulation via GPS, cell-tower signals, Wifi networks, etc.), decentralized Proof-of-Location (e.g., FOAM protocol, Platin, etc.), and/or novel methods detailed in this disclosure.

The exchange offer submission module transmits an offer from the user to the cryptographic ledger platform (of FIG. 1) to meet in person for the exchange of currency with another user. The payloads for conveying this information may be transmitted using the wrappers, networking protocols, and transmissions channels known to those skilled in the art (e.g., TCP/IP, RINA, LTE, GSM, SMS, MMS, etc.) In some embodiments, both exchange offer submission payloads and other transmissions may be shared locally with another node (e.g., via NFC, WiFi, Bluetooth, Ultrasound, QR-code scan, etc.) and then transmitted by that network to the cryptographic ledger platform 100 of FIG. 1, or other modules of the systems disclosed herein. In most embodiments, the components necessary for data broadcast and receipt will be located in a module or module(s) that can be accessed as needed by the exchange offer submission module and other modules on the user's device.

Within the exchange offer submission module there is a currency specification module, which allows a user to input a description of the money the user wishes to exchange. The currency specification module contains a desired currency input module, which allows the user to specify which currency or currencies the user can receive in an exchange, the possessed currency input module, which allows a user to specify the currencies the user has available to provide others in an exchange (including, in some embodiments, money the user does not yet possess but can access). The inputs of those two modules are qualified by the substrate specification module, which allows the user to differentiate between monetary substrates (e.g., electronic fiat funds vs. cryptocurrency vs. printed fiat money vs. cryptocurrency virtually embedded in printed fiat money), and a quantity specification module, which allows an amount or range to be specified for units of a currency in a given substrate. (e.g., exactly 75, 80-120, ≥500, etc.) Although not shown in FIG. 7, some embodiments may include a "denomination specification module" allowing users to restrict which denominations of a printed currency are designated by the input (e.g., only 20s, no bills≥50, etc.).

In some embodiments, the desired currency input and possessed currency input modules are linked together so that a user designates a discrete pairing for exchange. For example, the user may possess 10,000 units of "USDk" (cryptographic currency associated with the US Dollar) embedded in 100 printed US Dollars, and her desired currency may be ≥10,000 "EURk" (cryptographic currency associated with the Euro) embedded in ≥100 printed Euros. This linkage may also be expanded to multiple currencies, so that rather than a single discrete pairing, multiple acceptable matches are captured by the same input. In other embodiments, the linkage may be omitted entirely, accommodating users who wish to view all potential exchange partners and the various forms of money they are offering. In one embodiment, the degree of linkage is controlled by the user within the application.

The exchange offer submission module also contains a meeting conditions module, which allows users to further restrict the exchanges they are offering to participate in. This module contains five submodules. The rate & fee specification module allows a user to specify a minimum or maximum exchange rate and/or a minimum or maximum fee for participating in the exchange. In some embodiments, users may specify a static exchange rate (e.g., >$1 USD-to-USDk), a dynamic exchange rate (e.g., market rate for USD to USDk on Exchange X), a static spread (e.g., >$0.15 spread per dollar relative to market rate on Exchange X), a dynamic spread (e.g. >25% profit per dollar relative to market rate on Exchange X), an absolute margin (e.g. total profit>$20 measured by market rate on Exchange X), a fee (e.g. ≥flat charge of $20), or a combination. In some embodiments, rate & fee specification values may be conditioned not only on the inputs to the currency specification module, but also the other inputs in the meeting conditions module (e.g., varying rates and fees according to the type and quantity of money exchanged, the timing and location of the meeting, whether delivery to a third party is required, etc.).

In one or more embodiments, users may not control the exchange rates that are employed for transactions, and the cryptographic ledger platform may instead dictate rates based on market prices transmitted from one or more digital exchanges. The prices employed may be fixed at various points in the transaction process, depending on the embodiment (e.g., when the exchange is proposed vs. when the parties meet). In embodiments where the prices are fixed in advance of the meeting, special rating penalties may be imposed on parties whose cancelation of an exchange corresponds to significant shifts in the price of one or more currencies involved in the proposed transaction.

The geographic condition input module allows users to restrict the locations for in-person exchange. (e.g., meeting must take place at current or specified location, within a specified distance of current or specified location, on the route to a specified location from a second specified location, etc.) In one embodiment, multiple location restrictions can be combined to express fine-grained preferences (e.g., meeting must take place inside a Starbucks within 1 mile of a Wells Fargo ATM inside the United States with <10 minute-detour on current route to Tijuana, Mexico.) Likewise, users may specify geographic categories that will apply around the world (e.g., only in airports, never at bus terminals, only inside banks, etc.). In some embodiments, users may specify attributes of meeting locations based on data provided by the network or external sources. (e.g., only locations with a >3.5 in-app rating, never in municipalities with a per-capita robbery rate greater than a specified rate, only in suburbs with median home value>a specified amount).

The temporal condition input module allows user to restrict the time for in-person exchange (e.g., ASAP, before or after a specified time or date, less than a specified time after visiting an automated teller machine, more than a specified time since last exchange, only when the app is activated, never when accelerometer indicates user is on train, etc.). In some embodiments, temporal conditions may be specified relative to data in other applications or databases (e.g., only when inside international airports and >5 hours until flight departure).

The counterparty condition input module allows users to restrict the identity of the other user or user(s) participating in the exchange (e.g., only users>4.0 in-app rating, only users with verified identities, only users with completed criminal background checks, only bonded users, only users age>21, etc.). In some embodiments, counterparty conditions may be geographic and/or dynamic (e.g., when I am inside a mall, only users inside the same mall). Likewise, the counterparty condition input module may sometimes be used to restrict exchange to a specific individual, such as by inputting that individual's phone number, email, name, or other identifying information. In some embodiments, the application may provide a long-term or limited-use code or other identifier to the potential counterparty, who communicates it to the user, and the user inputs that code for processing by the counterparty condition input module, which then matches the user and the counterparty (e.g., a Taxi driver instructs a passenger to input the driver's assigned provider number to initiate an exchange while en route to the airport).

The third-party specification module allows a user to specify a cash recipient other than the user. In some embodiments, the identity of the third party may be designated using, for example, name, phone number, email address, postal address, and etc. In some embodiments, the third party is not directly identified, but an acceptance code is provided to the user for conveyance to the third party. Whether delivery details such as time and location are specified by the user or arranged by the third party may vary between or within embodiments.

The proposal response module transmits user-determined responses to proposals by the cryptographic ledger platform (of FIG. 1) for exchanges with other users that satisfy some or all conditions of a submitted offer. The acceptance module allows a user to authorize the meeting without qualifications. in some embodiments, acceptance may be provided automatically according to rules derived from conditions in the currency specification and meeting conditions modules. The counter-proposal module allows a user to request that one or more terms of the proposal be modified. In some embodiments, counterproposals may be automatically drafted or transmitted using rules derived from conditions in the currency specification and meeting conditions modules. when a counter-proposal is forwarded by the cryptographic ledger platform, the modified proposal may be adopted through the acceptance module.

The instruction receipt module displays commands or requests transmitted to the user from the cryptographic ledger platform (of FIG. 1), including information about where to meet the counterparty, what safety precautions to take, etc. In some embodiments, instructions for the user may be received by the device, stored until a condition has been satisfied (e.g., arrival at meeting location, receipt of funds from counterparty, verification of identity by the counterparty, etc.), and then displayed to the user.

The exchange protocol module interfaces with the cryptographic ledger module 100 of FIG. 1 to execute the protocols that enable cash to be exchanged securely. The meta-serial reporting module transmits the meta-serial numbers of the user's bills to the platform when they are captured in response to commands from the instruction receipt module. The certificate receipt module accepts and stores pre-exchange and post-exchange ownership certificates issued by the platform. The counterparty verification module allows the user to confirm recognition of the counterparty, to request assistance in verifying the counterparty's identity, or to abort the transaction by indicating a discrepancy in the counterparty's identity. The tender approval module allows the user to indicate that, upon counting and inspecting the notes tendered by the other party, that the appropriate cash has been provided. A tender-approval message is transmitted to the cryptographic ledger platform, so that the transaction can be consummated.

The post-transaction rating module allows the user to submit feedback to the cryptographic ledger platform. In some embodiments, users may submit feedback after any transaction, while in other embodiments, only completed transactions or transactions canceled under specified conditions (e.g., after 3 minutes) may be included. The counterparty rating module allows users to rate the counterparty in the exchange. In some embodiments, ratings may be differentiated by service type (e.g., cash receipt vs. cash provision), provided for multiple service dimensions (e.g., timeliness, friendliness, etc.). The location rating module allows users to separately rate the meeting location, disaggregating their satisfaction with that component of the transaction from their perception of the counterparty. In some embodiments, ratings for locations may also be multi-dimensional (e.g., cleanliness, safety, convenience, etc.) Likewise, location ratings and their sub-dimensions may be disaggregated by factors such as time of day, day of week, time of year, temperature, weather, etc. In some embodiments, user and location ratings may be simple averages. In other embodiments, user and location ratings may be weighted averages (e.g., by rating of rater), and inputs other than user ratings may be included to adjust ratings upwards and downwards, including objective metrics. (e.g., transaction-completion percentage, tender rejection frequency, time-to-meeting percentile, etc.)

In one or more embodiments, the location rating module on user devices may interface with a dedicated location selection module (not shown) on the cryptographic ledger module, which incorporates user feedback to modify baseline estimates of the safety of various potential locations from external data, and then to choose optimal safe meeting locations near users. This data may include data about location types (e.g., coffee shop, park, police station, train station, plaza, etc.), the hours of surrounding businesses, the locations of prior crimes, presence of guards, artificial and natural lighting, and other similar factors. In some embodiments, if a user does not feel comfortable with the chosen location, the user can use the device to transmit a signal requesting relocation of the transaction, subject to approval of the other party. If the other party does not agree, the user who expressed discomfort may cancel the transaction or choose to proceed with it. These expressions of discomfort may be incorporated into the location-rating system as an optional user selection or input.

Although the components of FIG. 7 may be described in some embodiments as single modules executing on a single device, it should be noted that they may be placed partially or entirely elsewhere in the stack. While the examples depict an application enabling users to manually select a country and type in a bill's serial number, the search module 301 of FIG. 3 could be deployed with a country recognition and region cropping/OCR module, so that users could query the proof of cash module 120 merely by photographing bills.

Although FIG. 7 does not show any external currency-validation sensors attached to the mobile device, such sensors may be added to enhance authentication, equivalent to a hardware verifier transmitting data to the network through the user's mobile device and private key.

Figure 8:
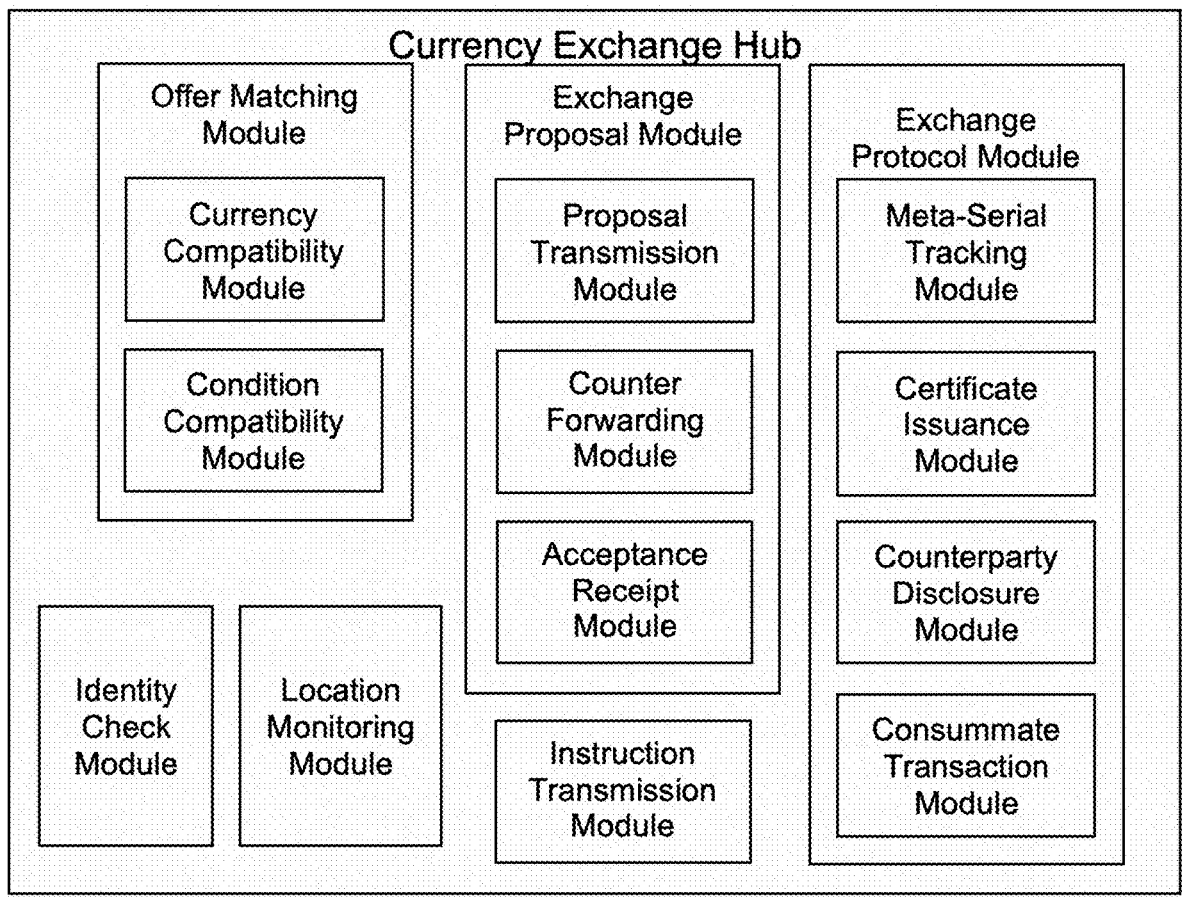

FIG. 8 shows an expansion of the currency exchange hub 190 of FIG. 1, in accordance with one or more embodiments.

In one or more embodiments of the invention, the currency exchange hub 190 enables trustless in-person currency exchanges between users. As shown in FIG. 8, the currency exchange hub 190 has multiple components including an offer matching module with a currency compatibility module and condition compatibility module, an exchange proposal module, an exchange protocol module, an identity check module, and a location monitoring module, and an instruction transmission module. The exchange proposal module includes a proposal transmission module, a counter forwarding module, and an acceptance recipient module, and the exchange protocol module includes a meta-serial tracking module, a certificate issuance module, a counterparty disclosure module, and a consummate transaction module. Various components of the currency exchange hub can be located on the same device (e.g., a server, mainframe, virtual machine, cloud-based service and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

The identity check module verifies the authentication credentials transmitted to the exchange hub by user devices. The structure and function of the module necessarily depends on the credentials employed in the corresponding embodiment of the identity proof module on user devices. In one embodiment, the identity check module or a parallel module within the exchange hub contains an authentication credential for the platform, such as a private key, so that messages from the platform may be authenticated on user devices.

The location monitoring module of the exchange hub tracks the positions of user devices transmitted via their location reporting modules. In one embodiment, this tracking is performed only when knowledge of a user's location is required by the exchange hub. (e.g., tracking may be disabled when a provider's status is set to unavailable). In some embodiments, users whose locations are not being actively monitored by the platform may opt to receive proposals for designated geographic areas (e.g., the town of Arlington, Va.), and may then opt-in to share their location with the location monitoring module if they wish to accept a proposal within one such area.

The offer matching module identifies users whose indicated requirements permit a mutually satisfactory in-person currency exchange. It contains two submodules: a currency compatibility module, which compares the inputs from the user devices' currency specification modules, and a condition compatibility module, which compares the inputs from the user devices' meeting conditions modules. These comparisons may be performed using constraint satisfaction algorithms and other techniques. In one embodiment, the offer matching module will also identify users whose requirements are not fully compatible so that one or both users may be prompted to relax one or more offer requirements.

The matches identified by the offering matching module are forwarded to the exchange proposal module, which contains three submodules. The proposal transmission module composes and sends proposed in-person exchange transactions to users. In some embodiments, selection of a meeting location may be performed by the proposal transmission module, while in other embodiments that function may be deferred to the instruction transmission module. The counter forwarding module transmits counter-offers between users when modifications to the terms of a proposal are requested. The acceptance receipt module confirms that a meeting must be arranged upon receiving consent of both parties, and forwards the relevant data outside of the exchange proposal module to the instruction transmission module.

The instruction transmission module composes and sends the directives that are collected and displayed on user devices by the instruction receipt module. These instructions may be composed not only during the initial arrangement of a meeting, but as needed during all stages of a transaction. In some embodiments, many instructions are preloaded within the application or transmitted to a device with high connectivity significantly in advance of display to a user, and the instruction transmission module sends only the appropriate code to trigger display of a given instruction, or some small quantity of additional information that must be inserted into the instruction to render it meaningful. This minimizes the bandwidth required to transmit instructions to users during periods of suboptimal network access. (e.g., once a user has traveled to a meeting location in a rural area with poor cell service).

The exchange protocol module contains four modules that enable secure trustless exchanges to be performed on the network. The meta-serial tracking module logs the meta-serial numbers transmitted by cash-possessing parties in advance of exchange and tracks the ownership of the bills. For purposes of this disclosure, "cash possessing party" refers to a party who possesses cash at the outset of the exchange, even though that possession may cease temporarily or permanently through interaction with a counterparty. The ownership information managed by the meta-serial tracking module is passed to the certificate issuance module so that pre-exchange and post-exchange ownership certificates can be issued referencing the appropriate meta-serial numbers.

In one or more embodiments, the counterparty disclosure module transmits the identity of the cash-possessing party to the cash-requesting party upon receipt of a counterparty verification transmission from the cash-possessing party. In some embodiments, this information may be transmitted in advance in encrypted form, and upon counterparty verification the counterparty disclosure module transmits the key required for decryption. The advantage of such an implementation is that large files, such as, e.g., high-resolution images of the cash-possessing party, may be shared during periods of high-speed connectivity via e.g. WiFi, and the decryption key may then be transmitted efficiently even when a meeting location has only low-speed connectivity. In some embodiments, the decryption key may be transmitted in advance to the cash-possessing party, so that the cash-possessing party can choose to locally prove his or her identity to the cash requesting party.

In one or more embodiments, the transaction consummation module verifies receipt of an authentic tender-approval message and finalizes the transaction by modifying all relevant digital ledgers, including electronic balances that must be adjusted to in correspondence to the transfer of physical cash. It also prompts the meta-serial tracking module to reassign ownership of the relevant meta-serialized notes, and in turn for the certificate issuance module to issue a post-exchange certificate documenting the change of ownership upon transaction consummation.

The functionality of the exchange hub or other components of FIG. 1 disclosed herein may be referred generally as being executed by the "platform", i.e., the cryptographic ledger platform 100, without specifying the components involved. Other components may be employed by the exchange hub when supervising in-person currency exchanges. Associated functionality may be performed by the platform, such as blockchain interface and off-chain interface modules used to carry out balance adjustments mandated by the transaction consummation module.

FIGS. 1-8 must be understood with reference to one another, since the systems are depicted in a compatible configuration. Certain components are shown on the server of the proof of cash module 120, particularly those related to processing captured images, which in some embodiments could be located on the user's mobile device. Whether sensor data is processed on the user's device before being transmitted to the server depends on many factors understood by those skilled in the art, including, bandwidth, processing power, and threat model.

The nodes shown in FIGS. 1-8 are merely illustrative, and are not intended to restrict the scale or diversity of networks that can embody various aspects of the invention. The actual network may comprise an arbitrarily large number of nodes, including nodes that are themselves networks, and more than millions of different ledgers and blockchains. The native ledger repositories 130 and external blockchain 160 depicted in the disclosure can be substituted for another database or combination of databases, including centralized, permissioned, and distributed virtual databases, unrestricted by a particular consensus protocol, hashing algorithm, or data structure. (e.g., stateful or stateless; accounts vs. UTXO) Some nodes may also be implemented as software agents on a virtual machine.

Although the components of the systems disclosed herein are depicted as being directly communicatively coupled to one another, this is not necessarily the case. For example, one or more of the components of the systems may be communicatively coupled via a distributed computing system, a cloud computing system, or a networked computer system communicating via the Internet.

Although only a single system may be illustrated as a module (e.g., proof of balance module 110), it should be appreciated that this one system may represent many computer systems, arranged in a central or distributed fashion. For example, such computer systems may be organized as a central cloud and/or may be distributed geographically or logically to edges of a system such as a content delivery network or other arrangement. It is understood that virtually any number of intermediary networking devices, such as switches, routers, servers, etc., may be used to facilitate communication.

Figure 9:
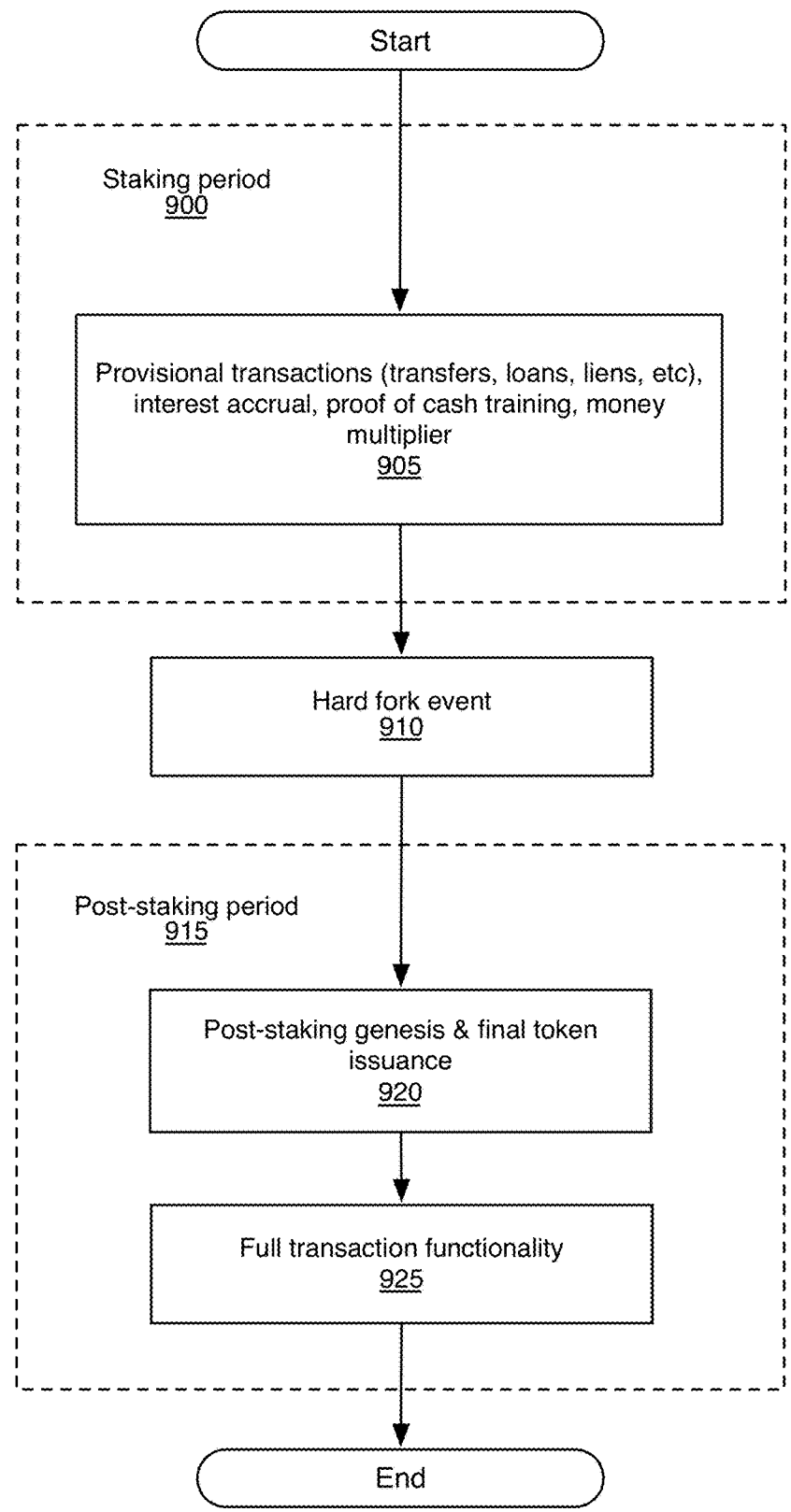
FIGS. 9 and 10 show example depictions of flowcharts, in accordance with one or more embodiments.

FIG. 9 shows a flowchart of a method and timeline for bootstrapping a cryptographic currency. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 9 should not be construed as limiting the scope of the invention.

The process depicted by FIG. 9 involves designating a staking period 900, i.e., a "soft fork" period followed by a post-staking period 915, i.e., a "hard fork" period. The staking period can be a predefined duration of time or a predefined number of transactions. Any other triggering mechanism(s) can be utilized to designate the start and end of the staking period, in accordance with various embodiments.

In STEP 905, staking of fiat currency bills and balances are commenced as a means of "claiming" cryptographic currency tokens "trapped" within the fiat banknotes and/or balances of platform users. This step represents any number of non-linear and asynchronous activities, including proof of cash and proof of balance functionality described herein. During this STEP, although the cryptographic tokens that are staked may be "trapped" within the associated parent currency bills and/or balances, certain provisional transaction types may be enabled, each with varying degrees of functionality and risk for users of the platform. Money multiplier sweepstakes, interest accrual, and provisional payments, transfers, loans, and liens are among the transaction types that may be enabled only within the staking period, in accordance with various embodiments. Other embodiments allow for continuance of certain staking period transaction types during the post-staking period. FIGS. 30-38 depict example methods of functionality that may be enabled during and after the soft fork period.

During the soft fork period, machine learning and artificial intelligence models may gather training data from proof of cash executions by users of the platform. In this way, the proof of cash module can be configured to train the various anti-spoofing and anti-counterfeiting models using real world data, in order to prepare for final verification to occur upon execution of the hard fork.

In STEP 910, a hard fork event occurs, after which the platform enters the post-staking period (STEP 915). Execution of the hard fork event may be based on a particular block height of a decentralized cryptocurrency such as Bitcoin. For example, the hard fork event may be tied to a particular Bitcoin block height, such that the hard fork is deemed to have occurred upon mining of that particular block in the Bitcoin blockchain. In one or more embodiments, the hash value of that block can then be incorporated into a broadcasted transaction in the same external blockchain or in the first transaction or genesis block of a native blockchain within the platform to indicate that the hard fork event has occurred. In STEP 920, final token issuance is triggered by the platform, such that the platform begins the process of finalizing provisional transactions and issues final cryptographic tokens on the native blockchain repositories for all claimed amounts.

The hard fork event may trigger the cryptographic ledger platform to begin a number of different processes, including prompting users of the platform to perform final verification of claimed banknotes in embodiments where proof of cash functionality is implemented. In one or more embodiments of the invention, upon execution of the hard fork, no further "claiming" of cryptographic currency tokens trapped within fiat banknotes and balances can occur. In other embodiments, such claiming can continue to occur with a diminishing rate of conversion for each unit of fiat currency to cryptographic currency. After the hard fork event and associated processes are complete, full transaction functionality of the platform is enabled in STEP 925. Full transaction functionality can include withdrawal of funds to external blockchains, downloading of private keys, unbridled movements of funds between addresses, and/or implementation of op codes that enabled full computational transaction functionality by the platform (e.g., a Turing complete scripting language, etc.).

Figure 10:
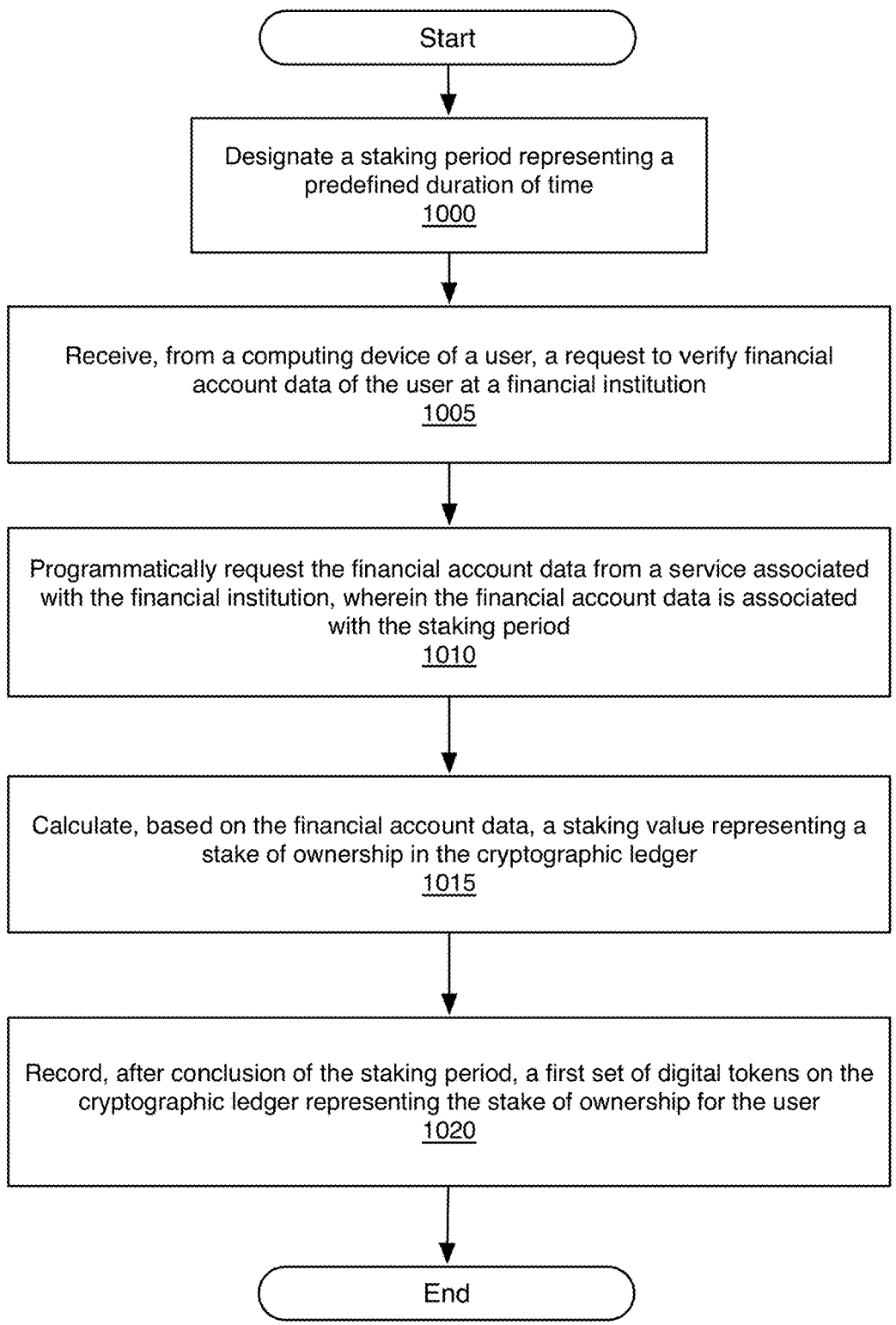

FIG. 10 shows a flowchart of a method for bootstrapping a cryptographic currency based on stake in a fiat currency. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention.

In STEP 1000, a staking period representing a predefined duration of time is designated. The staking period may be codified by a cryptographic ledger platform (e.g., cryptographic ledger platform 100 of FIG. 1, above) in a native ledger repository, within an external blockchain, or through any mechanism for designating a duration of time. Upon commencement of the soft fork, the staking period begins and users are permitted to claim cryptographic currency tokens using proof of cash and/or proof of balance functionality enabled by the cryptographic ledger platform.

In STEP 1005, during the soft fork period, a proof of balance request is received from a user device. The proof of balance request is for financial account data of the user at a financial institution to be verified using one or more credentials of the user. The credentials can be obtained and utilized to authenticate the user using any mechanism authentication, including delegated authentication (e.g., OAuth 2.0, etc.).

In STEP 1010, the financial account data is programmatically requested from a service associated with the financial institution. The financial account data must meet a set of criteria defined by the platform in order to be eligible for proof of balance staking. Examples of such criteria can include, but are not limited to, temporal requirement that the balance(s) correspond to the predefined staking period, specified currency and/or equity types that are eligible for staking (e.g., US Dollar amounts or equities traded in US Dollars, Euro amounts, etc.), types of financial data (e.g., daily average balance information, etc.), and more.

In STEP 1015, a staking value is calculated based on the financial account data. The staking value represents a stake of ownership in a cryptographic ledger of the platform. This may be a percentage or unit amount, e.g., "token", in the cryptographic ledger. The proof of balance module of the platform may, in some embodiments, use the financial account data to calculate intermediary financial account data in a consistent format and unit of measure, and then use that intermediary data in order to calculate the staking value. For example, the financial account data may be utilized to determine an average daily balance of a user's account, which is then used to calculate the staking value.

In STEP 1020, upon conclusion of the staking period, a first set of digital tokens are recorded on the cryptographic ledger. The tokens represent the stake of ownership calculated for the staked financial data in STEP 1015, but may not be the only tokens allocated to this particular user. For example, the user may have staked additional amounts of currency during the staking period, or may have participated in one or more money multipliers during the staking period that increased his stake of ownership in the ledger. Thus, the final amount of digital tokens recorded in the ledger for this user may include additional amounts recorded in the same cryptographic address or different addresses, in accordance with various embodiments of the invention.

Figure 11:
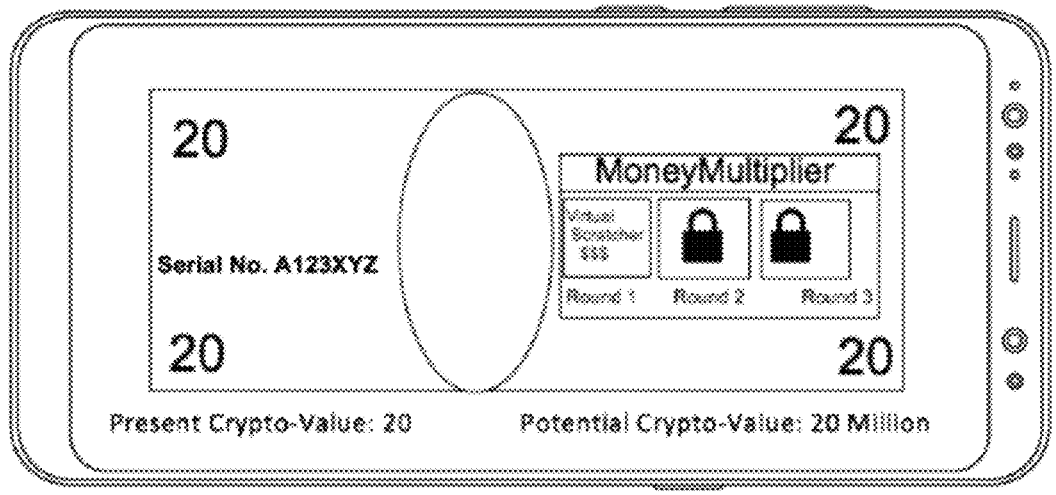
FIGS. 11-17, 18A, 18B, 19, and 20 show example usages of mobile devices, in accordance with one or more embodiments.
Figure 11:
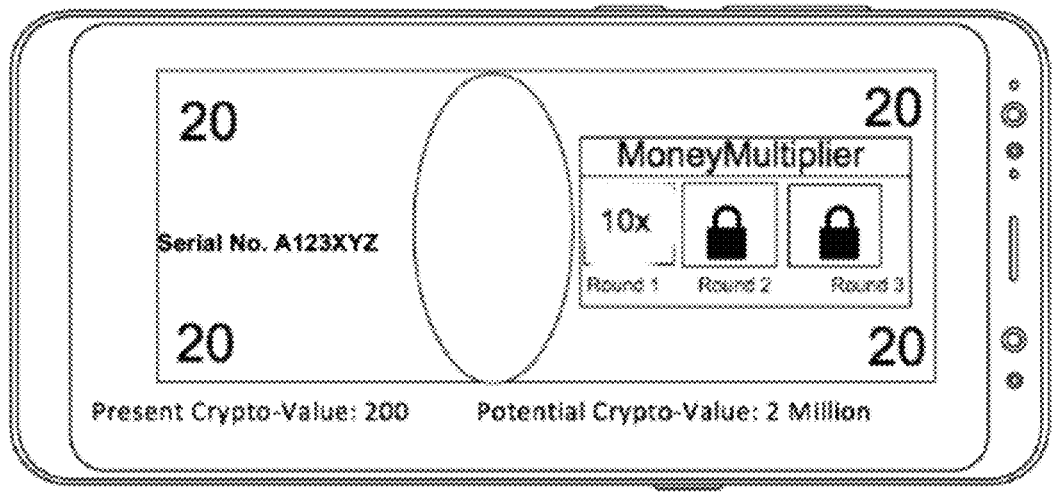

FIG. 11 shows a mobile device running an application on the network during soft fork period. In this example, during the soft fork, continuity with the parent currency is maintained because all authentic notes are guaranteed to contain at least the quantity of cryptographic tokens corresponding to their face value. However, some notes may be embedded with additional cryptographic tokens.

In the example of FIG. 11, the prize value of a given bill is determined by assigning cumulative multipliers (e.g. 1×, 2×, 5×, 10×, 20×, 50×, 100×) to its face value. In this example, during Round 1 of the sweepstakes contest, users may check the value of the first multiplier on a bill, but not the values of the next two multipliers. During each subsequent round, another multiplier is revealed. In the final round, all multipliers are viewable by users, so that a bill's sweepstakes value can be determined with certainty. The multi-staged disclosure of the sweepstakes value of the bills smooths out the information asymmetry that early adopters would otherwise enjoy, ensuring that sweepstakes rewards are fairly distributed as the public begins adopting the network during the soft fork.

Various interfaces may be employed for applications that enable users to check the available information about a bill's sweepstakes value. In the embodiment depicted by FIG. 11, the multipliers for a given note revealed to the user via the addition of a simulated "scratch-off" or "scratcher" lottery ticket to the note. In one simple implementation, a viewfinder is displayed to users to assist them in pointing their device's camera at a banknote, but once the bill's meta-serial number is recognized the application switches to a separate screen depicting the bill in a fixed position with the overlaid scratcher panels. In a more sophisticated augmented-reality implementation, the scratcher panels may be dynamically overlaid on the bill within the camera viewfinder itself. In either version, when the user scratches off the virtual scratcher covering and the underlying multiplier value is revealed, the present and potential sweepstakes value of the note may be immediately updated on the screen. In some embodiments, video clips, sound effects, vibrations, and other audio, visual, and tactile responses may be triggered on the user's device to denote certain desirable or undesirable alterations of a bill's sweepstakes value.

In the device illustration of FIG. 11 labeled "Before Scratching", the first-round value of the serialized bill has not been revealed. In the device illustration of FIG. 11 labeled "After Scratching", the user has rubbed his or her finger on the screen, removing the virtual scratch-off panel to reveal a "10×" value hidden below. The present value has increased from 20 to 200, based on the 10× multiplier, while the potential value has decreased from 20 Million to 2 Million, because a 100× multiplier is no longer possible in the first round. The specific prize amounts and multipliers are, of course, purely illustrative, as the underlying technology can support arbitrary sweepstakes sizes and formats.

In one preferred embodiment, the interfaces shown in FIG. 11 may be supplemented with two buttons, one labeled "Save" and the other, "Spend." By selecting "Spend," the user indicates an intention not to retain the serialized note during the soft fork. By selecting "Save," the user indicates an intention to retain the note throughout the soft fork and to upload the cryptographic tokens embedded therein upon the transition to the "hard fork."

Figure 13:
Figure 13:
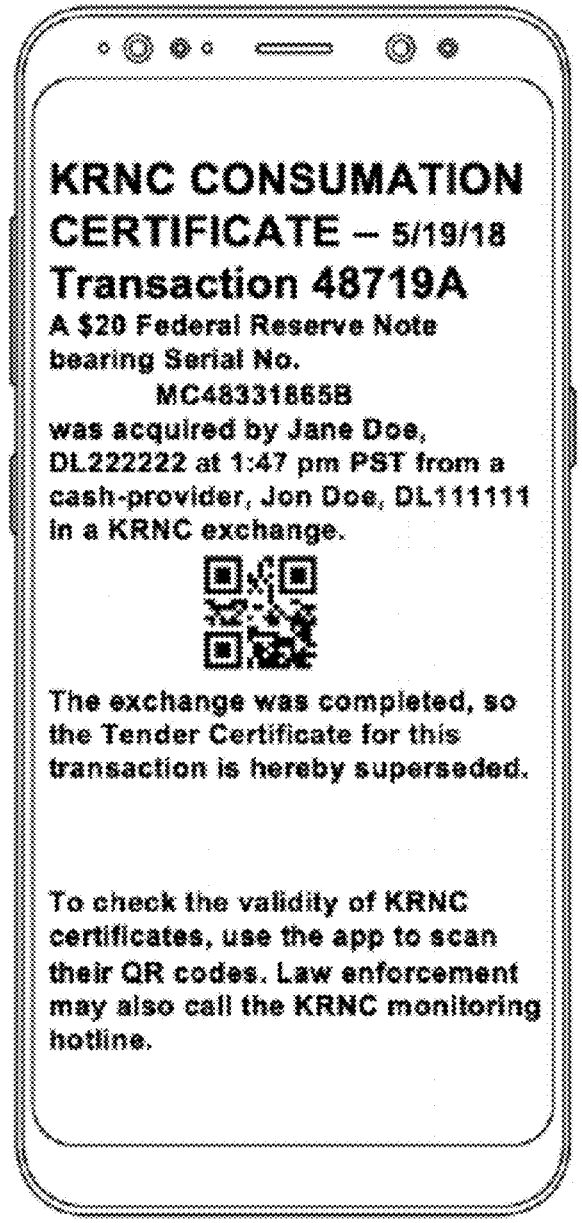

FIG. 13 depicts pre-exchange and post-exchange ownership certificates issued by the cryptographic ledger platform and displayed on a party's mobile device. The pre-exchange certificate is shown in the screenshot of the mobile device labeled "Pre-Exchange" and the post-exchange certificate is shown in the screenshot of the mobile device labeled "Post-Exchange". The depicted certificates each include type (i.e., pre- or post-exchange), the date of issuance, the transaction number, identifying information for the bill (i.e., currency+denomination+serial number), the identities of both parties to the transaction, a cryptographic signature embedded in a QR code, and instructions to the reader for interpreting and verifying the certificate.

The certificates pictured in FIG. 13 are illustrative, not restrictive, as the layout and content of certificates may vary significantly in particular embodiments. For example, the exact time of issuance rather than merely the date may be included, as may the date, time, and location of the planned or completed exchange. An individualized human-readable identifier may be displayed for each certificate, rather than merely an alphanumeric code for the transaction. In the depicted embodiment, the identities of the parties are documented using their names and driver's license numbers, but other forms of identification may be employed. (e.g. SSN, DoB, facial photograph, fingerprint, mobile-device serial number, etc.) For simplicity, only a single meta-serialized note is identified in FIG. 13's certificates, but most embodiments will identify multiple notes, either in human or machine-readable form.

Figure 26:
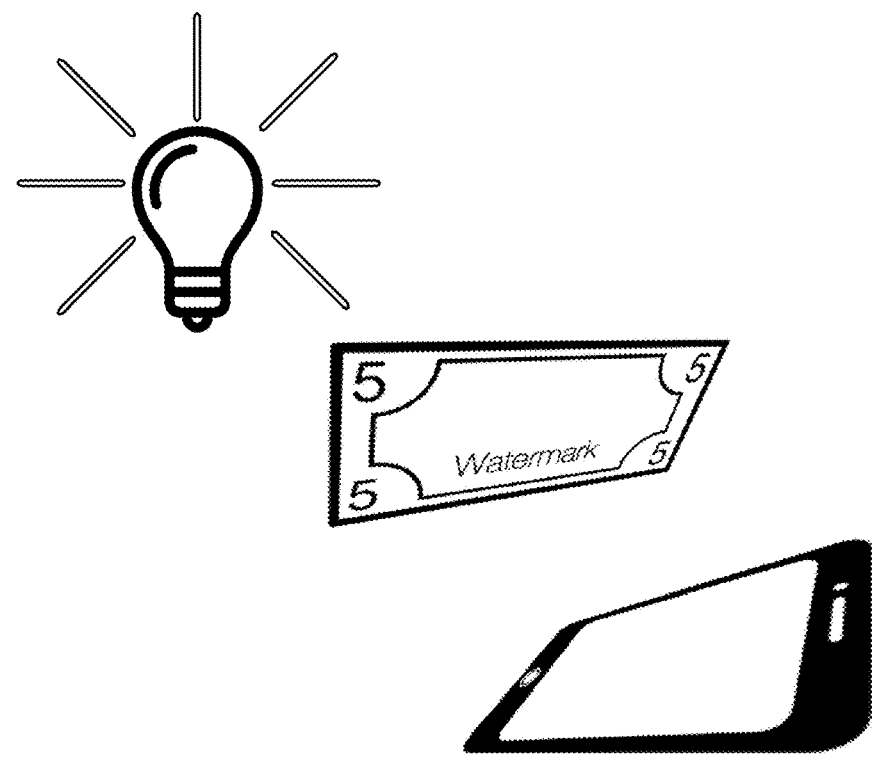
Figure 26:
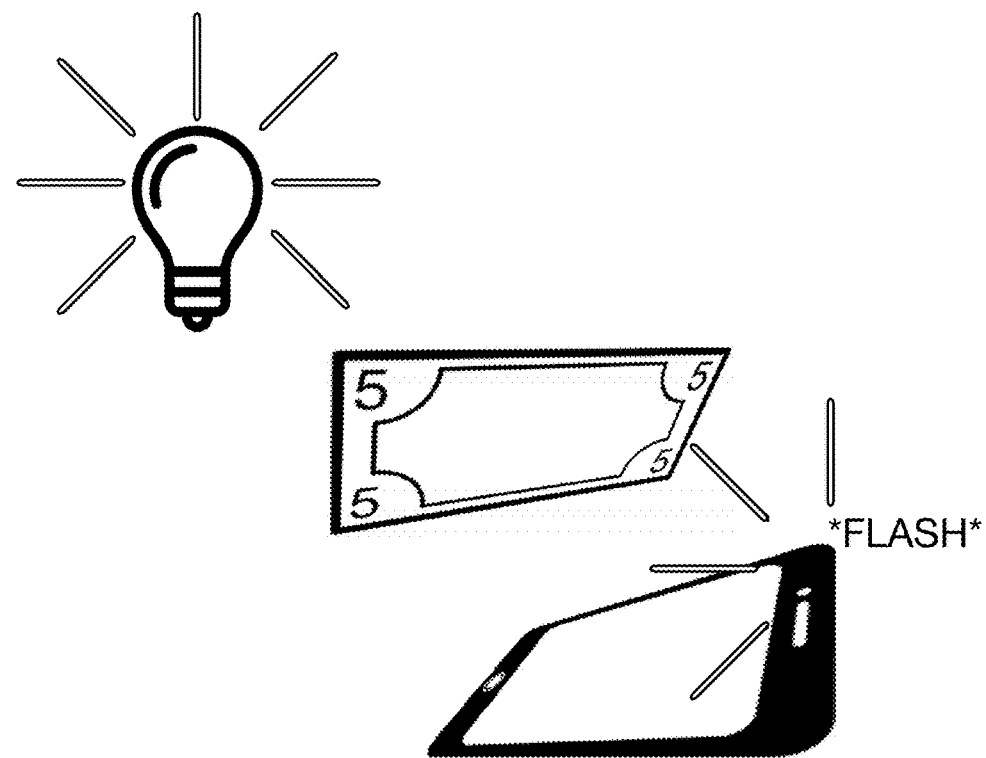

The certificates may be verified in several means. The QR codes shown in FIG. 13 are specimens that do not include cryptographic identifiers, but in actual embodiments the content of the codes may include a cryptographic signature using a private key associated with the platform's public key. A signature may also be included in human or machine-readable format other than a QR code. Whatever the format, the content of the certificate is included as an input in generating the signature, so that any mobile device storing the platform's public key can authenticate the certificate without connecting to the network. When presented with two authentic certificates, an observer may determine which is controlling based on logical identifiers (e.g. pre- vs. post-exchange) as shown in FIG. 26, timestamps (e.g. 23:01 GMT vs. 23:04 GMT), and/or hash chains.

In certain cases, it may not be possible to guarantee that the platform has not issued an even newer certificate superseding ownership information shown on the later of the two certificates examined without network connectivity. In one embodiment, upon scanning a certificate the mobile application queries the platform to determine whether the certificate has been superseded and, if so, the platform transmits the operative certificate for the transaction. In some embodiments, the query may be performed manually by a human, such as by dialing a hotline for up-to-date ownership information on the meta-serialized notes tendered in exchanges. In FIG. 13, this hotline is available only to law enforcement, so the phone number is not displayed on the certificate. In other embodiments, alternate authentication options may be listed in full on the certificate, including not only phone numbers but, e.g., websites, social-media accounts, etc.

Figure 14:

FIG. 14 shows an example of an application configured to communicate with the cryptographic ledger platform. The application is executing on a mobile device that is providing identifying information about the cash-receiving party to a cash-possessing party. For illustrative purposes, only the first name, approximate age, and photograph of the cash-receiving party are shown in FIG. 14, but in other embodiments the quantity and/or degree of identifying information disclosed to the cash-possessing party may vary significantly. For example, full name, exact age, height and weight, multiple photos, and etc. may be utilized. On the bottom of the screen, three buttons are shown. The top button will confirm the identity of the cash-receiving party, thereby authorizing the cryptographic ledger platform to disclose the cash-possessing party's identity.

The middle button shown in FIG. 14 will cancel the planned exchange. In FIG. 14, only a single button to cancel the exchange is shown, but in some embodiments input buttons or menus may distinguish between normal cancelation and aborting based on a problem with the counterparty.

An emergency button may also be provided to connect the cash possessing party to 9-1-1 or other law-enforcement hotlines and/or to request immediate assistance at the meeting location through other means directed by the cryptographic ledger platform. In some embodiments, after aborting the transaction and safely exiting the area, the cash possessing may be prompted to submit addition information about the problem with the counterparty Examples of such additional information can include, but are not limited to, indication of a suspicious feeling, positive indication that it was the wrong person, positive indication that the correct person was present but was exhibiting suspicious behavior or was in the presence of associates, and etc. Such information can be utilized by the cryptographic ledger platform to produce variable adjustments in user-rating models of the platform.

An additional option is shown in FIG. 14, represented by the bottom button, which allows the cash-possessing party to request assistance in finding the cash-receiving party. This option may also be presented to the cash-possessing party on other screens in the application, including those prior to arrival at the meeting location. In some embodiments, the cryptographic ledger platform may forward the location of the cash receiving party's mobile device to the cash-possessing party so that it can be displayed on a map or other visual aid. The cryptographic ledger platform may also open text or audio communication channels between the parties for direct coordination, but care must be taken to avoid prematurely revealing the identity of the cash-possessing party. In some embodiments, one or more pre-generated clarifying questions (e.g., "What's a quick description of your outfit?", "Can you describe exactly where you're standing?") may be selected by the cash possessing party and/or cryptographic ledger platform, then transmitted to the cash requesting party, whose answers will be delivered to the cash possessing party.

In one embodiment, upon receiving an assistance request from the cash-receiving party, the cryptographic ledger platform selects a distinctive gesture, instructs the cash-possessing party to look for the gesture, and then induces the cash-requesting party to perform the gesture. The inducement may be performed implicitly (e.g., by calling the cash-requesting party's phone number in order to induce gestures associated with receipt of a call) and/or expressly (e.g., by directing the cash-requesting party to raise her left hand in the air). The cryptographic ledger platform may delay execution of distinctive-gesture inducement for a brief interval (e.g., 30 seconds) after receipt of the cash-possessing party's assistance request in order to lessen the externally observable temporal correlation, as well as to allow the cash possessing party time to return his or her attention to the area being surveyed.

In one or more embodiments of the invention, the cash-requesting party may be prompted to take one or more photographs at the meeting location, such as a selfie and/or a panorama of the cash requesting party's surroundings. These photographs may be forwarded to the cash-possessing party for use in identifying the location of the cash-requesting party. In some embodiments, the cryptographic ledger platform may estimate the location of the cash-requesting party by employing algorithms known to those skilled in the art of computer vision to compare the position and orientation of landmarks in the submitted photographs and landmarks in "street view" datasets of the area surrounding the meeting location and/or equivalent datasets compiled from photographs taken by parties on the network.

Figure 15:
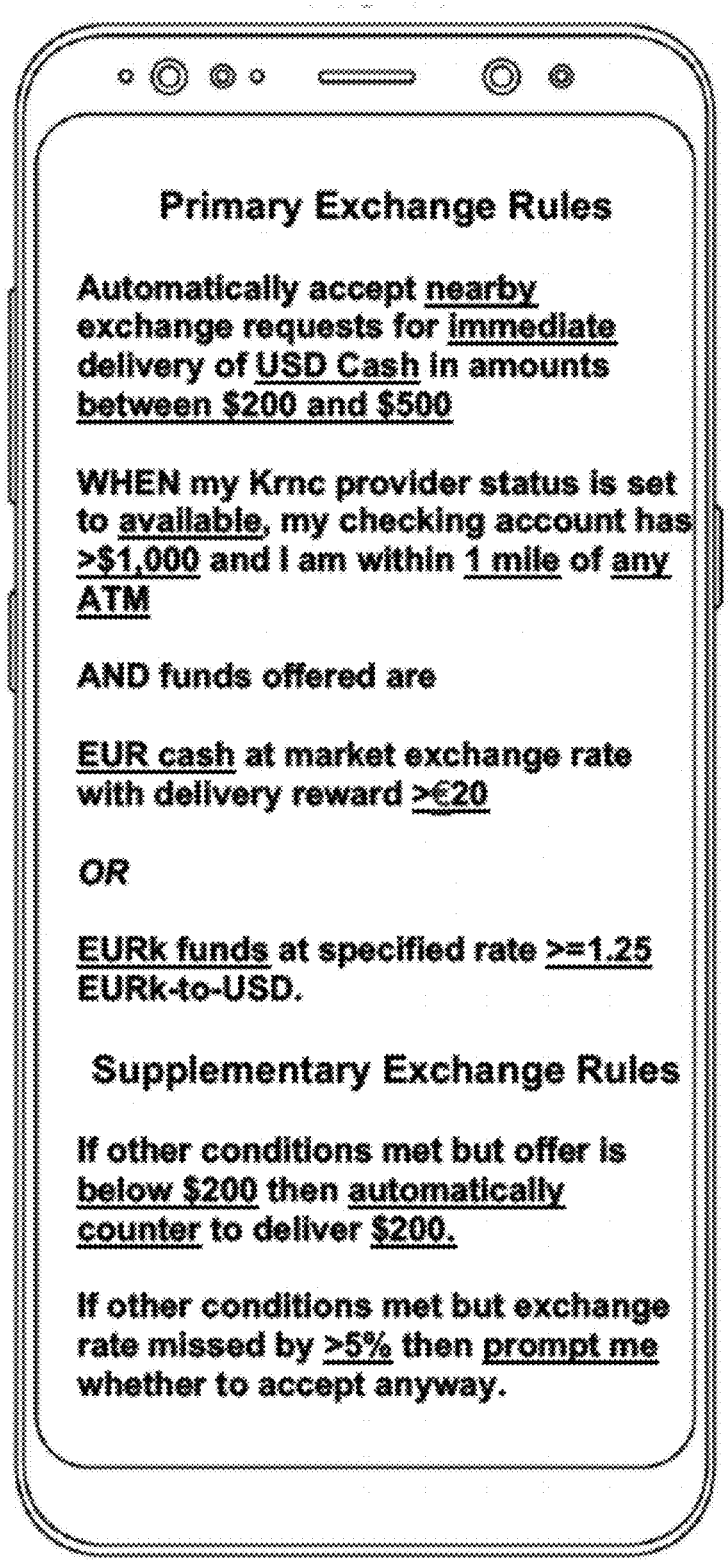

FIG. 15 shows an example of an application on a mobile device in which a participant in the network inputs offer submission rules. An Exchange Offer Submission module of the cryptographic ledger platform (not shown) may receive the rules and utilize them for matching exchange requests. The crude interface displayed is purely illustrative, as are the details of the various exchange rules.

In the example of FIG. 15, the user has specified two types of currency he is willing to receive in an exchange: either (1) Euro banknotes provided at a market exchange rate plus a delivery reward greater than 20 Euros or (2) EURk cryptographic currency funds furnished at an exchange rate exceeding 1.25 EURk per USD. He has also specified restrictions on the demands of potential counterparties: (1) the request must be nearby, according to a geographic-proximity standard specified elsewhere in the application, (2) the request must be for immediate exchange, not a meeting at a future date or time, (3) the money requested by the other party must be USD cash in an amount between $200 and $500. Similarly, the user has restricted the circumstances in which he wishes to be available: (1) his status in the application must be set to available, indicating that he is on duty, (2) his linked checking account must have a balance exceeding $1,000 USD, and (3) he must be within 1 mile of an ATM of any brand or type.

In the example of FIG. 15, if those conditions are all satisfied, the cryptographic ledger platform will automatically accept the proposed exchange request on behalf of the user. As FIG. 15 shows, the user may also specify rules for exchange proposals that do not satisfy the criteria for automatic acceptance. In the depicted example, the user has specified that if the only shortcoming of the proposed exchange is that the requested USD cash is less than $200, then a counter-offer to deliver exactly $200 USD should be transmitted. If the only shortcoming of the proposed exchange is that the user's desired rate has been missed by less than 5%, the user has requested to be prompted, so that he may either accept the proposed exchange, submit a counter, or choose not to participate.

Figure 16:

FIG. 16 shows an example of an application on a mobile device on which a user has requested an in-person currency-conversion meeting and is being prompted to choose between multiple potential partners. At the top of the screen, the balances of the user's fiat and cryptographic currency (i.e., USDk, EURk) accounts are displayed on a linked digital exchange, dubbed KrncBase. The linked digital exchange may be a component of a cryptographic ledger platform, such as the one described in FIG. 1 (above), or may optionally be operated by a third party. In this example, the user has chosen to offer funds from all of those accounts, including both fiat (USD and EUR), and cryptographic funds (USDk and EURk). The funds are offered either separately or in combination, so as to increase the range of compatible exchange partners, because the user has also narrowed matches by specifying that the exchange partners must have at least a 4.5 rating and be available to meet during the next three hours along the user's route to Las Vegas, Nev. in order to furnish $500 USD in cash. The application lists three potential options, showing their star rating, geographic area, the length of the required detour, and the quantity of fiat funds and/or cryptographic funds each user is requesting for the exchange. The user is given the option to select any of the potential exchange partners, and on an ensuing menu may choose either to accept the proposed terms or to counter.

Figure 17:
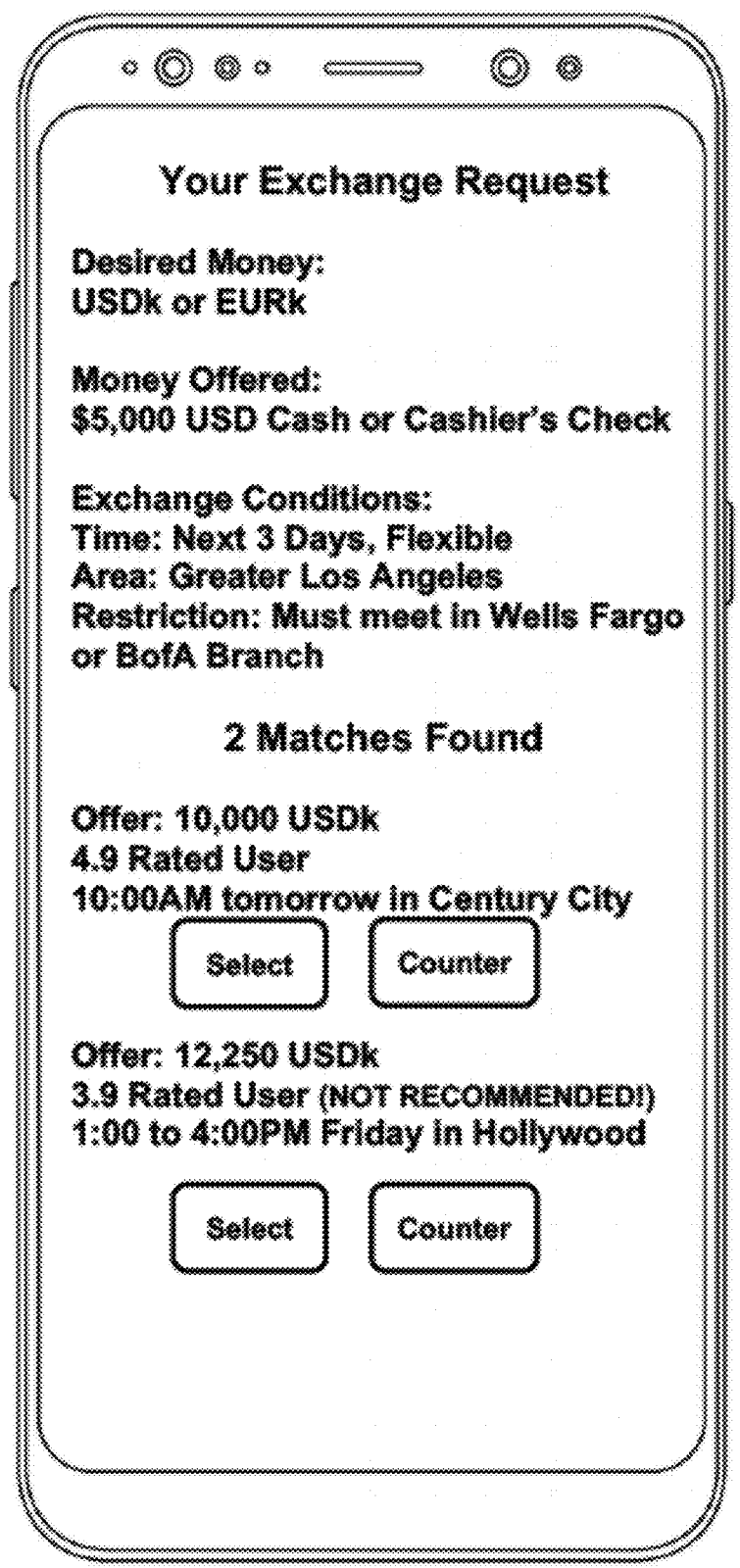

FIG. 17 shows an exemplary application on a mobile device on which a user is requesting a future in-person meeting to trade USD for cryptographic currency (represented as USDk and EURk). In this example, the user is offering $5,000 USD either in cash or a cashier's check, and is willing to meet any time in the next 3 days during business hours inside a Wells Fargo or Bank of America bank location within the Los Angeles metropolitan area. The application has presented two matches: a 4.9 rated user who is offering to provide 10,000 USDk at 10:00 AM the next day in Century City or a 3.9 rated user who is offering to provide 12,250 USDk on Friday between 1:00 and 4:00 pm in Hollywood. The application presents the user with the option to accept or counter either offer, but it has issued a warning that meeting the low-rated user is not recommended. In this example, a cryptographic ledger platform may generate the recommendation based on factors beyond merely the user's rating, including the location, time of day, type/quantity of money requested, and/or patterns of suspicious activity or resemblance to prior fraudulent transactions. In one embodiment, the cryptographic ledger platform generates positive recommendations or endorsements for certain potential exchange partners, based on opposite thresholds.

Figure 18A:
Figure 18B:

FIGS. 18A and 18B show visual beacons that users of the network may scan with an application on their mobile devices in order to request an in-person currency exchange. These beacons may be configured for requesting cash delivery, as shown in FIG. 18A, cash deposit, as shown in FIG. 18B, or in some embodiments may prompt the user to select one of the two.

In FIG. 18A, for illustrative purposes, the sign is located at Branch 19 of the hypothetical SuperMart supermarket, and it prompts customers at the market to pay with a cryptographic currency established by "forking" the US Dollar (designated by the symbol "USDk") by scanning the sign and having cash delivered. A QR-code is shown, but customers are also provided with a human readable code (e.g., SuperMart19), which may be entered into the application to trigger the same input. In some embodiments, alternate machine-readable data formats may be included on the sign, and/or the application may recognize the text or image of the entire sign.

An association between the sign and a particular in-person meeting location (e.g. a specific branch of a specific store) is stored by the cryptographic ledger platform (e.g., in a SQL database), and when a transaction is initiated by a user scanning the sign, the exchange proposed by the platform is automatically constrained to that location. In some embodiments, transactions initiated by a sign being scanned may be assigned other unique attributes by the platform, such as a different fee division structure in which a portion of the funds are shared with the party that erects or maintains the sign and/or a party who provides security for transactions at the location designed by the sign.

Although the visual beacons shown in FIGS. 18A and 18B are fixed signs, visual beacons may also be placed on non-stationary objects, such as the side of a vehicle, so long as the location of the object is tracked by the cryptographic ledger platform (e.g., via GPS) so that users' locations may be determined when they scan the beacon to initiate a transaction.

FIG. 18B illustrates a stationary visual beacon that is located a known distance away from a meeting location. In the relevant database, the cryptographic ledger platform maintains an association between the sign, the location of the sign, and the nearby location(s) where exchanges are performed. Users who scan the sign may be provided with directions to the meeting location from the position of the sign, either before or after initiating their exchange requests. They may also be prompted to request additional services at the meeting location, such as presence of a third-party chaperone or a drone operated by the platform, so that the platform may dispatch the needed service providers' in advance of the user's arrival.

Some signs may incorporate additional transaction specifications beyond those shown in FIGS. 18A and 18B (e.g., "Scan here to have $100 USD delivered 30 min from now at Register 1."). In some embodiments, a single beacon may be composed of multiple sub-beacons with different transaction details, and a user may choose which sub-beacon to scan in order to initiate the transaction matching his or her preferences.

The type, format, and physical materials of the beacons shown in FIGS. 18A and 18B are purely illustrative. Beacons embodying the invention may be created out of wood, metal, plastics, and other physical materials, may be rendered on screens, billboards, or other displays, or may be projected onto surfaces. In some embodiments, the beacon may be rendered identifiable to the mobile device by its physical components (e.g., a printed QR code), while proposed transaction details and other information are presented to the user via augmented-reality rendering on the user's device.

Figure 19:
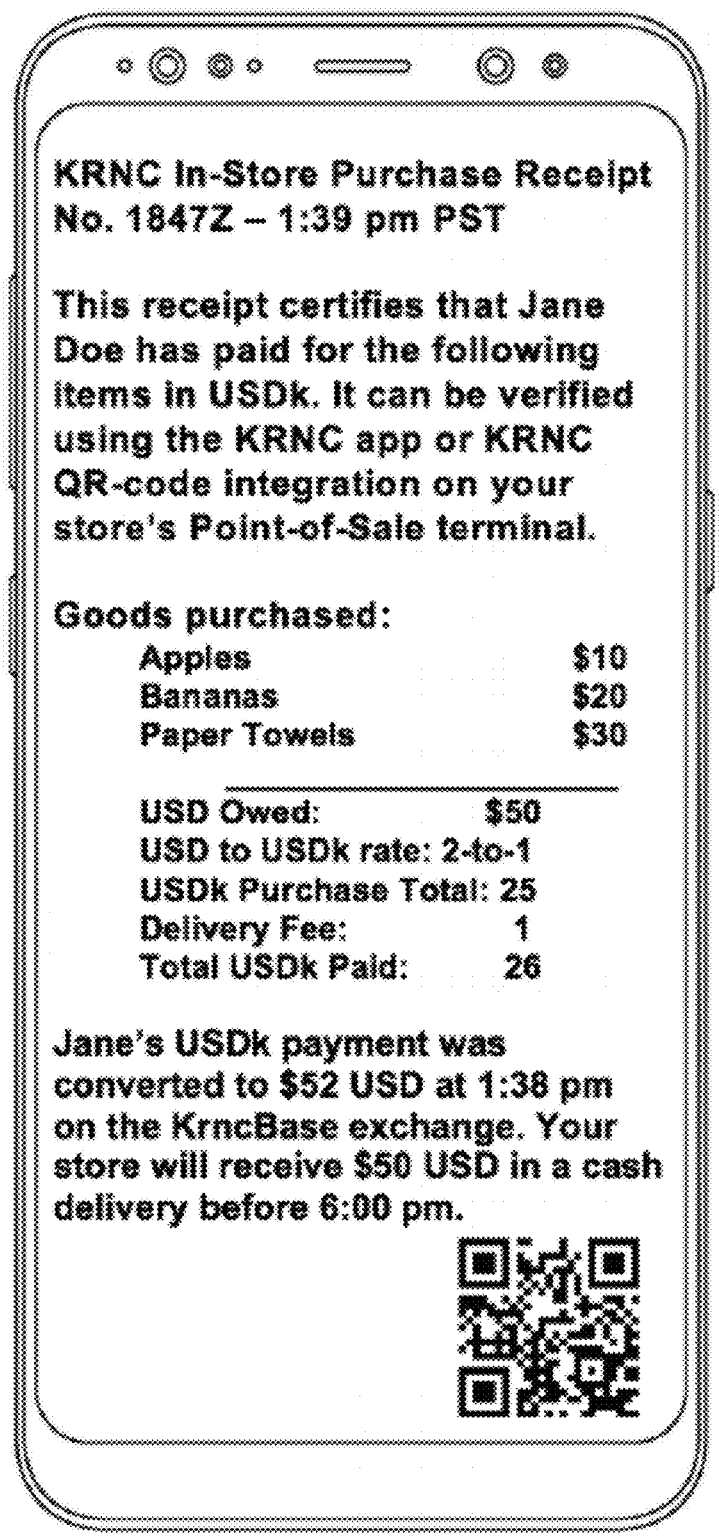

FIG. 19 shows a proof-off-payment certificate issued by the cryptographic ledger platform for a customer's purchase in a store. It contains an identifier, "No. 18472," the time of issuance, and the identity of the customer. The QR-code on the bottom right of the certificate enables it to be authenticated using the same method as other certificates described in this disclosure. In addition, as the instructions shown on the certificate explain, it may be authenticated via an integration to the POS terminal that enables queries to be performed by scanning QR codes, as may also be performed with the mobile application itself.

A list of purchased merchandise is included in the certificate depicted in FIG. 19, but this information may be omitted from some embodiments, particularly when the certificate is coupled with a store-printed receipt that identifies the merchandise. In FIG. 19, the customer has paid for $50 USD worth of merchandise using a cryptographic currency based on the US Dollar (depicted by the symbol "USDk") according to a market rate, and has paid an additional 1 USDk delivery fee, for a total of 26 USDk, which was immediately converted to USD on an exchange, and will be delivered to the store as $50 USD in cash. These numbers are purely illustrative, and do not include e.g. the cost of the USDk-to-USD conversion, if any. No additional compensation to the store for accepting payment via third party cash delivery is shown in FIG. 19, but in some embodiments that compensation may be provided, either via a separate fee or as a portion of the delivery fee. (e.g. a store could receive $52 USD in cash as payment for $50 of merchandise)

Figure 20:
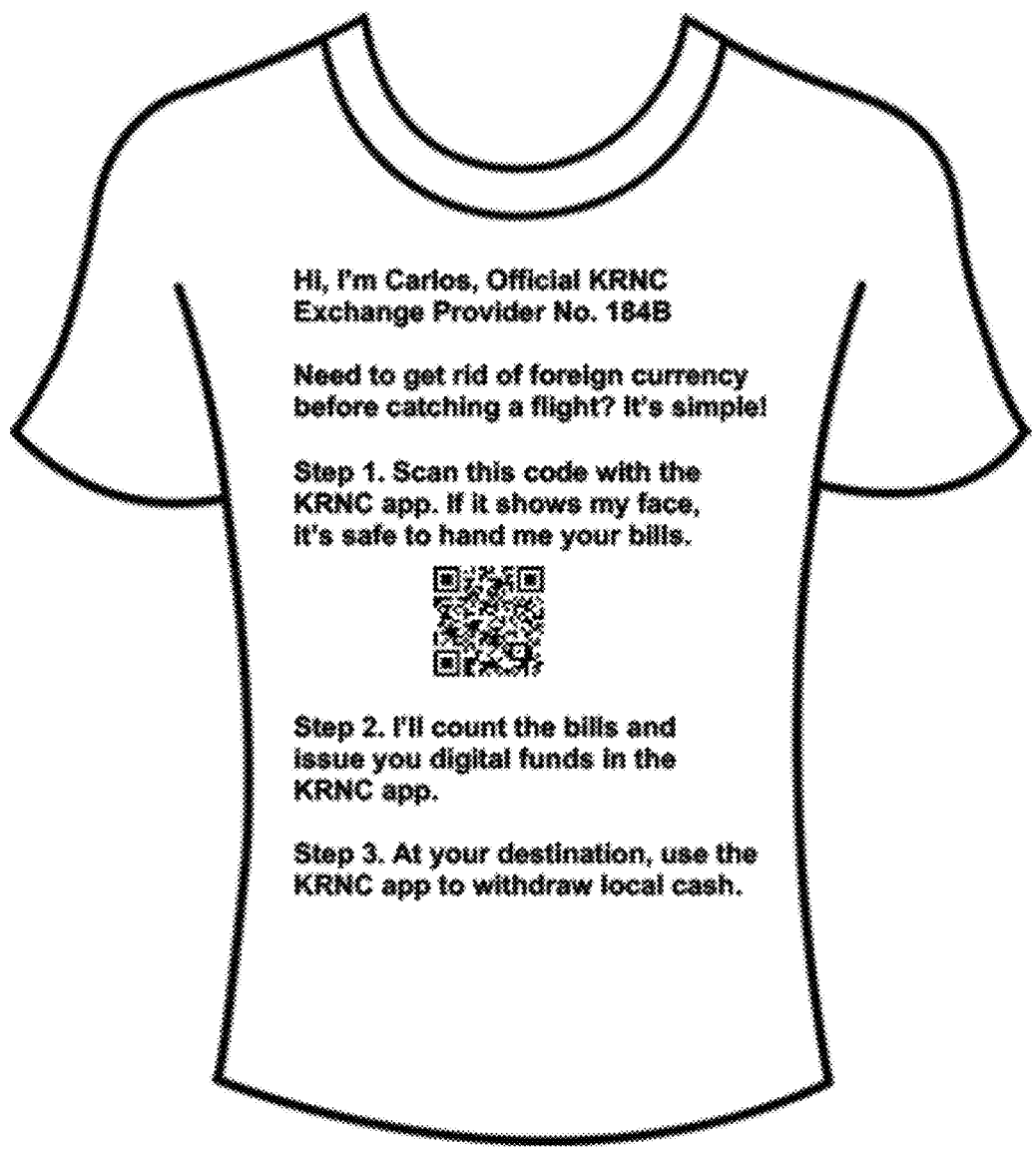

FIG. 20 shows a visual beacon printed on the shirt worn by an exchange provider, which users scan in-person with the application on their mobile devices in order to initiate an exchange transaction with the provider. Rather than dictating the location of a desired transaction, the beacon may dictate the identity of the counterparty involved in the transaction. The instructions for the user shown on the shirt in FIG. 20 refer to depositing cash with the provider, but it is merely one illustration of the technology, which can be adapted for use with all types of transactions supported by the network. Similarly, the technology may be implemented not merely on shirt, but on stickers, jackets, badges, hats, purses, and other clothing items. It may also be implemented on the side of a vehicle owned and/or operated by the exchange provider.

In FIG. 20, the shirt presents a machine-readable QR code, as well as a human-readable exchange-provider number, either of which may serve as the input to the mobile application for initiating the transaction. When the application receives the input identifying the exchange provider, it passes that data to the counterparty condition input module and transmits the exchange-provider number in a query to the cryptographic ledger platform, which confirms that the provider is in good standing, and transmits an image of the authorized provider for display in the mobile application. The user compares the photo of the authorized provider to the appearance of the individual wearing the shirt to validate the individual's identity, then proceeds with the transaction. If an unauthorized individual attempts to wear the shirt and pose as an exchange provider, the application will still display a photo of the real exchange provider, and users may decline the transaction and/or report the impostor to the platform and/or law enforcement via the application. In some embodiments, supplementary or alternate identifying information may be transmitted about the real exchange provider. Likewise, alternate means of displaying the input code for the beacon may be implemented, so long as the data can be accurately captured by users on their mobile devices and transmitted in a query to the cryptographic ledger platform.

Figure 21:
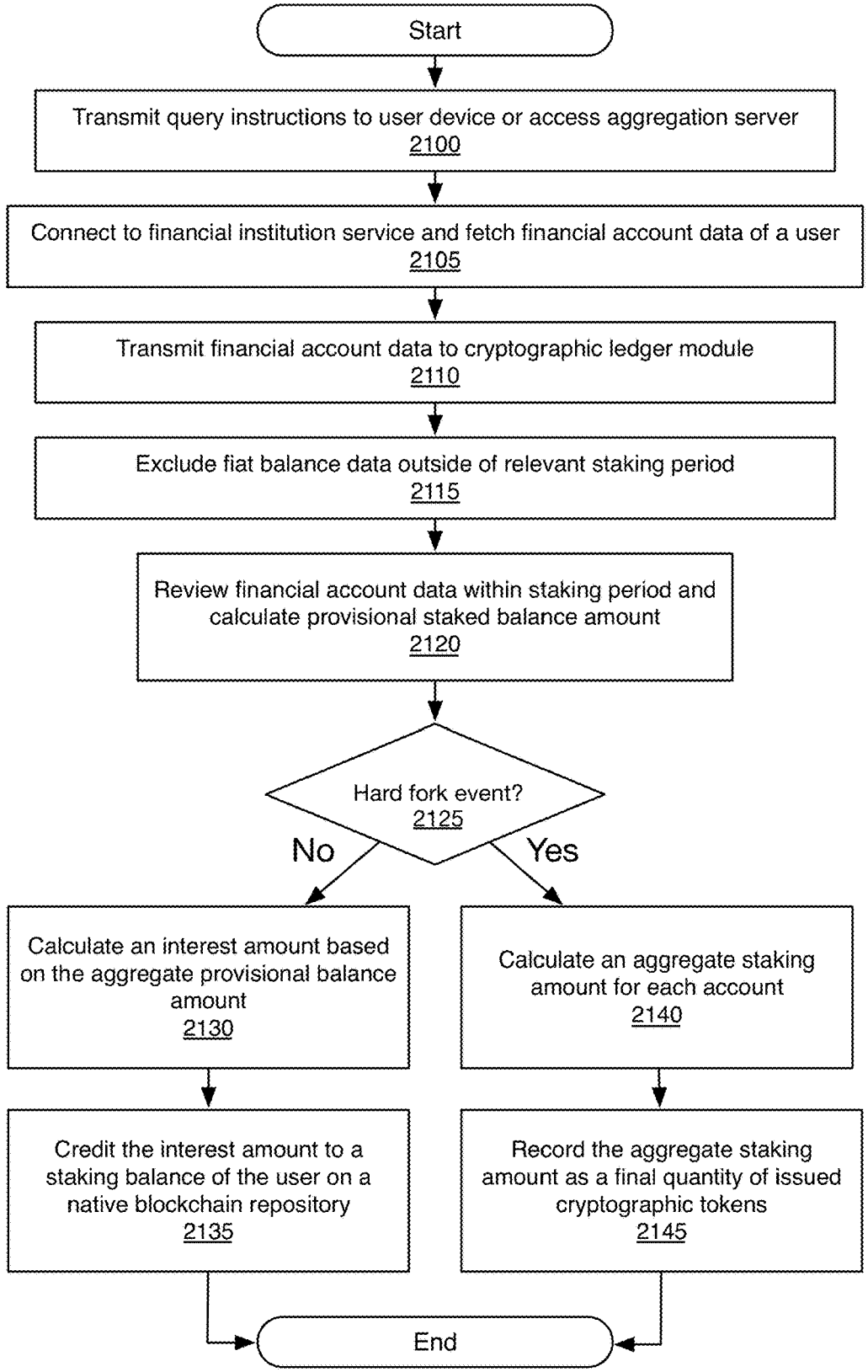
FIGS. 21-23 show example depictions of flowcharts, in accordance with one or more embodiments.

FIG. 21 shows a flowchart of a method for distributing cryptographic tokens via proof of balance verification. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 21 should not be construed as limiting the scope of the invention.

In STEP 2100, a balance interface module transmits query instructions to the device on which the credentials or tokens for obtaining balance records (financial account data) for a given account are stored. In some embodiments, this operation is initiated by a user inputting a command to an application executing on the user's device, to verify financial funds of the user.

In STEP 2105, the financial account data is fetched from a financial institution service. A balance interface module (from the user device or from a remote ledger platform module) can connect to a banking service where the balance records are stored and uses the credentials or token(s) to fetch the balance data from the bank ledger. In some embodiments, all available balance data may be fetched. In other embodiments, a temporal restriction may be included in the query instructions.

The STEP 2110, the balance data is transmitted to the cryptographic ledger platform. For example, a balance interface module can transmit the fiat balance data fetched from the banking service to be stored in a native ledger repository of the cryptographic ledger platform. In embodiments where the query was not temporally restricted, in STEP 2115, a temporal restriction module excludes the portions of the transmitted balance data for dates that that fall outside of the staking period. The duration of the staking period may be chosen based on the needs of a particular embodiment.

In STEP 2120, a provisional staked balance amount is calculated either in fiat or provisional cryptographic units. In STEP 2125, it is determined whether the staking period is ended and whether a hard fork event has occurred. This determination can be made according to a pre-defined schedule, or can be triggered by a push mechanism that makes the determination upon completion of the staking period, in accordance with various embodiments. For example, a process can be configured to calculate interest daily based on a daily staking balance of each user. If it is determined that the hard fork has occurred, the process proceeds to STEP 2140, and if it is determined that the hard fork has not occurred, the process proceeds to STEP 2130.

In STEP 2130, prior to occurrence of a hard fork event, an interest amount is calculated based on the aggregate provisional balance amount and duration of each staked amount staked during the staking period. In STEP 2135, the interest amount is credited to a staking balance of the user on a native blockchain repository. The interest amount can be represented in any denomination, including a provisional quantity of cryptographic tokens or some representation thereof.

In STEP 2140, upon detecting that a hard fork event has occurred, the aggregate staking amount is calculated for each user account or address. In one or more embodiments, a post-staking period is commenced during which all provisional transactions are finalized and anti-counterfeiting and anti-spoofing technologies described herein are used to verify possession of staked fiat bank notes. In one or more embodiments, the aggregate staking amount may represent an amount corresponding to staked fiat balances, interest corresponding to staked fiat, sweepstakes winnings for staked balances, and/or provisional incoming transfer amounts of any kind. In STEP 2145, after detecting the hard fork event, the aggregate staking amount is recorded on the native blockchain repository as a final quantity of issued cryptographic tokens.

Figure 22:
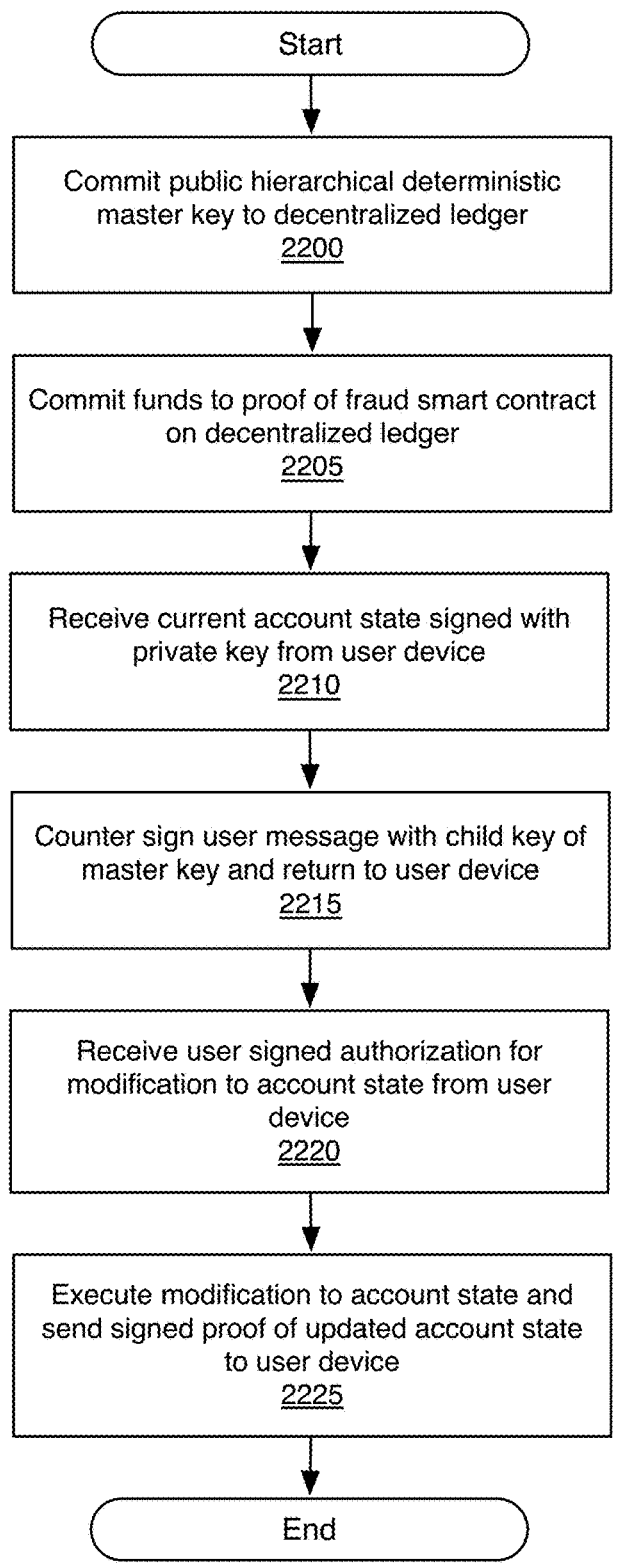

FIG. 22 shows a flowchart of a method verifying authenticity of data stored on a layer-2 ledger. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 22 should not be construed as limiting the scope of the invention.

In the embodiment depicted in FIG. 22, a commitment on an external blockchain is used to designate a hierarchical deterministic key from which child-keys will be generated for the Cryptographic ledger platform to commit to the authenticity of data stored on the layer-2 ledger. A User and the cryptographic ledger platform may create a private hash-chain documenting user authorization for, and platform execution of, changes to the state of an account (e.g. a reduction in balance due to transferring funds to another user.) This scheme does not prevent funds from being stolen by the platform, but it guarantees that the User will have unforgeable proof of the fraud. In some embodiments, the reliability of the centralized ledger may be further enhanced by the platform committing funds to a smart contract on a decentralized ledger from which funds will be paid out to any User who presents the aforementioned proof of fraud.

Figure 23:
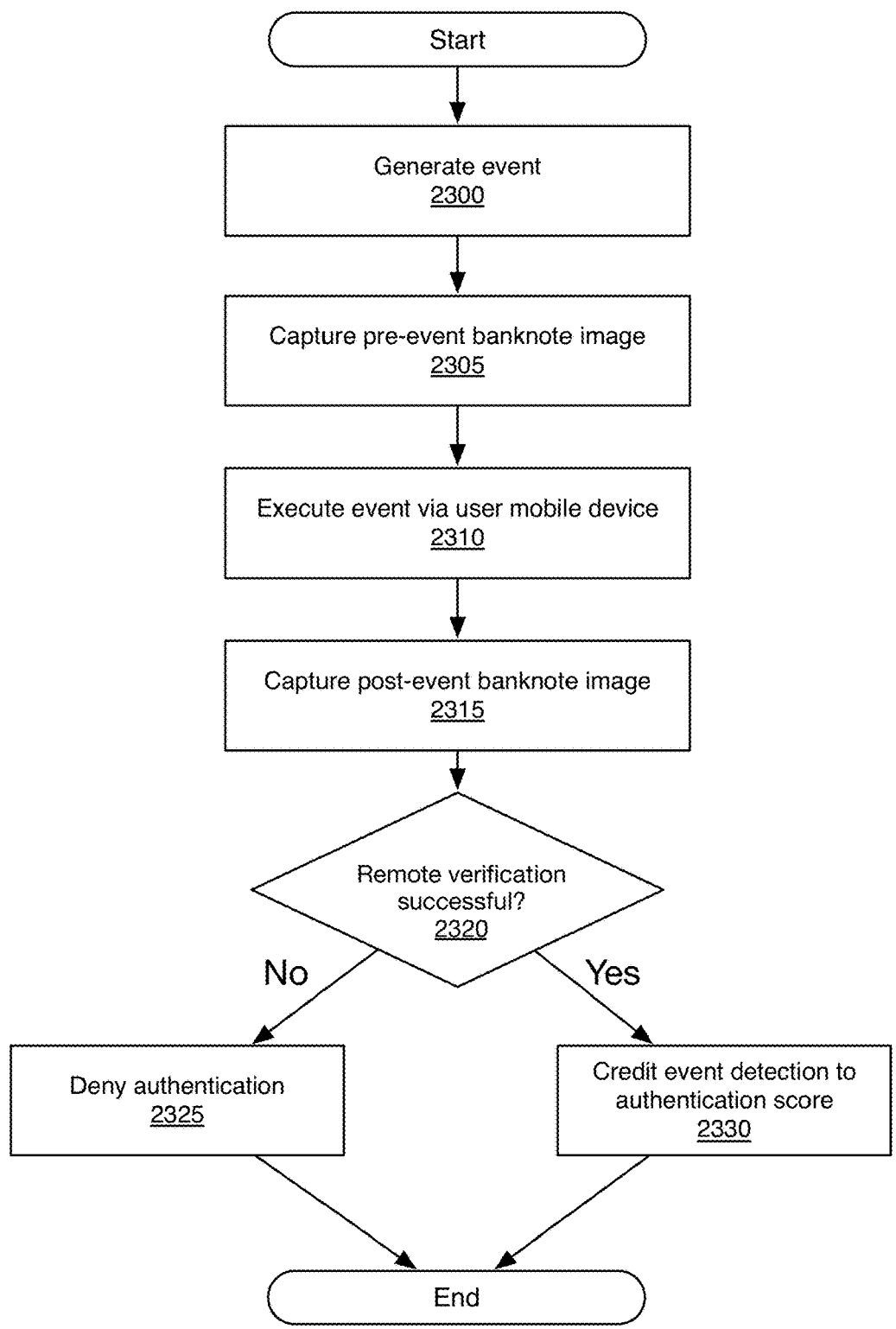

FIG. 23 shows a flowchart of a method that allows both spoofing and counterfeiting to be defeated by executing authentication events on a mobile device, such as a tablet or smartphone. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 23 should not be construed as limiting the scope of the invention. In particular, the invention extends in some embodiments to authentication events whose distinctive results are identifiable in a single frame of sensor data without the need to monitor the difference between multiple frames, such as authentication events that permit information to be embedded within the shape, color, or orientation of their consequences, which are visible even in the absence of intertemporal data.

A malicious actor may try to claim digital money associated with a bill the actor does not actually possess, either by submitting an image of a bill without possessing it (spoofing) or by submitting an image of an inauthentic bill they possess (counterfeiting). To prevent both spoofing and counterfeiting, a proof of cash module (e.g., proof of cash module 120 of FIG. 1, discussed above) may induce an event through a mobile device, while using sensors to monitor the appearance of the bill, and the effect of the event on the bill depicted in the sensory data may be used to verify that the images are being captured from the camera on the user's device and that the bill depict within the images is authentic legal tender.

In STEP 2300, an event is generated, chosen based on the template, the capabilities of the user's device, and a module executing logic about prior events and injecting entropy into a challenge-response protocol in order to vary events unpredictably. An image of the banknote is captured before the event (STEP 2305), then the event is executed on the mobile device (STEP 2310), either automatically or with manual user assistance, and then a second image of the banknote is captured (STEP 2315). The proof of cash module 120 in conjunction with the mobile device may then compare the two images and generate likelihood score(s) for the presence of an authentic bill, counterfeiting, or spoofing, which may register above or below thresholds, and those thresholds may themselves be adjusted to accommodate varied risks, times, locations, and business arrangements. In STEP 2320, if the generated authenticity score exceeds a predefined threshold, the process proceeds to STEP 2330 whereupon authentication is successful. If the generated authenticity score fails to exceed the threshold, authentication is denied (STEP 2325).

The use of only a single event, and the capture of only two images, are simplifications made for illustrative purposes. in reality, multiple events may be used, whether at the same time or in sequence, and numerous images may be captured for each event, including extracting some or all frames from a video stream.

One simple event, which is not pictured, may involve adjusting the optical zoom or focus on a mobile device, to alter the genuine output of its camera in identifiable ways (e.g., an image moving an arbitrary degree in or out of focus, at unpredictable times, etc.).

FIGS. 24A, 24B, 25A, 25B, 26, 27A, and 27B show depictions of specialized mobile devices which are configurable to execute methods for anti-spoofing and anti-counterfeiting involving execution of authentication events.

Figure 24A:
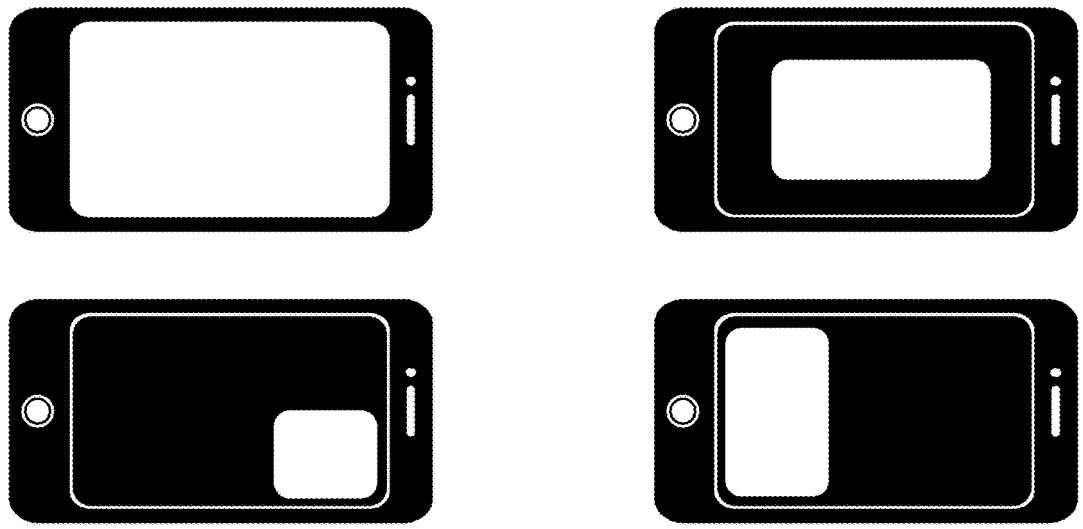
FIGS. 24A, 24B, 25A, 25B, 26, 27A, and 27B show example usages of mobile devices, in accordance with one or more embodiments.
Figure 24B:
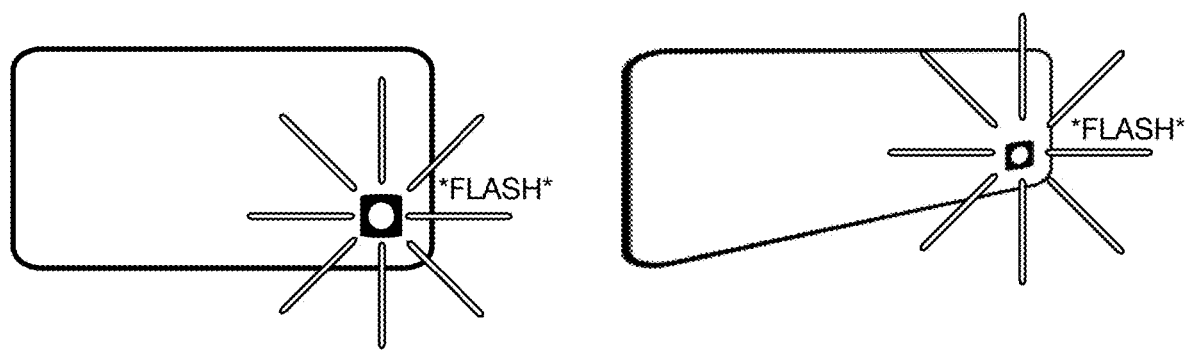

In the examples of FIGS. 24A and 24B, the illumination of a banknote may be altered, in intensity, angle, color, duration, sequence, etc. In FIG. 24A, the user may hold the phone still, and the a "moving" light source may be simulated by brightening various portions of the screen, while the front-facing camera captures the event. A colored LED may also be used. Any lighting pattern may be generated using the screen, and the corresponding patterns captured on the banknote via the front-facing camera. This event may be used with any banknote, but is particularly suited for notes with variable-illumination security features (e.g., color-shifting ink, holograms, foil, etc.)

In the example of FIG. 24B, the rear-facing camera is used, and the light is generated by the flashbulb. An event may be generated by turning the flashbulb on and off, or by prompting the user to move or tilt the body of the phone, thereby controlling the angle or position of the light from the flashbulb. Dynamic instructions to the user regarding the phone's orientation may be displayed on the screen or provided through the speakers. These may incorporate positioning information derived from the camera and/or gyroscope/accelerometer. Divergence of those sources of positioning information may be used to reject authentication and detect spoofing. The user-mediated movement of the phone body depicted in FIG. 24B may be combined with other events, including the screen-illumination changes depicted in FIG. 24A.

Figure 25A:
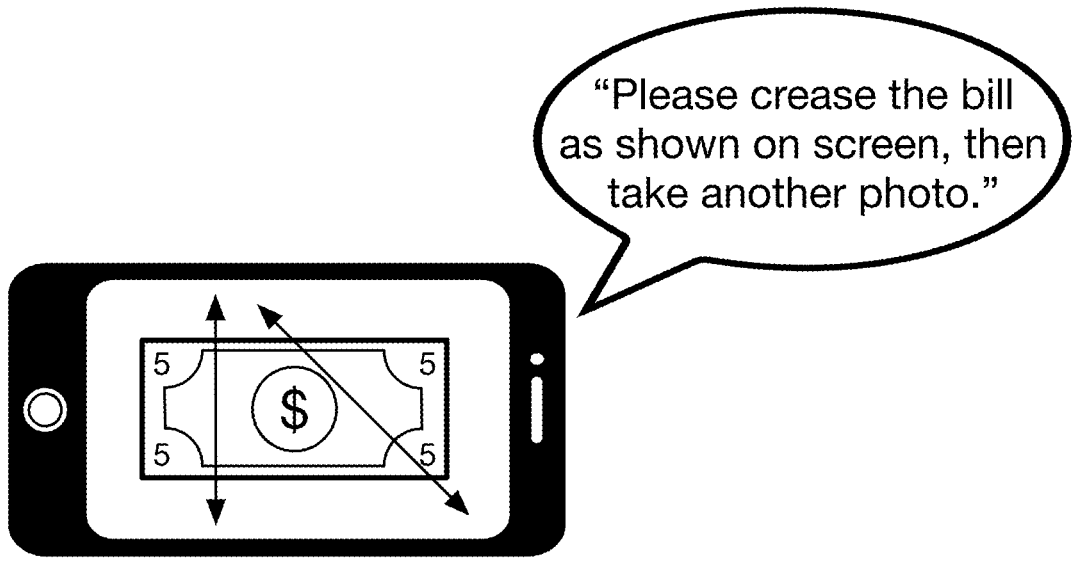

FIG. 25A shows an example in which the user is prompted to crease one or more specific portions of the banknote. The crease locations and orientations may be selected pseudo-randomly from a pool of potential options, constrained by logic that may include exclusion of paths with preexisting creases or regions with certain security features. (As with other events, the order of steps in FIG. 23 may be adjusted as needed. The pre-event banknote image may sometimes need to be captured before completely generating the event.) Event-created creases may be included as security features in a template, allowing the varying appearances of creases in authentic vs. counterfeit material to be used in bill authentication. The visibility of crease characteristics may be improved by photographing them during front-or-rear illumination Events.) The use of a textbox to represent audio commands is purely illustrative in all figures, and the disclosure embraces user interfaces of all types, including visual, audio, and tactile. In the illustration the User is instructed to "take another photo," but in some embodiments a photo may be captured automatically, or the sensors may constantly be recording or transmitting images.

Figure 25B:
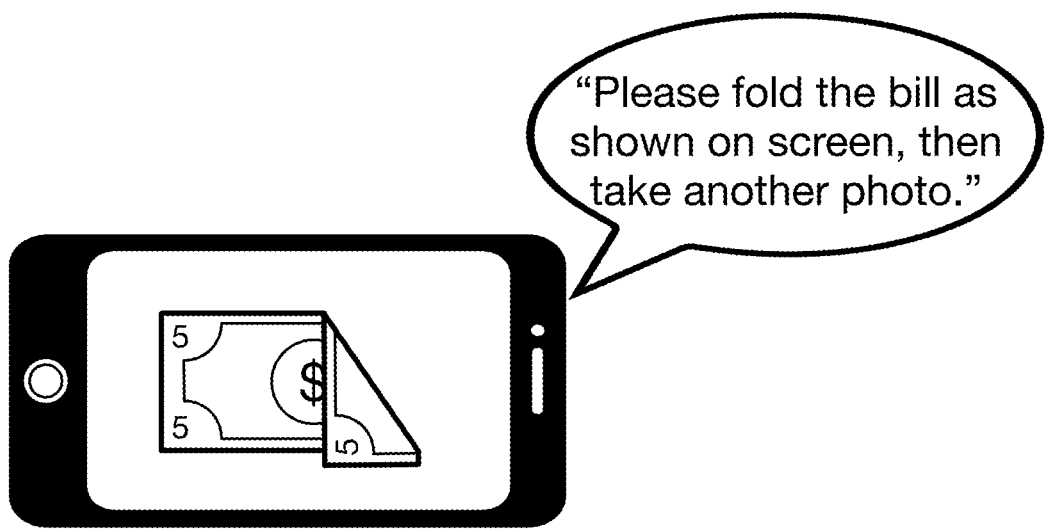

FIG. 25B shows an example in which the user is prompted to fold one or more specific portions of the banknote, and the bill is then photographed in its folded state. The fold-path(s) may be selected using the same methods as the crease-path(s) or additional logic may be incorporated, constraining folds based on which areas of each bill surface will be visible after folding. In a preferred embodiment, security features on opposite sides of the bill (e.g., front serial number and back-plate number) may be designated by a template, and following Templated-Specific Logic the Event Execution Model may prompt User to fold the note so that both security features are captured in one image.

Figure 27A:
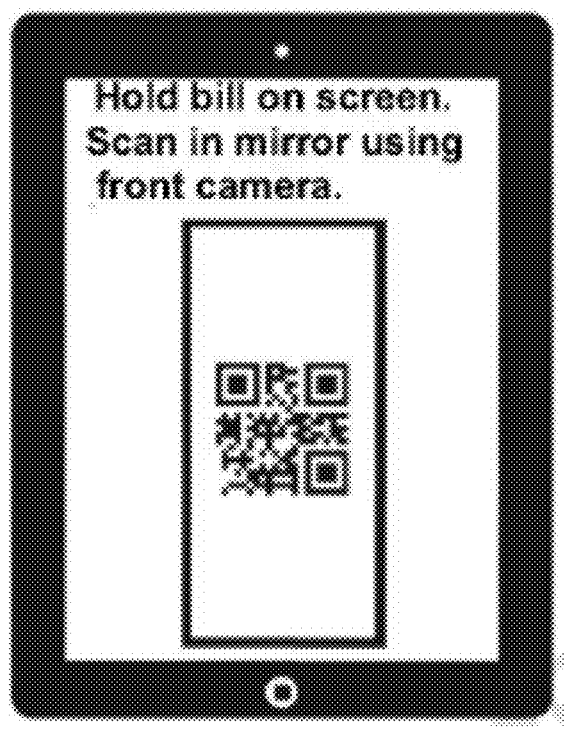
Figure 27B:
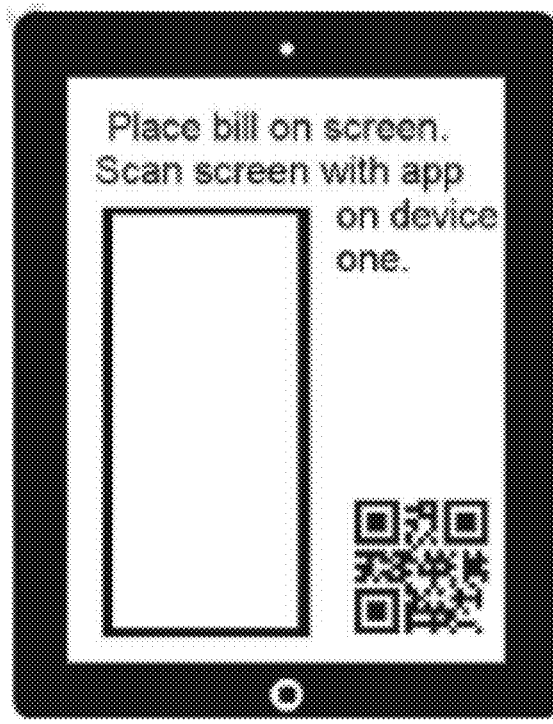

FIGS. 26, 27A and 27B show events that selectively illuminate a note from behind for verification on a mobile device. This may be used on notes containing security features that react to rear illumination (e.g., watermarks). It may also be used on notes without such features, to assess the material the bill is printed on (by measuring translucency profile, both color and degree) or to examine content printed on opposite side that becomes visible during backlighting.

In FIG. 26, the rear illumination is provided by an external source of illumination, such as a lamp in a user's bedroom. The user holds the bill in front of the light source, while capturing it via the camera on the mobile device, which detects the watermark that is made visible by the rear illumination. That is the reference image for the event. The flashbulb of the mobile device is activated, at the same time the post-event image is captured. In the post-event image, the watermark is not visible, because the flashbulb neutralizes the rear illumination. The focus on a watermark is purely illustrative; any note characteristic reactive to backlighting may be remotely authenticated on a mobile device by selective neutralization with frontal illumination. Even if no flash is available, the user may be prompted to hold the note and mobile device in a constant position with one another, while turning towards and away from a light in order to alter whether the note is backlit.

FIGS. 27A and 27B show that the screen from a user's mobile device may be used to provide rear illumination. A proof of cash module (e.g., 120 of FIG. 1) initiates the display of a machine-readable identifier, such as a QR code, on the screen of user's device, and instructs user to place the bill on the screen of the device and to capture images of the bill and the screen in a mirror via the front-facing camera. The identifier allows the proof of cash module (e.g., proof of cash module 120 of FIG. 1, discussed above) to functionally "ping" itself, by displaying data on the screen, then capturing the data on the camera. The identifier may be modified arbitrarily frequently in order to determine latency, confirm connection, etc. In some embodiments, the identifier may be displayed on regions of the screen covered by the bill, but the brightness of the screen may allow it to be captured. (Although a QR code is illustrated for this purpose, other encodings are more easily readable through a bill, particularly temporal variation of low capacity visual indicators, e.g., alternating colored lights). The identifiers may be flipped before being displayed, or after being captured on the device camera, in order to adjust for the effect of the mirror, and equivalent adjustments may be performed for the entire screen-mirror-sensor control-loop. In one embodiment, a mirror correction module may be used with the device-pairing module for mirror-mediated rear illumination.

The rectangle used to instruct placement of the bill on the screen is purely illustrative. The bill may be oriented vertically, horizontally, or diagonally on the screen, and on some devices (such as a smartphone), may be larger than the screen. The proof of cash module may prompt the user to slide the bill against the screen, while continuing to hold the screen up to the mirror, so that alternate regions of the bill may be illuminated. (The persistence module and the method depicted in FIG. 28 may be employed.) Portions of the screen not obscured by the bill may prompt the user. When the proof of cash module initiates backlighting, any portion of the screen may be illuminated, including the entire screen, the area occupied by the bill, or regions of the bill. The specific images displayed during illumination may be altered arbitrarily, and any characteristic of those images may be used to transmit identifier(s) to the mobile device's camera.

FIG. 27B shows that rear illumination may be provided by the screen of a second device. The illumination-providing device could be a mobile device, such as a tablet or smartphone, but it could also be a notebook, a desktop, or even a network-connected television. In one embodiment, an application on User A's smartphone prompts User A to pair another device for two-device verification, and provides the URL for Pairing (e.g., www.krnc.com/verify1919). When User A visits that address on the tablet shown in 3E-2, a randomly generated QR code is displayed, which when scanned by the application on User A's smartphone triggers the proof of cash module's device pairing module. The proof of cash module may employ the screen of the paired device in the same manner previously described for the screen of a single device displayed in the mirror, excluding mirror-specific modifications for screen-display and processing.

When a bill is being remotely verified while backlit by a paired device, the proof of cash module may execute operations so that the device screen illuminates (or otherwise calls attention to) one or more regions of the bill, and a user may be prompted to interact with those regions, including by moving Device 1 to photograph them more closely. This may be augmented by the process shown in FIG. 28 and described with reference to FIG. 29. The illumination may continue, alternate, or terminate while the first device captures images. For example, the tablet screen may illuminate a watermark, and when the watermark is recognized in proper distance and orientation, a photograph is captured on the smartphone. The watermark ceases to be illuminated, and a new region of the screen is illuminated, directing the user to bring the phone camera closer to the serial number. When the serial number is recognized in proper distance and orientation, the tablet ceases illumination, and a photograph is captured on the smartphone. Other events may be executed in conjunction with the second device, such as employing the flash on the first device to selectively override rear illumination and momentary conceal the watermark (FIG. 26) or variable frontal illumination of features like color-shifting ink (FIGS. 24A and 24B).

In some embodiments, biometric features of the User may be extracted from the mirror referenced in FIG. 27A or from the camera of the second device, pictured in FIG. 27B. Many other instances of biometric data may be captured and employed, in accordance with various embodiments. Although FIGS. 27A and 27B each show only a single note being placed on a tablet, more than one bill may be placed on some screens at a single time, and other aspects of the invention may also be implemented for batches of bills rather than single notes.

Figure 28:
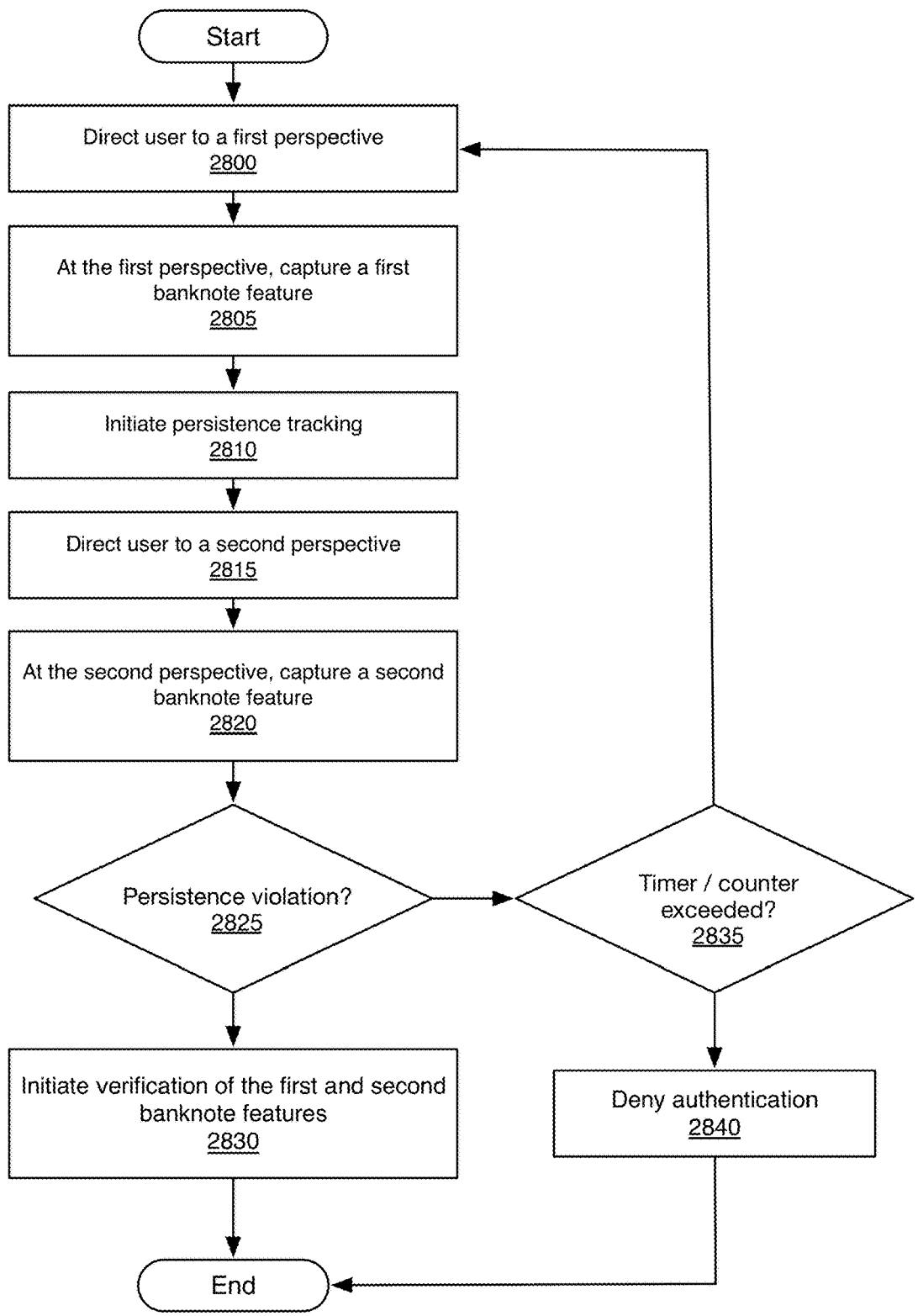
FIG. 28 shows an example depiction of a flowchart, in accordance with one or more embodiments.

FIG. 28 shows a flowchart of a method that allows a banknote to be authenticated more accurately than is possible when data is captured from only a single perspective. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 28 should not be construed as limiting the scope of the invention.

Bills may contain security features on both sides, which it may be impossible to photograph simultaneously. In addition, some security features may need to be examined more closely with a camera than is possible in a whole-bill image. A malicious actor could photograph a counterfeit bill, displaying a false serial number, then pass a rudimentary authentication test by taking close-up photographs of the security features from an authentic bill.

In FIG. 28, the malicious actor cannot employ this method, because persistence tracking is employed during the transition between perspective 1 and perspective 2. In one or more embodiments, the persistence module determines whether frames captured by user's device show the persistence of a single bill (e.g., by tracking points on bill surface).

An arbitrary number of images of the banknote may be combined, taken from different distances, positions, and angles, and showing different security features under different illumination conditions. The absence of a persistence violation is added as a condition of processing the captured images to verify the features they depict.

Figure 29:
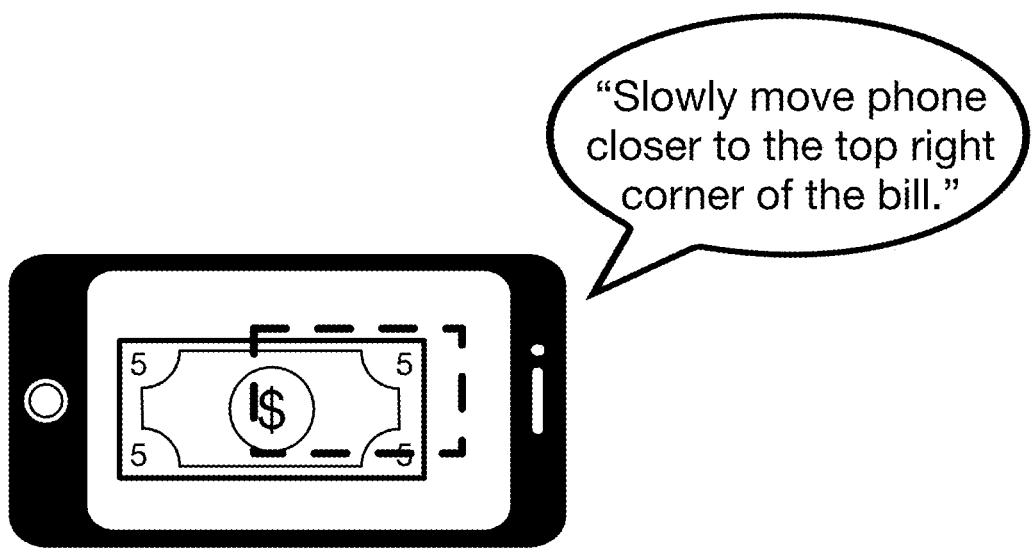
FIG. 29 shows example usage of a mobile device, in accordance with one or more embodiments.
Figure 29:
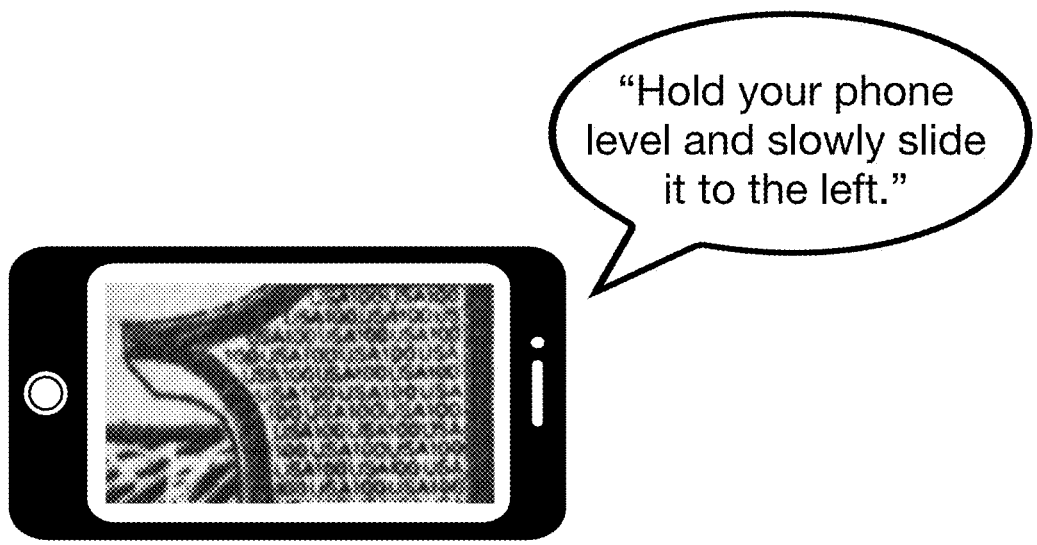

FIG. 29 shows an example, in which a user is prompted to move a smartphone closer to a designated region of a bill. The persistence module tracking, combined with accelerometer/gyroscope data (and potentially other sensors, such as a proximity sensor or infrared mapper), may be used to bring the user's device into the required position. After sufficient image data is captured from that perspective, the user may then be prompted to move the device into another perspective. This may include moving the phone in any direct or orientation, as well as manipulating the bill relative to the phone, such as flipping it over in a specified direction. In some unillustrated embodiments, outlines of bill features may be imposed over the viewfinder, which will correspond to the bill when the camera is oriented correctly, and the user may thereby be aided in lining up the correct perspective.

Finally, it should be emphasized that although certain embodiments of the invention may involve forking printed money, embodiments of the invention may provide significant advantages in other contexts. There are many circumstances in which User B may wish to remotely check whether User A possesses banknotes. For example, if User B is offering goods for sale on Craigslist, the network can allow User B to confirm that User A has sufficient cash before meeting in person. In a more advanced embodiment, User A may specify to the proof of cash module a collection of notes that User A purports to hold for a designated term, and the proof of cash module may audit User A's holdings by periodically prompting User A to remotely verify possession of one or more specimens it purports to control. In some embodiments, User A may purport to deface, destroy, or otherwise remove a banknote from circulation. In either version, penalties may also be imposed on User A by proof of cash module if User C remotely verifies the presence of that banknote in circulation.

Throughout this disclosure, banknotes may be substituted for numerous obvious analogs, including but not limited to bearer bonds, vouchers, traveler's checks, stock certificates, bank drafts, cashier's checks, lottery tickets, scratch cards, baseball cards, or any other discretely identifiable written instrument, including those not conventionally serialized.

Figure 30:
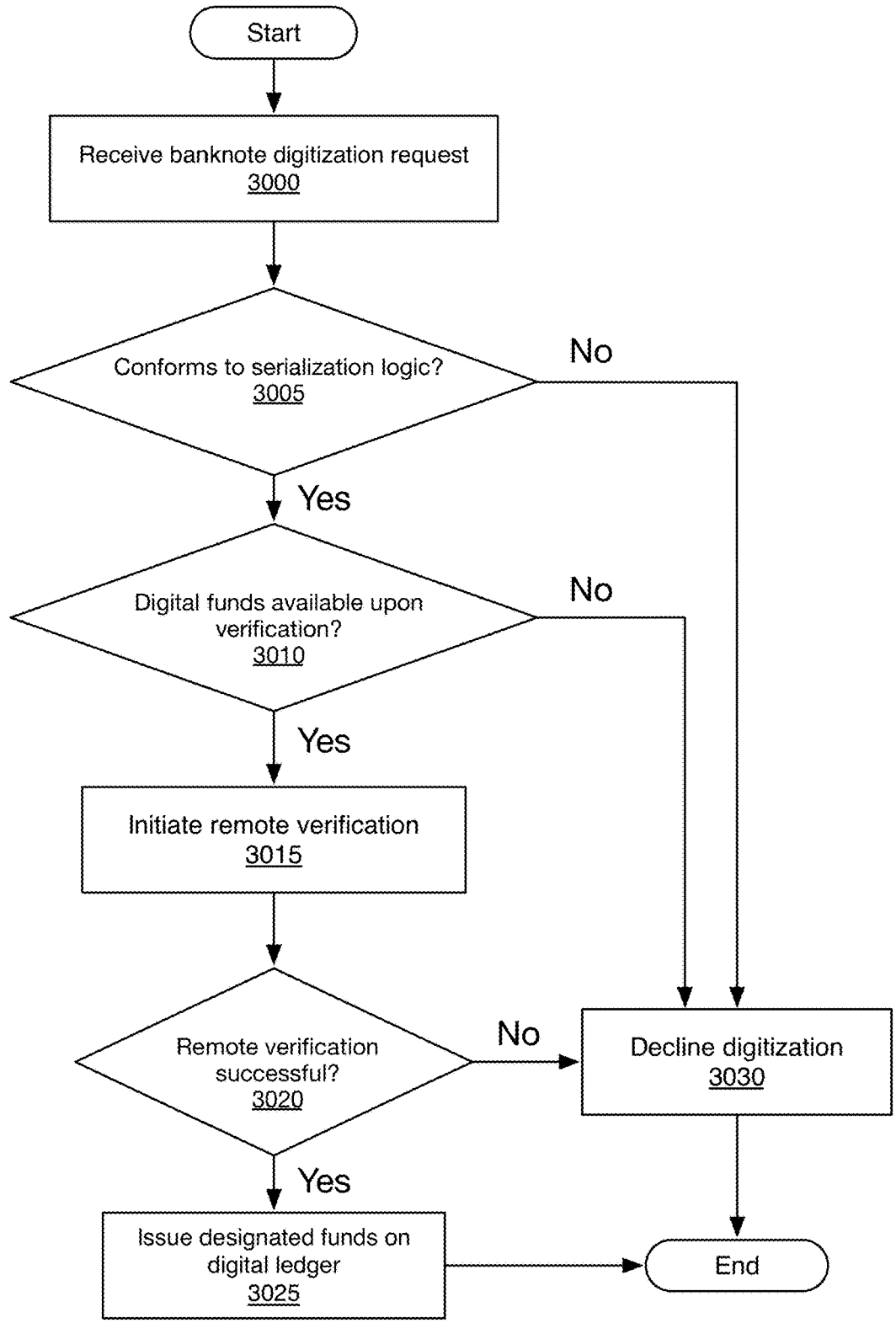
FIGS. 30-39, 40A-40C, 41-44, 45A, 45B, 46, and 47 show example depictions of flowcharts, in accordance with one or more embodiments.

FIG. 30 shows a flowchart of a method and timeline for issuing digital money to the owners of serialized banknotes. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 30 should not be construed as limiting the scope of the invention.

In STEP 3000, a banknote digitization request is received from a mobile device controlled by User A. This request must include the serial number and, if the cryptographic currency platform is configured to support multiple currencies with overlapping serialization, a meta-serial identifier (e.g., USD). This information may be manually input by User A, or it may be extracted from photograph(s) of the note, either locally on User A's device or after transmission to the proof of cash module (e.g., proof of cash module 120 of FIGS. 1 and 3).

In STEP 3005, the meta-serial number (meta-identifier+ serial number) of the bill is then tested against the proof of cash module's serialization logic to determine whether it matches an authentic banknote. If so, the process proceeds to STEP 3010, and if not, the request is declined (STEP 3030) and the process ends. The proof of cash module may have exact records of valid serial numbers or may derive a grammar for valid serial numbers from the serialization observed on authentic specimens. A "serial number" in this context may include identifiers that are not technically numbers nor serialized, such as non-sequential alphanumeric codes, as long as the identifier designates a discrete note. If the request transmitted by User A does not conform to the serialization logic, it is declined, and User A may be prompted to recheck the serial number on the banknote.

In STEP 3010, if the request contains a valid meta-serial number, then the proof of cash module checks whether digital money is available to the holder of the banknote. If digital funds are available, the process proceeds to STEP 3015, and if not, the request is declined (STEP 3030) and the process ends. For example, in an embodiment where a printed currency is forked, the proof of cash module would examine whether an entry had previously been made, and would decline digitization of previously verified bills. If no entry existed, the proof of cash module may derive the face value of the note from the serialization logic and prompt User A to complete remote verification to unlock the corresponding digital money (STEP 3015).

If User A completes remote verification, then some identifier may be entered in the proof of cash module's ledger to associate User A with the verified banknote (STEP 3025). The identifier will normally be a public address cryptographically paired to User A's private key, but an endless range of alternative identifiers exist, including PINs and passwords, third-party accounts, and biometric factors. When an identifier refers to an account capable of receiving messages (e.g., a phone number, an email address) the proof of cash module may store the identifiers and later send codes that enable digital money to be unlocked on ledgers or blockchains.

The method shown in FIG. 30 may be incorporated into more complex embodiments. When forking a currency, the availability of digital money for remote verification of a particular bill depends only on whether the bill has already been verified, and the quantity of digital money depends only on the face amount of the bill. However, the ledger may be implemented to allow arbitrary types and quantities of digital money to be associated with any serialized bill. Digital money may thereby be "uploaded" to a circulating note, not merely "downloaded." (No physical change need occur in the banknote for digital currency to be added or removed from the ledger account corresponding to its meta-serial number.)

For example, User B may send digital money to a particular banknote via the meta-address for that bill in the proof of cash module's ledger (e.g., native ledger repositories 130 of FIG. 1, above), and the proof of cash module may release those funds to the next user to remotely verify possession of that bill. The proof of cash module may either embed digital money in publicly revealed accounts, enabling a scavenger hunt for those bills, or embed digital money in unknown bills, allowing pseudo-random rewards to be unlocked by users scanning banknotes from within the pool of accounts that might contain the money. (e.g., a user scanning a $1 bill may unexpectedly unlock $1 million of embedded digital money).

The type and quantity of digital money can vary freely from the identifiers of the bill in which they are embedded. In theory, ten billion dollars of Bitcoin could be uploaded into a one-dollar bill, whose true worth users could verify or unlock using computers connected to the network. Indeed, not only money, but any digital content may be routed this way to the unique address specified by the bill's meta-serial number, including encrypted or human-readable messages. Since the possession of a discrete bill can be verified on the network, any bill can function as a "possession factor" for arbitrary applications. (e.g., possession of a bill may be substituted for recalling a password).

In certain embodiments, particularly ones where bills may unlock arbitrarily large quantities of digital money, it may be desirable to modify the method shown in FIG. 30 by conducting remote verification before allowing User A to query the proof of cash module about whether any funds are available in the ledger for the designated meta-serial number. Likewise, a multi-tiered process may be employed, in which some degree of initial verification is performed before revealing an unclaimed balance (e.g., a frontal photo) and greater verification must be completed before the funds are released. In some embodiments, after initial verification funds may be displayed to User A as provisionally credited in the ledger, but will only be permanently credited and/or exported to a blockchain after final verification. A timer may be employed, so that provisional funds are removed from User A's account if final verification is not completed within a designated period. Notifications on User A's mobile device may prompt User A to complete this process in order to avoid forfeiting provisional funds.

Figure 31:
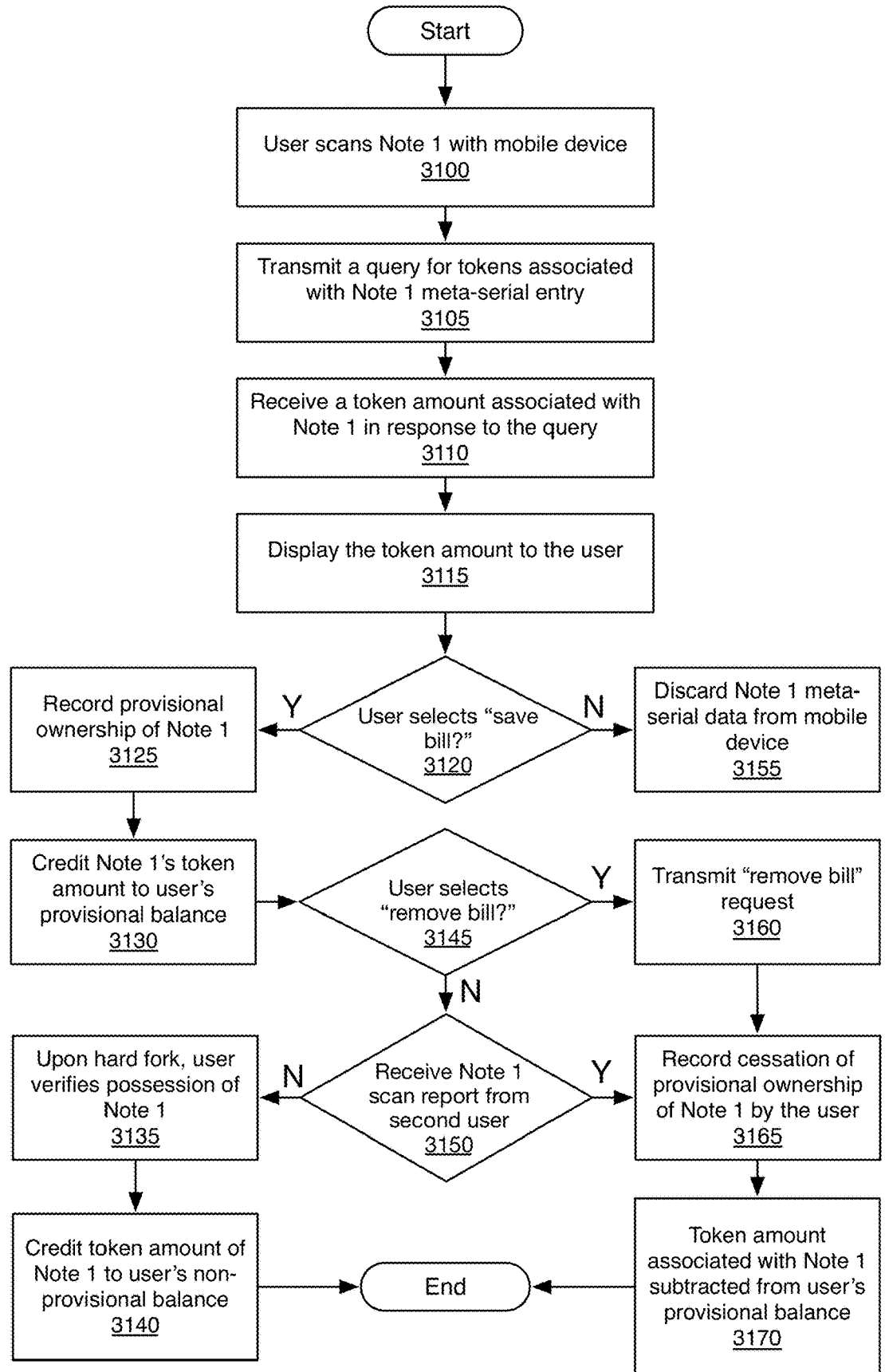

FIG. 31 shows a flowchart of a method and timeline for issuing digital money to the owners of serialized banknotes. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 31 should not be construed as limiting the scope of the invention.

In one or more embodiments of the invention, the user can be presented with an option to spend a serialized banknote during the soft fork, or to save it by retaining the note until the hard fork whereupon the embedded cryptographic tokens are uploaded to the cryptographic ledger platform.

Figure 12:
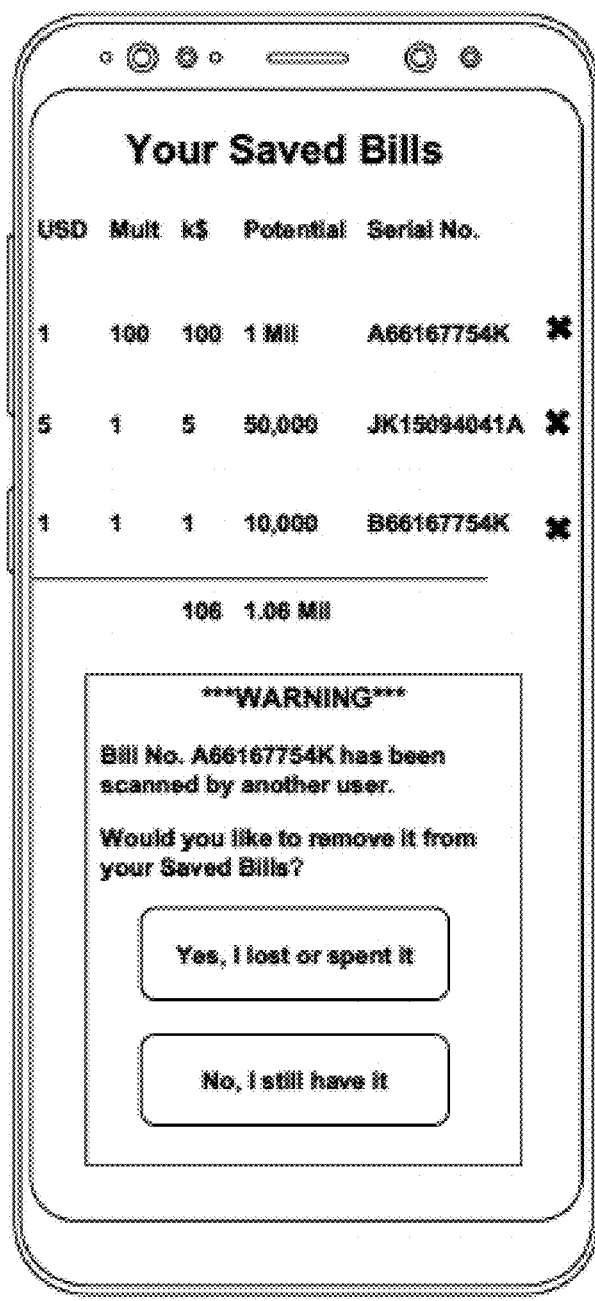

One example of this method is illustrated in FIG. 31. In STEP 3120, if the user selects the option to save the note, then a message indicating provisional ownership of the scanned note is transmitted by the user's mobile device to the platform and recorded in a repository of the platform (STEP 3125), and the quantity of cryptographic tokens virtually embedded in the bill is provisionally credited to the user (STEP 3130). In STEP 3120, if "save" is not selected, the meta-serial data from the scanned bill is discarded on the user's device (STEP 3155), but in some embodiments the data may be retained but differentiated from the meta-serial numbers of saved bills.) The user may access a list of saved bills and designate some or all from removal if they have been spent or lost, as shown in FIG. 12.

Returning to STEP 3145 of FIG. 31, if a user chooses to remove a given bill, a removal message containing its meta-serial number is transmitted from the user's device to the platform (STEP 3160), which records that the bill is no longer provisionally owned by the user (STEP 3165), and subtracts the cryptographic tokens associated with the bill from the user's provisional balance (STEP 3170).

Even if the user does not manually remove the bill from the list of saved bills after spending it, the system may nevertheless detect that the bill has not been saved, once it circulates and comes into the possession of a new user who attempts to scan it and determine its value (STEP 3150). The receipt of a message from the new user's device indicating that the bill has been scanned may be used to automatically remove the bill from the old user's list of saved bills, as shown in STEP 3165, and the token amount associated with the bill can then be subtracted from the user's provisional balance (STEP 3170). Once a hard fork is initiated and cryptographic tokens are no longer trapped on bills, users are prompted to complete verification of the bills they previously saved (STEP 3135), and the cryptographic tokens stored on those bills may finally be released to their control (STEP 3140). In practice, the verification process employed during that step may involve more thorough scanning procedures than those employed for scanning during the soft fork. For simplicity, in this disclosure it is often assumed that upon completing verification users will upload the cryptographic tokens stored on their saved bills, but some users may choose to retain the cryptographic tokens on the bills.

Another simplification involves the manner in which FIG. 31 implies that the platform's records represent a single, universal record of provisional bill ownership. In one or more embodiments, each user of the network may be presented with whatever record of provisional ownership is consistent with the information input on that user's device, but may be prompted to modify that record if it becomes inconsistent with the platform's master record. This is illustrated in FIG. 12, where the platform has detected that one of the user's previously saved bills has been scanned by a different user. A message from the platform has prompted an alert on the saved-bill screen, so that the user may double-check whether the bill has, in fact, been retained, and then choose either to keep or remove it from the list of saved bills. If the bill is removed, then both its actual and potential cryptographic value (represented as "USDk") will be removed from the total balances of 106 USDk and 1.06 Million USDk, which are shown as totals of the saved bills' cumulative actual and potential value. In some embodiments, the total actual and potential value of all the user's saved bills may also be displayed on the viewfinder screen, and the figures may be updated dynamically each time that a user adds or removes a bill.

Figure 32:
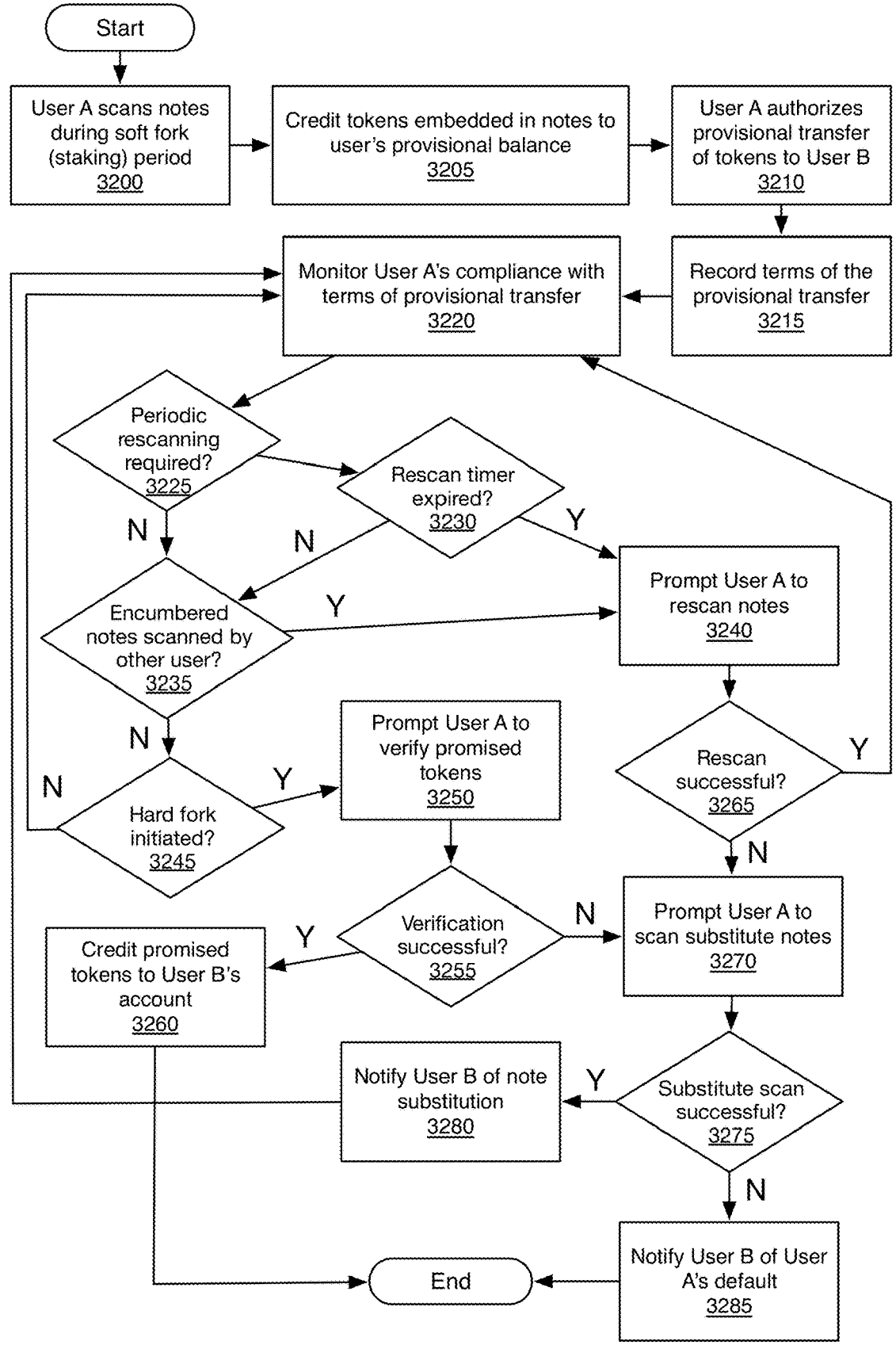

FIG. 32 shows a flowchart of a method and timeline for provisionally transferring cryptographic tokens between users. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 32 should not be construed as limiting the scope of the invention.

To describe such transfers conveniently, terminology such as "lien" and "encumber" is used in this disclosure, but such transfers may, in some embodiments, be performed as novelties among friends rather than as legally enforceable contracts. The disclosure expresses no opinion about how such transfers would be legally categorized in a particular implementation or jurisdiction.

The "periodic scanning" referenced in STEP 3225 may in some embodiments be required as a universal term of transfer, in others as an obligation whose existence or frequency depends on factors such as bill value or user risk profile, or as a freely negotiable term of the provisional transfer which may be proposed by the proposed transferor or transferee and either accepted, rejected, or countered by the counterparty. In some embodiments, either the transferor or the transferee may be the party to initially propose the transaction.

In STEP 3230, "Re-scan timer expired?" refers to the imposition of a condition that the user must scan the serialized note within some temporal period. The specifics of the mandated schedule (e.g., whether scanning is performed at fixed dates or upon an interval that is reset by each scan) may vary both among embodiments and, in some embodiments, among the terms of the individual transfers. In STEP 3235, "Encumbered notes scanned by other users?" refers to the cryptographic ledger platform receiving a transmission from a third-party's device for a scan of a bill with a meta-serial number whose cryptographic tokens had been promised in a provisional transfer. In STEP 3265, when the platform determines whether re-scanning was successful, it means whether the transferor re-verified possession of the original note by re-scanning it within an allocated period, whose duration may itself vary according to the terms of a given transfer or embodiment.

STEP 3270 includes the option for User A to scan substitute notes, but this option need not be included in all embodiments. In some embodiments, no notification of bill substitution is provider to the transferee, while in others the transferee's express approval may be required before bill substitution. In some embodiments, notifications of default will be sent not only to User B, but other users on the network, such as other users who have received provisional transfers from User A, even if their provisional transfers have not been directly defaulted upon yet.

An alternate embodiment of provisional transfers, which may be preferred in some contexts, adapts the method illustrated in FIG. 32 so that provisional transfers are not tied to individual notes. Rather, a transferor may increase his provisional balance by scanning notes, then transfer portions of that provisional balance, promising not to retain any particular note but rather to retain an adequate quantity of cryptographic tokens on his provisionally owned bills to pay all transferees with non-provisional funds once the hard fork occurs. In that implementation, the scanning of encumbered notes by other users would only require substitute notes to be scanned if subtraction of the notes from the transferor's provisional balance meant that the balance of cryptographic tokens on the transferor's saved bills was no longer sufficient to cover the quantity of cryptographic tokens pledged via the provisional transfer(s).

Figure 33:
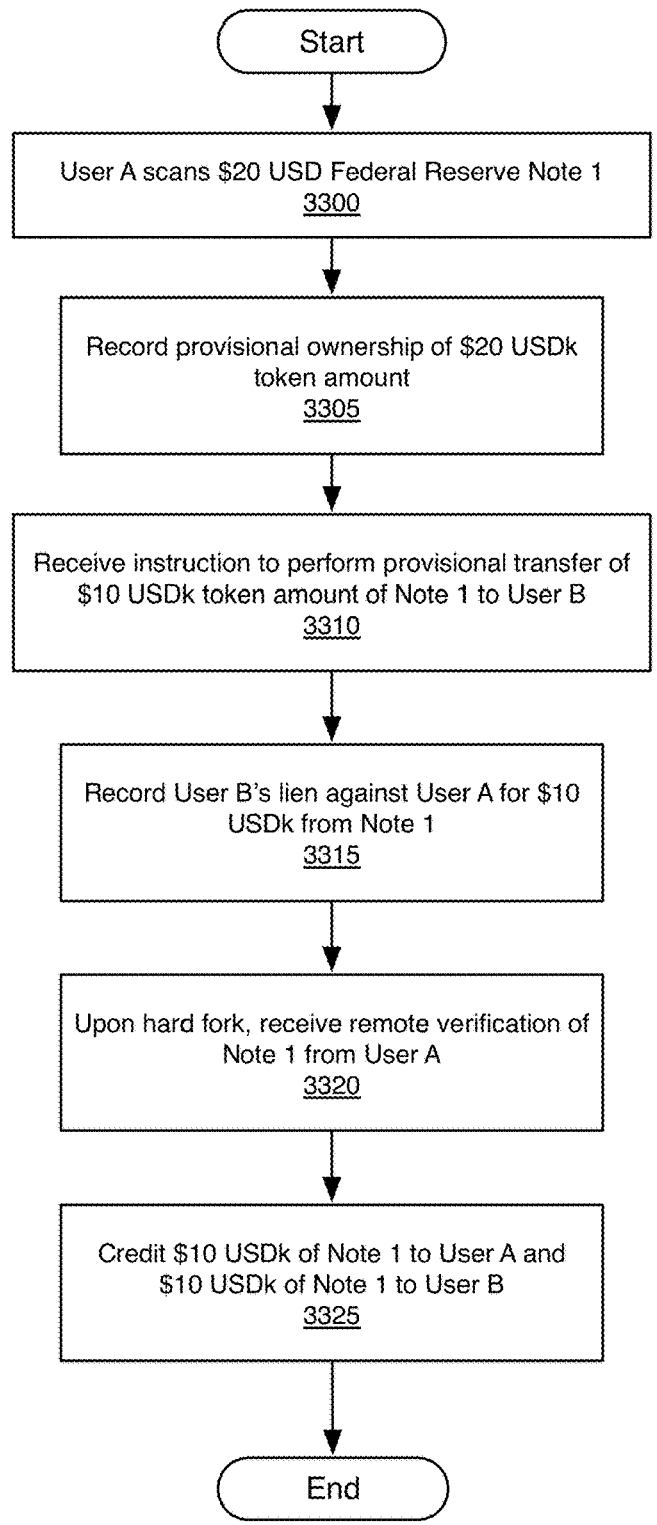
Figure 34:
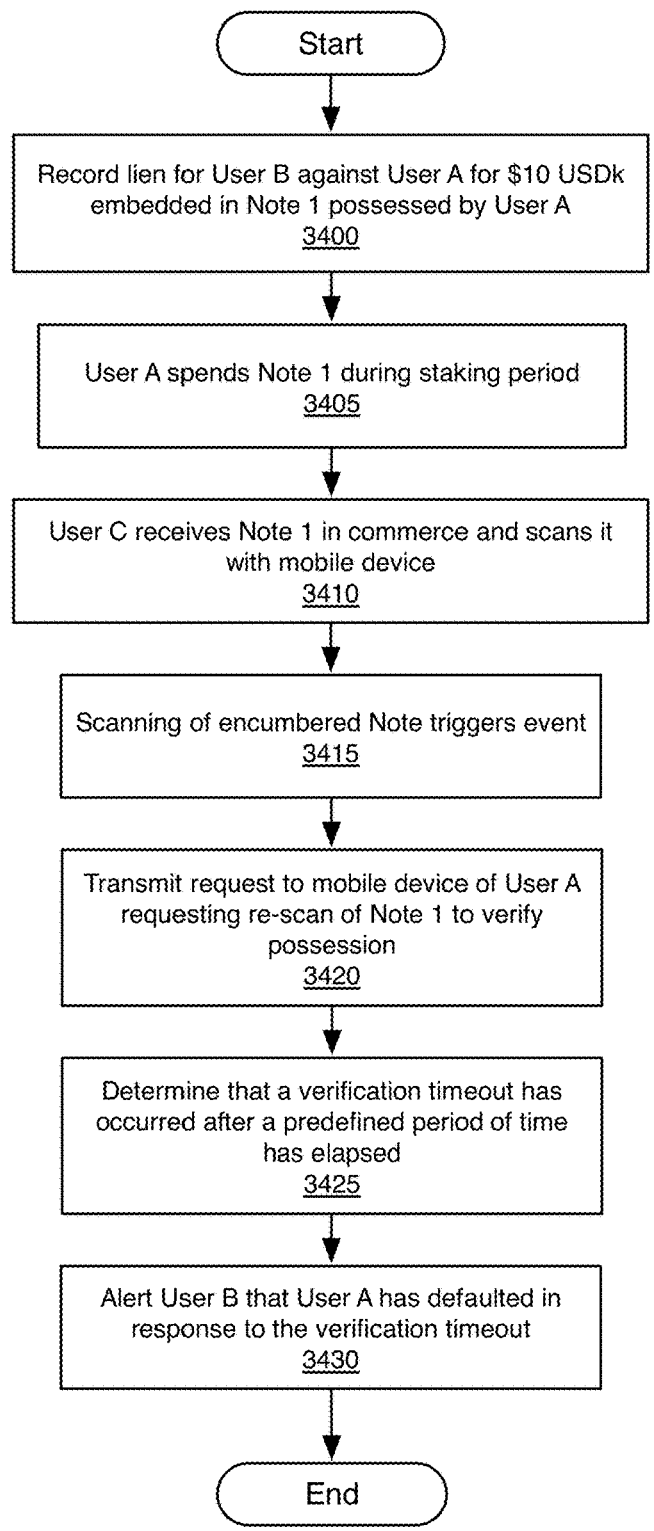
Figure 35:
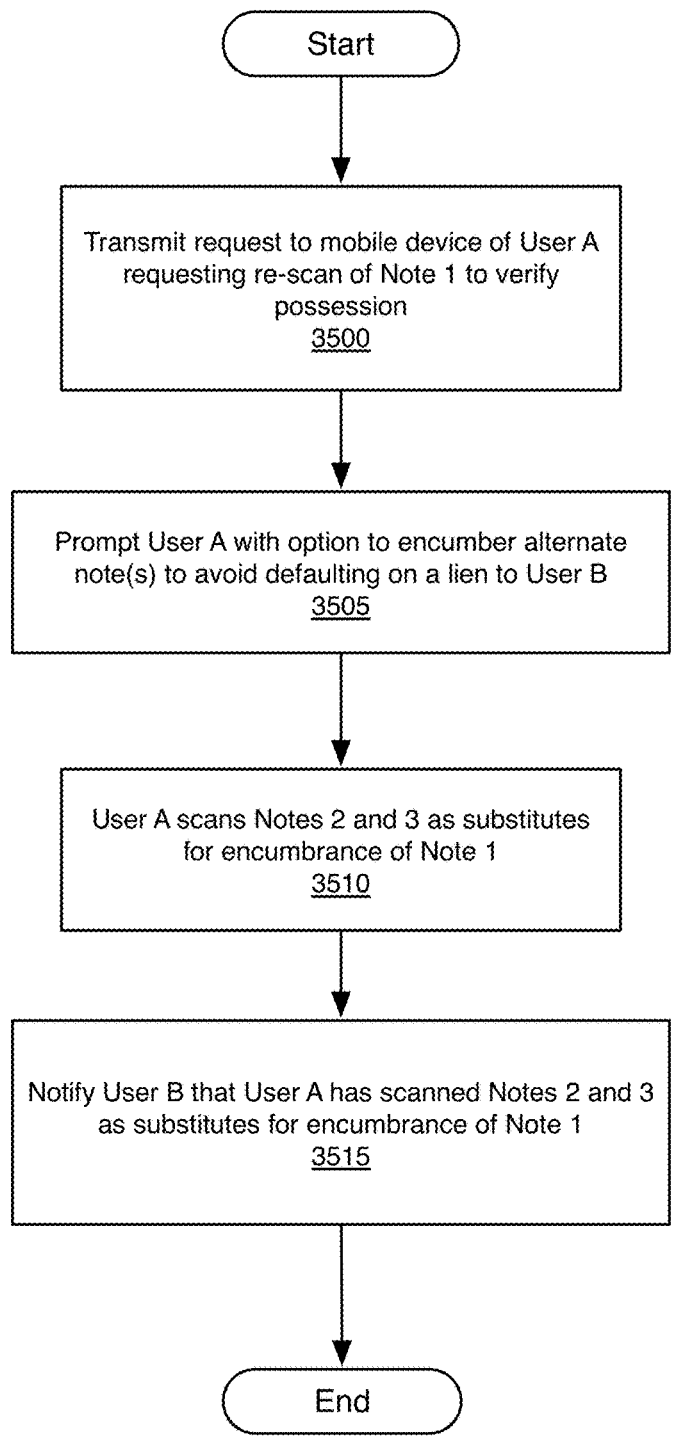

FIGS. 33-35 show flowcharts of example methods depicting bill-based transfers between users. While the various steps in the flowcharts are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 33-35 should not be construed as limiting the scope of the invention.

In FIG. 33, User A provisionally transfers 10 cryptographic tokens depicted by the example denomination "USDk" from a 20 US Dollar ("USD") note to User B, then retains the note as promised and verifies possession after the hard fork, so that 10 of the 20 USDk on the note is automatically transferred to User B.

In FIG. 34, User A spends the note, it is scanned by User C, User A is unable to re-scan the note, there is no option for note substitution, and User B is notified of User A's default.

In FIG. 35, User A is provided a note substitution option and makes use of it, scanning two notes whose combined value is sufficient to take the place of the previously scanned single note. The example is intended to illustrate that combinations of different notes may be employed as substitutes for one another. If the cumulative value of the substitute notes exceeds the quantity of the transfer, the excess cryptographic tokens may be retained by the transferor. In some embodiments, a transferor may mitigate a complete default by scanning substitute notes of lesser value, thereby transforming it into a partial default.

Figure 36:
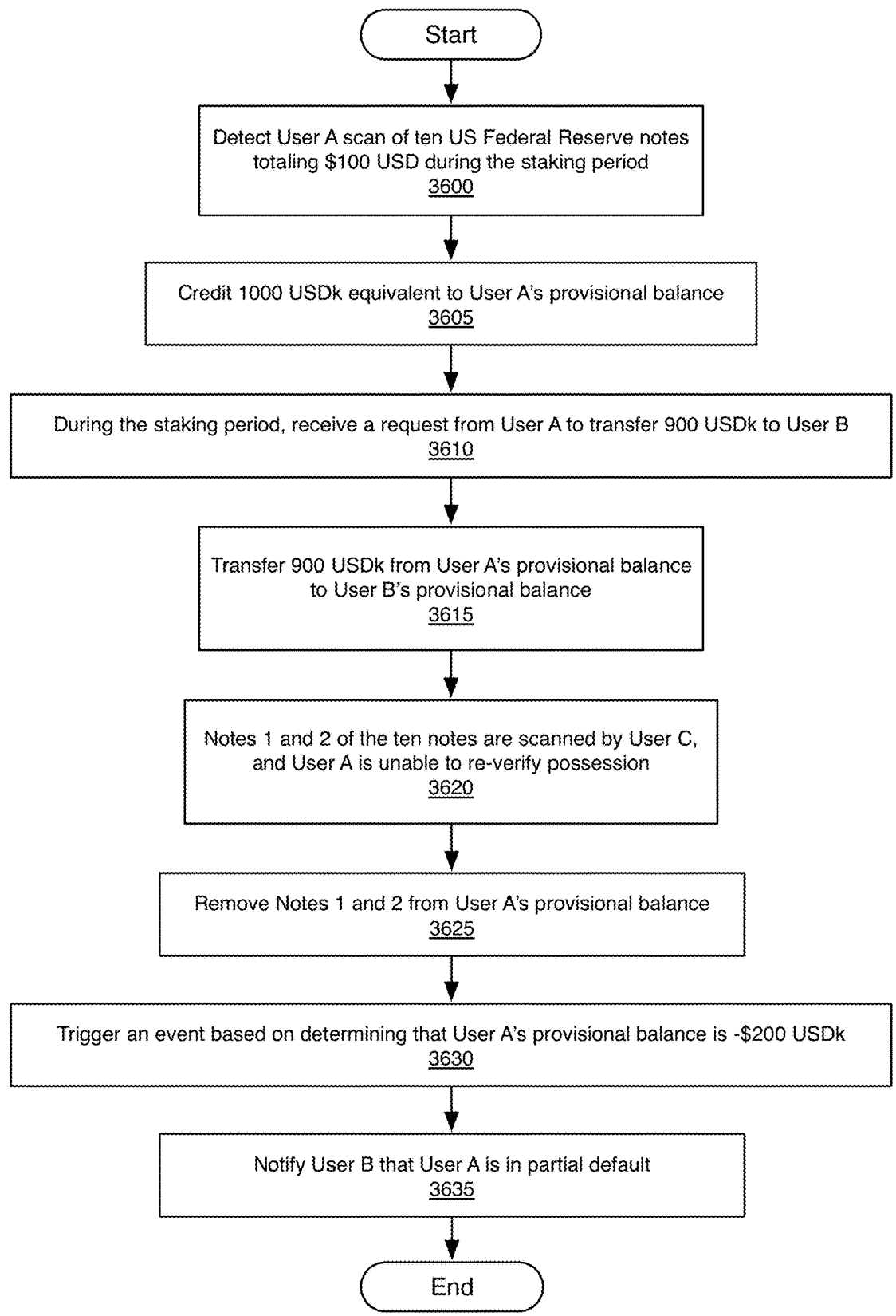
Figure 37:
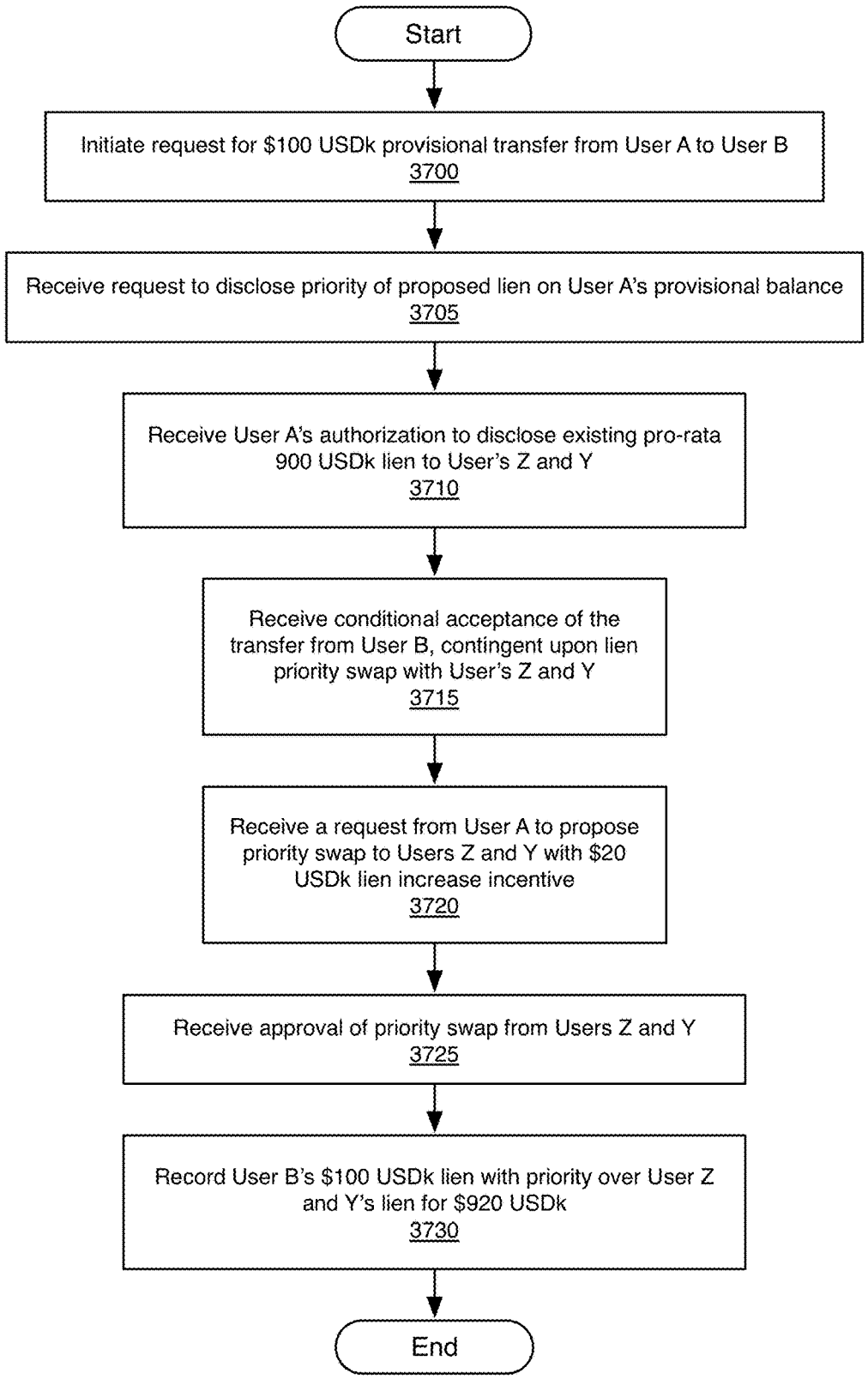

FIGS. 36-37 show flowcharts of embodiments where provisional transfers that are not grounded in a particular meta-serialized bill. While the various steps in the flowcharts are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 36-37 should not be construed as limiting the scope of the invention.

In FIG. 36, User A saves 1,000 cryptographic tokens depicted by the example denomination "USDk" worth of $100 USD bills, then makes a 900 USDk provisional transfer. User A must therefore retain at least 900 USDk on User A's provisionally owned bills in order to avoid defaulting on the transfer. If User A spent only one $100 bill, and it was scanned by User C, then the discrepancy could be flagged for User A, but it would not be necessary to re-scan the note in order to avoid default. However, in FIG. 36, User A spends two of the $100 USD bills that were being saved, so that the 800 USDk value of User A's saved notes is no longer adequate to cover the 900 USDk transfer to User B. Thus, when User C scans those notes, and User A is unable to re-verify possession, the platform notifies User B of the partial default—i.e., a 100 USDk shortfall in User A's ability to meet his provisional transfer obligations. In some embodiments, default during the soft fork is not a permanent condition, and User B would be notified by the proof of cash module of the platform again if user A remedies the shortfall in the future by scanning additional notes.

Lien priority may be a significant issue for provisional transfers that are not grounded in a given meta-serialized bill. In FIG. 37, User B demands to know the priority of a proposed lien before accepting a provisional transfer. This functionality may be included in some embodiments, with details of how and when the priority is disclosed varying by implementation. In FIG. 37, the platform obtains User A's permission to disclose an earlier provisional transfer to Users Y and Z, who have a pro-rata right to 900 USDk from User A. This is purely illustrative; the conditions under which funds are owed in a pro rata manner rather than a sequential sequence of lien priority will depend on each implementation. In FIG. 37, User A obtains User Y and Z's authorization for a lien priority swap with User B by increasing the amount of the provisional transfer to them by 20 USDk. The particular structure of the lien priority swap and the incentive offered to the prior provisional transfer recipients is purely illustrative. In some embodiments, far more complex swaps may be executed by the platform, some including many more parties whose liens are restructured, others including not merely the order of priority but the identity of the transferor, the type of cryptographic tokens promised, and etc.

Figure 38:
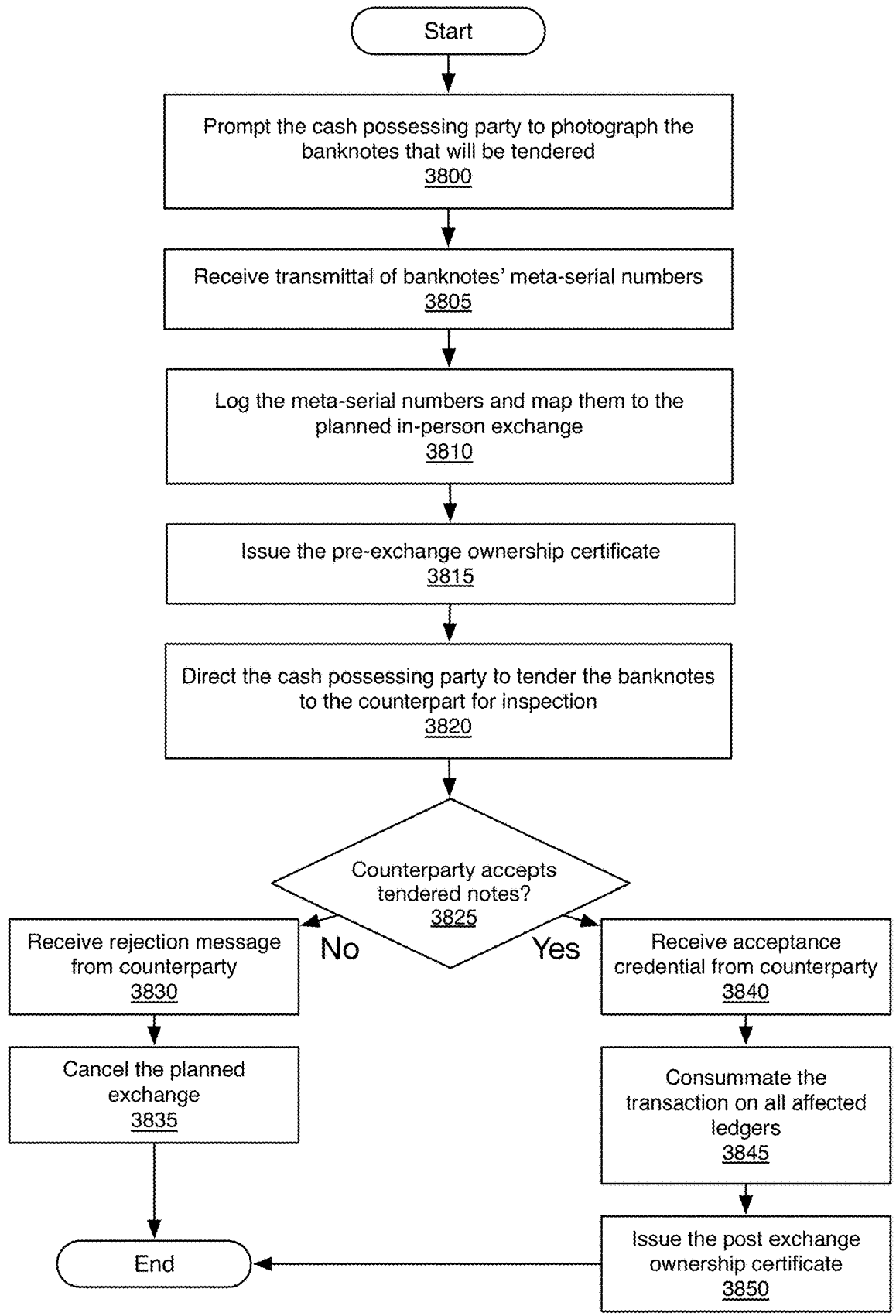

FIG. 38 shows a flowchart of a method for trustless in-person currency tender and exchange, in which meta-serial number reporting and tracking prevent double-entry accounting from being circumvented. While the various steps in the flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 38 should not be construed as limiting the scope of the invention.

Before the exchange occurs, in STEP 3800, the application prompts the cash-possessing party to photograph the banknotes that will be tendered to the counterparty. In some embodiments, this prompt may be initiated locally by the device upon, while in other embodiments it may be triggered by receipt of a transmission from the cryptographic ledger platform. For security reasons, it is generally preferred that the cash possessing party capture or input the meta-serial numbers before arriving at the meeting location, but this is not always possible, such as, e.g., when a transaction is initiated by parties who have already met in person.

In STEP 3805, the meta-serial numbers of the notes are then transmitted from the user's device to the platform. In some embodiments, this may be accomplished by transmitting raw image data to the platform, while in other embodiments the image data may be processed on the user's device and only the resulting meta-serial numbers are transmitted. In a crude embodiment, photographing the banknotes may be substituted for manual entry of the inputs (e.g., nation, denomination, serial number) required to derive the meta-serial number.

In STEP 3810, the platform receives the meta-serial numbers of the bills that the cash-possessing party is going to tender, and it associates those discrete bills with the pending in-person exchange with the counterparty. Including not only ownership by the cash-possessing party but also the identifying information on the transaction and counterparty is critical, because the counterparty may otherwise pocket the bills and claim to have received them from the cash possessing party pursuant to some other transaction.

In some embodiments, to provide even greater assurance, an additional step/operation may be included, in which the counterparty receives the list of meta-serialized notes that will be tendered and/or images of the notes and transmits a consent message to the proof of cash module of the platform. This may either be a pre-certificate list generated by the platform or an actual platform-issued ownership certificate that the counterparty approves, permitting issuance of an addition pre-exchange ownership certificate including the counterparty's approval. In either implementation, use of an identity authentication credential, such as a password or biometric factor, may be employed to capture proof that the receiving party disclaimed possession of the meta-serialized notes prior to the tender.

In STEP 3815, a pre-exchange ownership certificate is issued (e.g., by the proof of cash module of the platform of FIG. 1) identifying the cash possessing party, the meta-serialized banknotes that will be tendered, the proposed transaction, and the cash receiving party. In one embodiment, this certificate is signed with the platform's private key and transmitted to the cash-providing party's mobile device, so that it in the event of a dispute with the cash-receiving party the certificate may be shown to law enforcement in order to establish ownership of the tendered notes. In some embodiments, it may also be transmitted to the cash receiving party. In other embodiments, pre-exchange and post-exchange ownership certificate are not automatically issued by the platform, but can be requested by either party or by law enforcement in the event of a dispute. The inputs needed for creation of the certificate are stored by the platform, which allows certificates to be issued on demand.

In STEP 3820, the cash-possessing party is then directed to tender the notes to the cash-receiving party, so that the number and authenticity of the notes may be examined. For example, the proof of cash module may be configured to send a message to an application executing on the user's mobile device with specific instructions to the cash possessing party. In FIG. 38, for simplicity it is assumed that all of the notes are tendered at once, but in large transactions that may be impractical or undesirable. In some embodiments, the exchange may be divided into multiple sub-exchanges, with subsets of notes tendered and approved. In other embodiments, the authenticity of a large quantity of notes may be accomplished via a pre-exchange sampling procedure, in which the proof of cash module or the counterparty select an unpredictable subset of the meta-serialized notes for tender, so that the counterparty may closely inspect those notes in order to infer the authenticity of the broader set of notes registered by the cash-possessing party. This procedure may require an additional transaction step, in which the counterparty transmits confirmation of the authenticity of the sampled notes to the platform, which then prompts the cash-possessing party to tender the remainder of the notes for counting by the counterparty.

In STEP 3825, after receiving the notes from the cash possessing party, the counterparty uses his or her mobile device to either accept or reject the notes. If the notes are rejected, a rejection message is transmitted to the platform (STEP 3830), and the platform cancels the planned exchange (STEP 3835). In one embodiment, upon canceling the exchange the platform will prompt the counter-party to return the notes. Rather than risking a confrontation between the parties about the authenticity of the notes, in some embodiments the platform may indicate to the cash possessing party that there was e.g. an error in processing the transaction or that the counterparty lacked adequate funds to proceed.

The pre-exchange ownership certificate remains in effect, so the cash-possessing party retains proof that the notes do not belong to the counterparty. In one embodiment, the cryptographic ledger platform may direct the cash-possessing party to contact law enforcement if the counterparty refuses to return the notes or attempts to flee. In some embodiments, the application may provide an option for the cash possessing party to directly contact law enforcement and/or private mediators or security personnel providing services to users of the network. In the event that a counterparty attempts to flee with the tendered banknotes, in some embodiments a location monitoring module of the platform (not shown in the corresponding figures) may be used to track the party's movements in coordination with law enforcement. Likewise, the location monitoring modules of other devices may be used to identify nearby users and to solicit their assistance in reporting information to law enforcement.

In STEP 3840, if the counterparty instead chooses to accept the tendered notes, then the acceptance credential of the counterparty is received (e.g., by the proof of cash module). In the example of FIG. 38, this is accomplished by the counterparty using his or her mobile device to transmit the acceptance credential to the platform. In some embodiments, the credential may be locally transmitted to the cash possessing party's device, and the cash-possessing party's device may then transmit the counterparty's acceptance credential to the platform. Alternatively, the counterparty may disclose the acceptance credential to the cash-possessing party using non-electronic means (e.g., writing it down, saying it out loud, pantomiming it, etc.), so that the credential may be input into the cash-possessing party's device and transmitted to the platform.

Normally, no approval credential from the cash-possessing party is required, because the cash-possessing party suffers no detriment during the transition from banknote tender to transaction consummation. There is therefore no "exchange" of tokens or credentials: only unilateral transmission or disclosure of the tender approval credential by the counterparty.

There are specialized circumstances, which are not depicted in FIG. 38, in which it is appropriate for the proof of cash module to condition transaction consummation on receipt of an approval credential from a cash-possessing party. First, in some embodiments, the platform may lack even read access to the payment ledger being employed by the counterparty to compensate the cash-possessing party for the meta-serialized notes. In that circumstance, the platform may be configured wait to receive an approval credential from the cash possessing party confirming payment by the counterparty, before reassigning ownership of the notes. Second, some transactions may involve two cash possessing parties. (e.g., an exchange of EUR notes for USD notes, each of which may also be embedded with cryptographic tokens) In that circumstance, there are two counterparties receiving banknotes, each of which faces detriment if the notes tendered by the other party are inauthentic or insufficient, so the platform can only consummate the change of meta-serialized bill ownership upon receiving tender acceptance credentials from both parties.

In STEP 3845, once the counterparty's receipt of sufficient authentic banknotes is confirmed to the cryptographic ledger platform upon receipt of the tender-acceptance credential, the platform consummates the transaction on all affected ledgers. In some embodiments, the platform has write access to all affected accounts, and simply executes the balance changes itself. In other embodiments, some affected accounts reside on ledgers controlled by external agents such as banks or decentralized validators, and the platform transmits the authentication messages needed to initiate balance alterations (e.g. transaction instructions signed with its private key.) The term "account" is used in this disclosure for simplicity, but those skilled in the art will understand that UTXOs may also be employed, and that a combination of UTXO and account-based execution may be necessary when consummating an exchange that affects multiple ledgers.

In a simple embodiment, funds are debited from the counterparty's account in an amount corresponding solely to the banknotes provided by the cash-possessing party (e.g., by the proof of cash module), and the entirety of the amount debited is credited to the cash-possessing party's account. In some embodiments, the amount debited may be increased to reflect one or more transaction fees and/or taxes paid to the cash-possessing party, the platform, and/or other parties, such as a government or private actor providing a safe transaction environment. In other embodiments, those charges may be paid in part of whole by decreasing the amount credited to the cash possessing party.

In some embodiments, charges and/or deposits may be divided among multiple accounts controlled by a single entity, and new temporary or permanent accounts may be created to control funds affected by transaction consummation. Funds owed to a given party per the terms of the transaction also may be retained or deposited in another party's account while credentials are issued to the owner enabling the funds to be accessed on demand. For example, the proof of cash module can debit 100 USD-based cryptographic tokens ("USDk") from the counterparty's account, credit 100 USDk to the platform's account, and email the cash-possessing party a code that entitles the bearer to receive a 100 USDk transfer from the platform. An advantage of this implementation is that the onboarding process for account creation can be deferred until the user relies on the credential to redeem the funds. One embodiment appears identical from the user's perspective but unlocks funds stored in a different account. In this example, the platform deposits the counterparty's funds into Account A and sends the cash-possessing party a code to receive a transfer in the same amount from Account B.

In the example of FIG. 38, the platform records of meta-serialized bill ownership are one of the ledgers affected by transaction consummation, because the notes tendered by the cash-possessing party are reclassified as property of the counterparty. When the counterparty's funds are stored on a ledger controlled by the platform, reclassification of note ownership can be executed in parallel to the adjustments of account balances, but if the funds are stored on an external ledger, the platform may need to defer note reclassification until payment is confirmed.

For simplicity, FIG. 38 depicts tender acceptance as a single decision affecting all notes, but in some embodiments the counterparty may accept some tendered notes while rejecting others. In those embodiments, the counterparty must transmit a qualified acceptance message to the cryptographic ledger platform listing either the accepted notes or the rejected notes by their meta-serial numbers. In some embodiments, the cash-possessing party may tender a replacement note or note(s) as substitutes for rejected notes, by performing the meta-serial registration process on the substitute notes and then tendering them to the counterparty. As long as the meta-serial number of each note is transmitted to the platform before that discrete note is tendered, the platform's meta-serial tracking module can support arbitrary expansions of the notes involved in the transaction. Notes rejected by the counterparty are excluded from the post-exchange ownership certificate issued to the counterparty.

In some embodiments, rather than an undifferentiated "rejection" designator, the mobile application allows the counterparty to select reasons for rejection (e.g. note omitted from tender, note in unacceptable condition, note counterfeit, etc.) and these reasons may have different consequences for the cash-possessing party's rating or status, as determined by the cryptographic ledger platform. In some embodiments, a party accused by the counterparty of tendering one or more counterfeit notes may be prompted by the platform to immediately subject the notes to proof-of-cash verification.

In STEP 3850, upon reassigning ownership of the meta-serialized notes that changed hands in the exchange, the platform issues the counterparty a post-exchange ownership certificate that supersedes the pre-exchange ownership certificate issued to the cash-possessing party. In one embodiment, the post-exchange certificate is also transmitted to the cash-possessing party's device. Otherwise, a separate transaction-completion message must be delivered.

Transmission of the certificate itself is often preferable because storage of the post-exchange certificate on the cash possessing party's device provides supplemental local electronic proof that ownership of the notes was reassigned to the counterparty. In one embodiment, the mobile application does not permit the user to delete individual certificates, but rather maintain a log of all certificates received during e.g. the last x days or y transactions. This may be accomplished merely by logic within the mobile application, or in more advanced embodiments via a hash chain linking each certificate to the prior certificate(s) issued to the user. A malicious cash-possessing party who wishes to conceal exchange completion may delete all application data, but doing so will also delete the pre-exchange certificate needed to falsely claim ownership of the notes. In some embodiments, upon receiving and validating the post-exchange certificate, the mobile application will categorize the corresponding stored pre-exchange certificate as superseded and will display them only with a designated visual indicator (e.g., a "SUPERSEDED" virtual watermark).

In some embodiments, the method shown in FIG. 38 may be supplemented with additional uses of phone sensors during the tender process. For example, the mobile devices of one or both parties may capture audio and/or video of the exchange of cash, and it may be stored locally and/or broadcast to the platform. In the event of a dispute, the recording(s) of the transaction may be provided to law enforcement in conjunction with the ownership certificates, as a further degree of proof. In some embodiments, a human third party or drone may also be directed to the meeting location to record the transaction.

One potential vulnerability known to peer to peer networks is a variant of the Sybil attack. In one example, a user who appears to have a good reputation on the network may in fact be a conspirator in a criminal enterprise. Rather than directly robbing counter-parties, the Sybil attacker can use the network to unmask cash-possessing parties and then pass that information on to conspirators who will rob those parties. For example, the Sybil attacker may offer to receive large deposits (or request a large cash delivery) in order to be matched with a user carrying significant quantities of cash, and then relay the identity and location of that user to a criminal gang who will then rob the user of the cash. In some instances, the same exploit may be performed by stealing another user's phone and then requesting a large cash withdrawal. Information that is innocuous in the context of e.g., ridesharing, such as the position of potential providers on a map, could become a serious security risk when those providers are carrying large quantities of cash.

Figure 39:
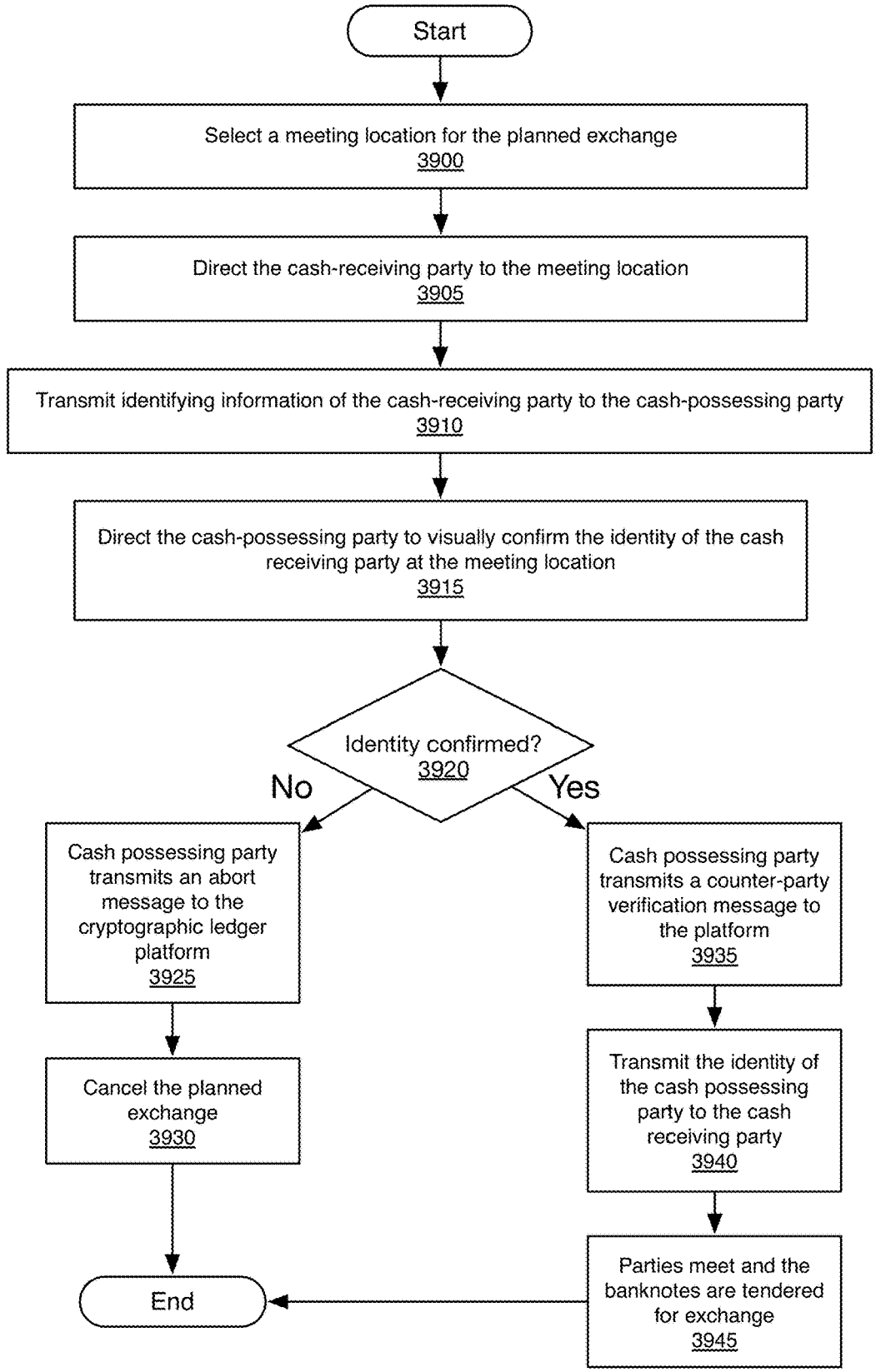

FIG. 39 shows a flowchart of a method for arranging peer-to-peer in-person currency tender that prevents Sybil attackers from robbing cash possessing parties. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 39 should not be construed as limiting the scope of the invention.

For simplicity, in FIG. 39 the cryptographic ledger platform has already matched two parties for an exchange, so the first operation shown is selection of the meeting location by the cryptographic ledger platform (STEP 3900). In some embodiments, only a single meeting location will satisfy the constraints imposed by the parties. However, the security benefits of the method shown in FIG. 39 may be lessened if the meeting is arranged at the location of the cash-possessing party.

In STEP 3905, upon selecting a meeting location, the cryptographic ledger platform directs the cash receiving party to that meeting location. In some embodiments, the location is transmitted to an application on the cash-receiving party's mobile device and immediately displayed, while in other embodiments, the application merely displays turn-by-turn directions. In other embodiments, rather than transmitting the meeting location, the cryptographic ledger platform monitors the cash-receiving party's location and transmits turn-by-turn directions.

In STEP 3910, after or in parallel to directing the cash-receiving party to the meeting location, identifying information of the cash-receiving party is transmitted to the cash-possessing party (e.g., by the cryptographic ledger platform). In one or more embodiments, identifying information provided is data collected during user on boarding, and can include but is not limited to, the name, age, and gender of the cash receiving party. In some embodiments, identifying information about the party's vehicle (e.g., make, model, license-plate number) may also be included to permit identification when the party is inside the vehicle. The identifying information can include representations of the cash-receiving party's appearance, such as a scanned driver's license or a "selfie."

In one or more embodiments, the reliability of this data may be enhanced by employing event-based challenge response anti-spoofing techniques during its capture. For example, the cryptographic ledger platform can provide an arbitrary QR-code. The user can then take a selfie in a mirror with the device's front camera while displaying the arbitrary QR-code on screen. In some embodiments, the cash-receiving party is also prompted to take a selfie when requesting the in-person meeting. Transmitting that image to the cash-possessing party can enhance recognizability by capturing variations in hairstyle, makeup, clothing, etc. Before being directed to the meeting location, the cash-receiving party may be prompted (e.g., by the cryptographic ledger platform) to compare the new selfie to the data captured during onboarding and, if a discrepancy is recognized, to abort the meeting by notifying the cryptographic ledger platform. In some embodiments, the cryptographic ledger platform may identify discrepancies itself by algorithmically comparing the biometric features captured in the new selfie with the features shown in the onboarding image(s) of the cash-receiving party.

Returning to FIG. 39, in STEP 3915, the cash-possessing party is directed to approach the meeting location and to visually verify the identity of the cash-receiving party. In some embodiments, the cryptographic ledger platform simply transmits the meeting location to the cash-possessing party. In other embodiments, the cryptographic ledger platform also notifies the cash-possessing party when the cash-receiving party arrives at the meeting location. For example, the cryptographic ledger platform may be configured to track and report the position of the cash-receiving party to the cash-possessing party while the cash receiving party is en route, and visual verification may be performed in advance of the cash-receiving party's arrival at the meeting location.

In some embodiments, the cryptographic ledger platform may direct the cash possessing party to a pre-meeting location in proximity to the location of the planned exchange. When the cryptographic ledger platform determines that the cash-receiving party has arrived at the meeting location, it may be configured to then direct the cash-possessing party to proceed to the meeting location and perform the visual identity confirmation. In some embodiments, the cryptographic ledger platform may choose a pre-meeting location that has a vantage point on the meeting location (e.g., a bench across the street) so that the cash-possessing party can perform a visual inspection of the cash-receiving party before physically advancing to the meeting location. If while at the pre-meeting location the cash possessing party is able to confirm the identity of the cash-receiving party, in some embodiments the cash-possessing party may request that the cash-receiving party travel to the pre-meeting location for the exchange.

In STEP 3920, it is determined whether the identity of the cash receiving party is confirmed. If so, the process proceeds to STEP 3935. If the identity of the cash receiving party is not confirmed or some indication of failure to identify the party is received, the process proceeds to STEP 3925.

In STEP 3925, if the cash-possessing party is unable to verify the identity of the cash-receiving party, or notices some other "red flag" (e.g., presence of other suspicious individuals, suspicious behavior by the cash-receiving party, etc.), the cash-possessing party uses his or her mobile device to transmit an abort message to the platform. In STEP 3930, the cryptographic ledger platform then cancels the planned exchange. In this way, STEP 3920 may represent lack of verification message rather than an affirmative action in the process of FIG. 39. In some embodiments, delivery of the exchange cancellation message to the cash-receiving party may be delayed (e.g., via a timer, geofencing, and/or user input) to ensure that the cash-possessing party has safely left the area.

If the cash-possessing party confirms the identity of the cash receiving party, and feels comfortable proceeding with the in-person exchange, then the cash-possessing party transmits a verification message to the cryptographic ledger platform (STEP 3935). Upon receipt of the verification message, in STEP 3940, the cryptographic ledger platform transmits the identifying information of the cash-possessing party to the cash receiving party, allowing the parties to proceed with currency tender (STEP 3945). Alternatively, the cash-possessing party may approach the cash receiving party and directly reveal his or her identity. In some embodiments, the cryptographic ledger platform may issue the parties a shared identifier in advance (e.g. a word like "Apple", a transaction number, a QR code, etc.) which the cash-possessing party may recite or display to quickly prove his or her identity.

Figure 40A:
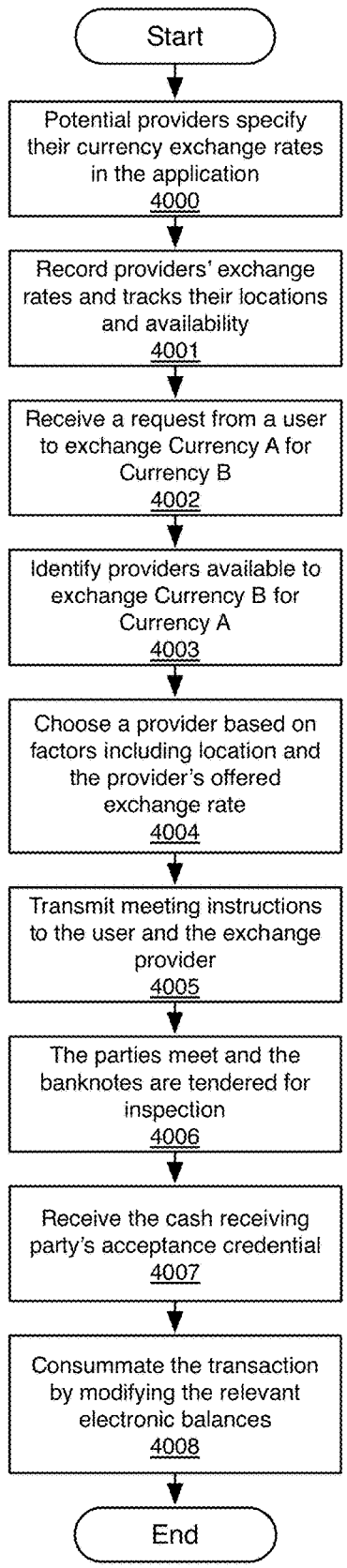
Figure 40B:
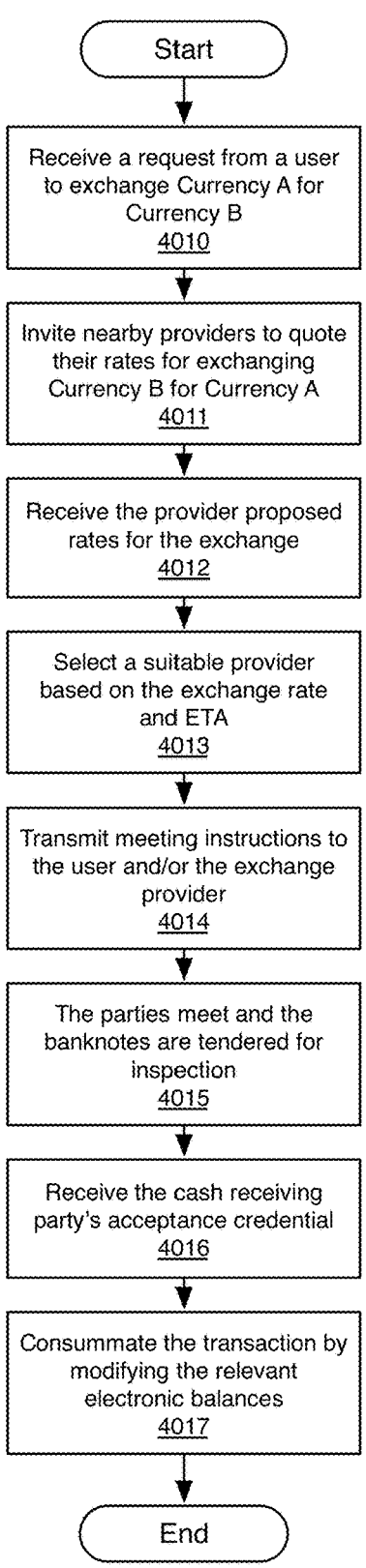
Figure 40C:
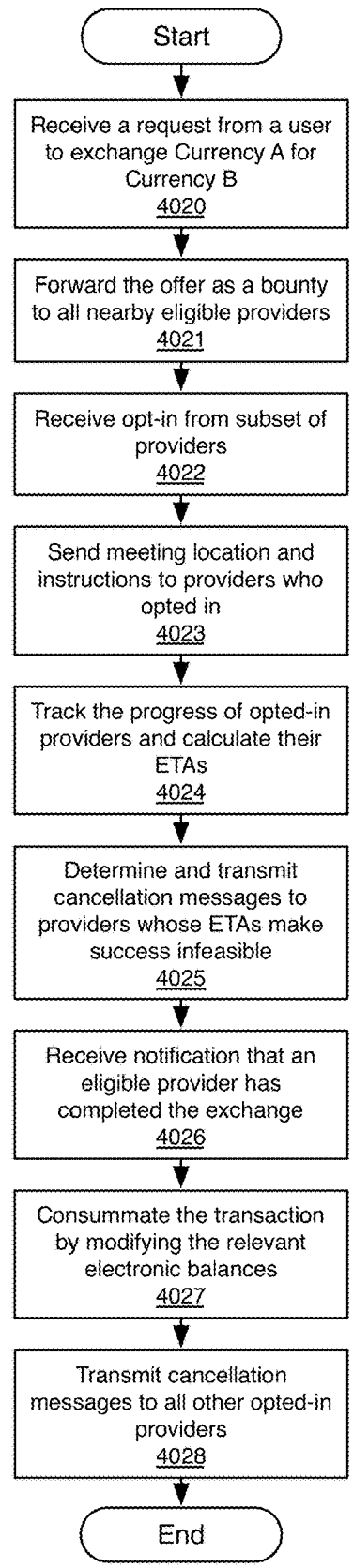

FIGS. 40A, 40B, and 40C show flowcharts of methods for matching exchange providers to exchange requesters using the cryptographic ledger platform. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 40A, 40B, and 40C should not be construed as limiting the scope of the invention.

FIG. 40A shows a method for matching dedicated exchange providers to exchange requesters (e.g., via the cryptographic ledger platform of FIG. 1, above). In STEP 4000, the providers specify their exchange rates in a mobile application. The cryptographic ledger platform receives and records these rates (STEP 4001) and, when they indicate they are available for exchange proposals, it tracks their locations. In STEP 4002, a request is received (e.g., by the cryptographic ledger platform) from a user who wishes to exchange one type of money, Currency A, for another type of money, Currency B. In STEP 4003, geographically suitable providers who are available to exchange Currency B for Currency A are selected based on a variety of criteria, heuristics, and/or models. In STEP 4004, a provider is chosen based on factors that include the proximity of the provider to the user and the attractiveness of the provider's offered exchange rate. Artificial intelligence can be utilized to optimize the matching algorithm based on said factors, as well as user-specific, geographic, and other data available to the platform.

In STEP 4005, upon selecting a provider, meeting instructions are transmitted to mobile devices of the user and the exchange provider, which include directions to the location of the exchange. The parties meet in person and the party carrying banknotes tenders those notes to the other party (STEP 4006). After inspecting the banknotes and determining that they are acceptable, the party receiving the banknotes transmits the tender-acceptance credential to the cryptographic ledger platform or conveys it to the cash-providing party, who transmits it to the platform (STEP 4007). Upon receiving the acceptance credential, the platform consummates the exchange by modifying all electronic balances affected by the transaction (STEP 4008), including in some embodiments balance adjustments needed for payment of taxes and/or fees.

In some embodiments, as in the example of FIG. 40A, particularly when providers have authorized automatic acceptance, a single provider may be dispatched algorithmically by the cryptographic ledger platform. In other embodiments, multiple potential providers may be presented to the user, whose input determines which provider will be dispatched. In yet other embodiments, multiple providers may be prompted to accept the proposed exchange, and the transaction may be assigned either to the first one whose acceptance is received by the platform or, alternatively, to the most favorable option from within the pool of providers who responded within the available period. In some embodiments, the platform may reassign exchange providers after dispatch based, for example, on a provider activating the application who is closer to the user and higher rated than the exchange provider who has been dispatched.

FIG. 40B shows another method for matching dedicated exchange providers to exchange requesters (e.g., via the cryptographic ledger platform of FIG. 1, above). In STEP 4010, the request for exchange is received as in the process of FIG. 40A, but in this example, multiple nearby providers are invited to quote their rates for performing the exchange of Currency B for Currency A (STEP 4011). For example, the cryptographic ledger platform of FIG. 1 (described above), can be configured to identify available providers and to send each provider a real-time message indicating availability of the transaction. The provider proposed rates are then received (STEP 4012) and a suitable provider is selected (STEP 4013) based on their provided exchange rate and estimated time of arrival at the meeting location. The provider can be selected by the cryptographic ledger platform or some subset of providers can be shown for selection by the user, in accordance with various embodiments. STEPS 4014 through 4017 can then be carried out similarly to those of FIG. 40A (above).

FIG. 40C shows yet another method for matching dedicated exchange providers to exchange requesters (e.g., via the cryptographic ledger platform of FIG. 1, above). In STEP 4020, the request for exchange is received as in the process of FIG. 40A, but in this example, a bounty message is sent to all nearby eligible providers indicating that an open transaction is available for exchange (STEP 4021). In STEP 4022, a subset of the providers may respond to the platform with an opt-in message indicating their intent to compete for the transaction. A meeting location is determined and sent with instructions to the providers who opted in (STEP 4023). The instructions may indicate specific parameters of the transaction, such as requirements for how to identify yourself as a provider to the user, safety mechanisms, and other logistical details. As the providers progress towards the meeting location, their progress is tracked and their estimated time of arrival (ETA) in calculated and optionally displayed to the user in real time (STEP 4024). For example, the cryptographic ledger platform of FIG. 1 (above) can be configured to obtain global positioning system (GPS) coordinates from a provider mobile application executing on the mobile devices of the different providers.

As the providers progress towards the meeting location, certain providers may be deemed unlikely to succeed in winning the transaction based on a variety of factors, including but not limited to, their ETA, distance to the meeting location, number of other providers with higher likelihood of success, and their feedback rating. In STEP 4025, the platform transmits cancellation messages to these providers. In one or more embodiments, the platform can be configured to maintain a minimum number of providers in the competition, or may be configured to utilize an algorithm for cancelling providers such that the overall likelihood of consummating the transaction successfully remains above a predefined threshold.

In STEP 4026, notification is received that one of the competing providers has completed the exchange. The transaction is consummated by the platform (STEP 4027), and all remaining competing providers are notified that the transaction is no longer active (STEP 4028).

Figure 41:
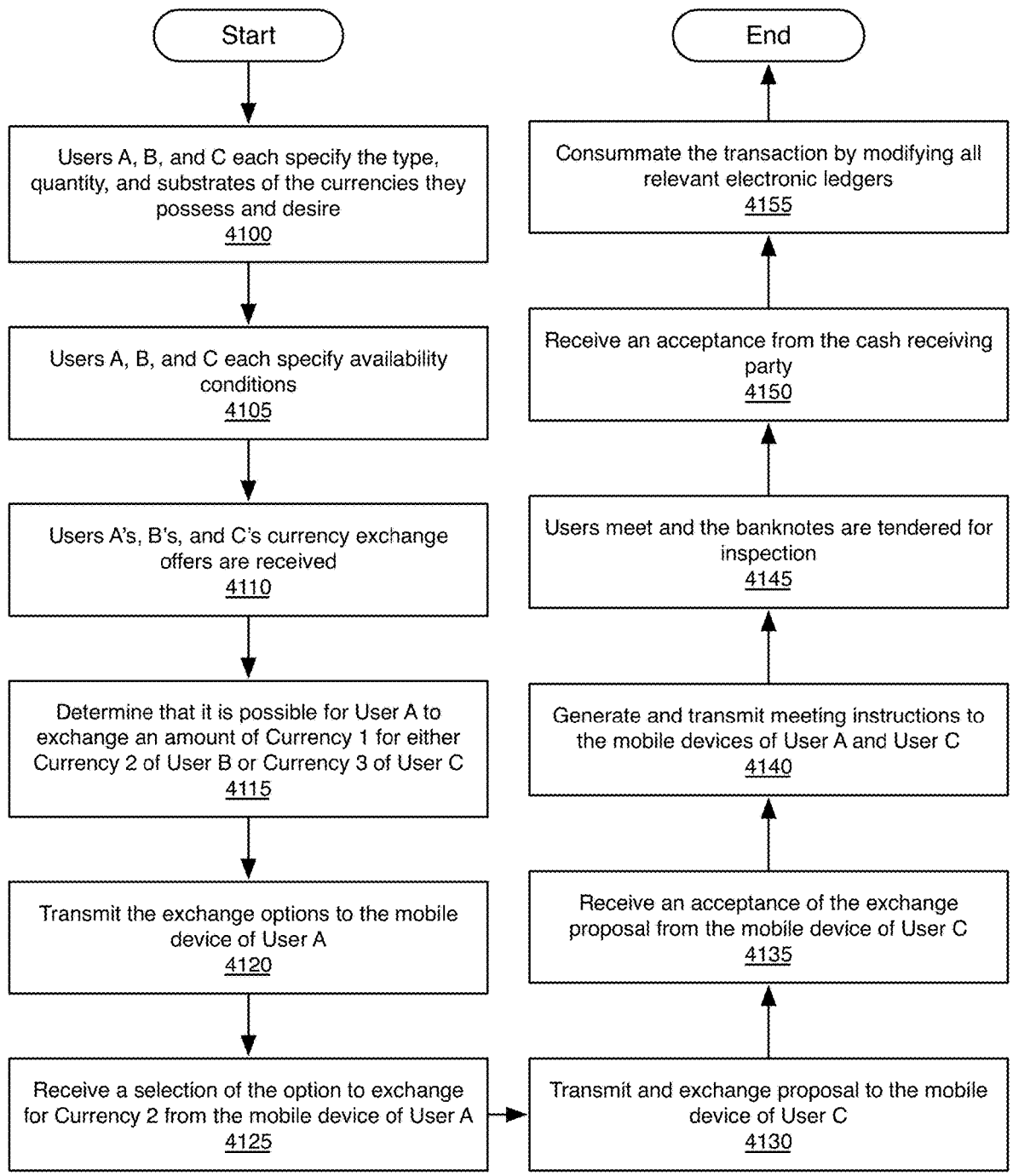

FIG. 41 shows a flowchart of a method for matching users with compatible in person exchange offers on the network. Advantages of this method include the ability to decrease fees by, when possible, matching users whose independent desires to convert their money permit a mutually beneficial exchange, and providing greater flexibility to users by presenting multiple exchange options. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 41 should not be construed as limiting the scope of the invention.

The top three STEPS displayed in FIG. 41 each represents a number of parallel processes initiated by users of the platform. The details of the transaction shown in FIG. 41 are purely illustrative, as is the depiction of only three users, as in most embodiments the cryptographic ledger platform will receive and match transactions from many more users.

In STEP 4100, each of the users initially inputs the type, quantity, and substrates of possessed and desired currencies. Next, the user specifies availability conditions such as timing, location, rate, and counterparty identity (STEP 4105). This broad range of offer details is included in FIG. 41 for illustrative purposes. In some embodiments, the order of some data input may be switched between the first and second operations (4100 and 4105); similarly, certain embodiments will omit information not required for more limited matching functionality. In one embodiment, data from an onboarding process, present location, and/or prior transactions will be used to select appropriate defaults.

In STEP 4110, the exchange offers from the three users are received by the platform, and the platform determines that User A may engage in a compatible exchange with either User B or with User C (STEP 4115). To emphasize that the method supports multiple currencies, in FIG. 41 the type and amount of currency that User A will receive depends on which of the two exchange partners is selected. The options are transmitted for display to User A by the platform (STEP 4120), and User A opts to engage in an exchange for the currency provided by User C (STEP 4125). In FIG. 41, this choice is depicted as being based on the type of currency offered by User C, but in some embodiments, other information about the potential exchange partners (e.g., rating, location, etc.) will be transmitted to User A and may form the basis of User A's selection. Similarly, the presentation of two options is illustrative. In some embodiments, the platform may select automatically for User A, while in other embodiments significantly more than two options will be transmitted for User A to choose between. Those embodiments may include multiple users offering the same currency and/or individual users offering multiple currencies or combinations of currencies.

Returning to FIG. 41, after User A chooses to receive the currency provided by User C, the platform transmits a corresponding exchange proposal to User C (STEP 4130), who accepts the proposed exchange on his mobile device, causing an acceptance message to be transmitted to the platform (STEP 4135). In some embodiments, rather than simply accepting, User C may introduce a counter-offer, which the platform would forward to User A for acceptance, rejection, or a further counter. Upon rejecting a counter from User C, in some embodiments User A requests that the platform transmit an exchange proposal to User B.

In STEP 4140, once both users have accepted the proposed exchange, the platform generates and transmits meeting instructions to both users. The users meet in person and the banknotes are tendered for inspection (STEP 4145). When the cash-receiving party's acceptance credential is received (STEP 4150), the platform consummates the exchange by modifying all affected ledger balances (STEP 4155).

Figure 42:
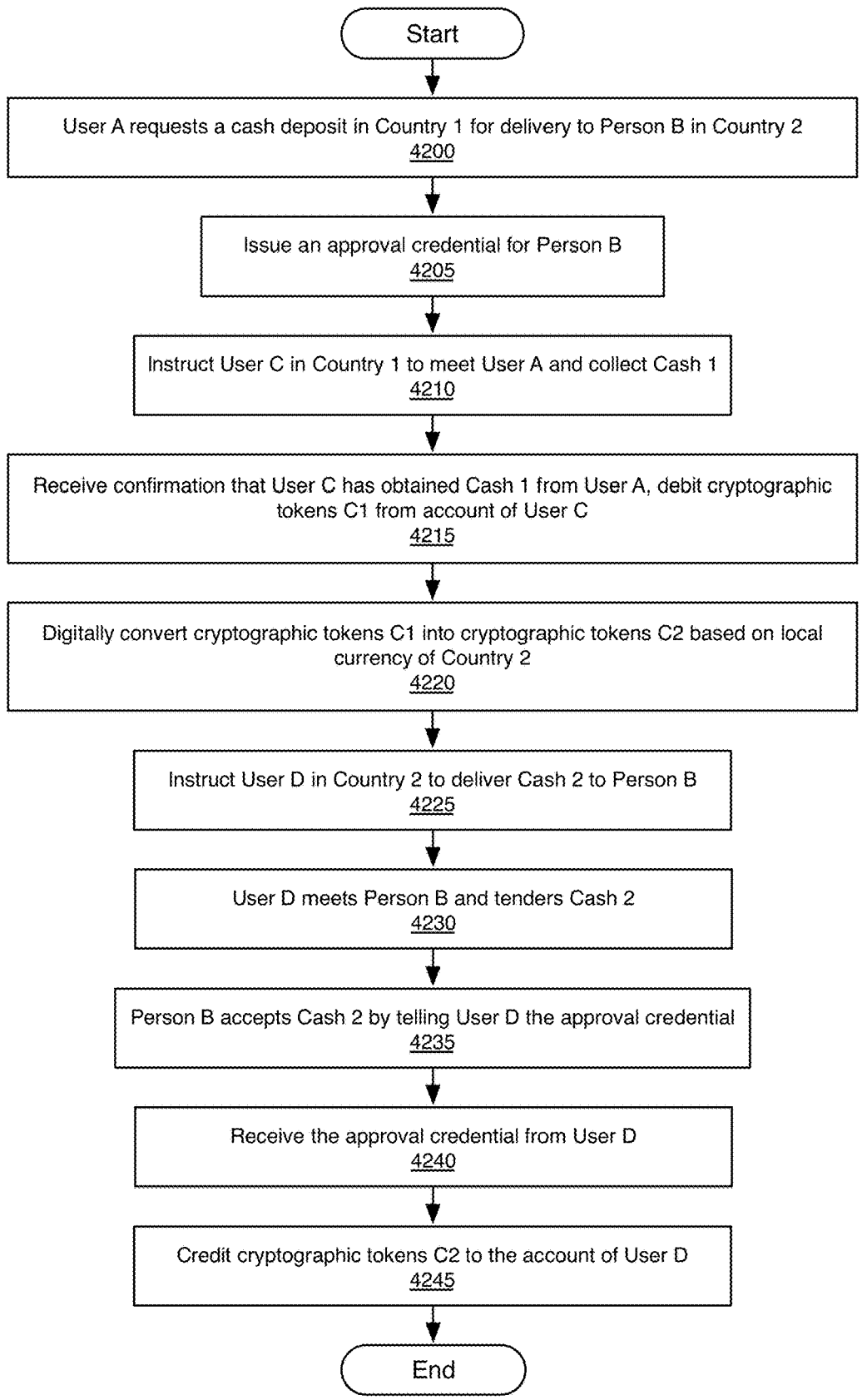

FIG. 42 shows a flowchart of a method for using the network to transmit cash to third parties. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 42 should not be construed as limiting the scope of the invention.

In one embodiment of the invention, remittance may be accomplished trivially using the other methods in the disclosure if the recipient is also a user of the platform, merely by converting the sender's local cash into digital money (using proof of cash or proof of balance functionality described above) through an in-person exchange, then transmitting the cryptographic funds to the recipient digitally over the network, and allowing the recipient to then request an in-person exchange of the cryptographic tokens back into the local form of cash. In some embodiments of the invention, a platform user who wishes to receive cash in this manner may initiate the process by transmitting a request to the sending party. However, the process of FIG. 42 can specifically be utilized for enabling cash to be delivered to a person who is not a user of the platform.

In STEP 4200, an exchange request is received from User A specifying Person B as the third-party cash recipient in Country 2. The request may be received by the cryptographic ledger platform of FIG. 1 (above), for example. In STEP 4205, the platform issues a tendered-cash acceptance credential for Person B. In some embodiments, this credential will be transmitted by the platform to a mobile device of Person B according to contact information input by User A (e.g., telephone number, email address, etc.) while in others it will be transmitted to a mobile device of User A who must then convey it to Person B. In some embodiments, as a substitute for a conventional acceptance credential, User A may instead submit multimedia containing biometric identifiers for User B (e.g., a prior photograph showing Person B's face) to the platform, in conjunction with directions for finding Person B (e.g., an address where Person B may be found during a specified time), and the platform may require that User D capture and transmit multimedia in which a matching biometric identifier is identifiable while User B confirms acceptance of the tendered notes (e.g., a photograph of User B holding up a transaction confirmation page printed by User D.)

Returning to FIG. 42, the platform identifies an available party, User C, for facilitating part of the exchange in Country 1. User C can be any user who has submitted a request to exchange cryptographic currency tokens for cash in the currency of Country 1, or may optionally be an employee of a third-party service performing exchange services using the cryptographic ledger platform. In STEP 4210, the platform instructs User C to meet User A and collect User A's cash. The cash is collected, and corresponding cryptographic funds are debited from User C's account upon receiving confirmation of a successful exchange from devices of User C and User A (STEP 4215). Once the cryptographic funds have been debited by the platform, in STEP 4220, they may be converted via a digital exchange, either controlled by the platform or by a third party, into a currency that will be accepted by users in Person B's country. This step may be performed either before or after identifying the party who will deliver cash to Person B, depending on whether that party's desired currency can be predicted. In FIG. 42, it is assumed that the currency is known in advance.

The platform then identifies a provider in Person B's country who is available to deliver cash to Person B in exchange for the funds. In the example of FIG. 42, this provider is User D. In STEP 4225, the platform transmits delivery instructions that enable the provider to meet with User B at a designated location. In some embodiments, these instructions may be simple, such as User B's name and home address. In other embodiments, the instructions may be more detailed, such as e.g. User B's photograph, contact information, schedule, work and school addresses, etc.

In STEP 4230, based on the instructions, User D meets User B and tenders the banknotes. User D obtains User B's acceptance credential in exchange for the cash (STEP 4235), and transmits the credential to the platform (STEP 4240), which consummates the exchange by transferring User A's funds to User D (STEP 4245). In some embodiments, the value of the funds transferred to User D will exceed the value of the notes delivered to User B by a margin that compensates User D for the delivery. In some embodiments, a portion of User A's funds may be retained by the cryptographic ledger platform as a fee.

In FIG. 42, it is assumed that User A does not yet possesses sufficient digital funds for the remittance transaction. If User A already has access to digital funds, they may be used directly to fund a third-party delivery, without the need to perform a deposit with User C before the funds could be converted and/or offered to User D.

For simplicity, FIG. 42 indicates that the delivery is funded by a single individual, User A, but in some embodiments multiple individuals may combine their funds for delivery to a single third-party recipient. They may also include multiple third-party recipients, who may receive cash from a single provider who travels to them in sequence or from multiple providers traveling in parallel. When no single provider is available to deliver adequate banknotes, in some embodiments the platform can be configured to divide the required cash into smaller quantities of cash and initiate a series of two or more deliveries whose cumulative effect will be to convey the full amount of cash required for the transaction. When necessary, the same division may also be performed for transactions that do not involve third parties.

Figure 43:
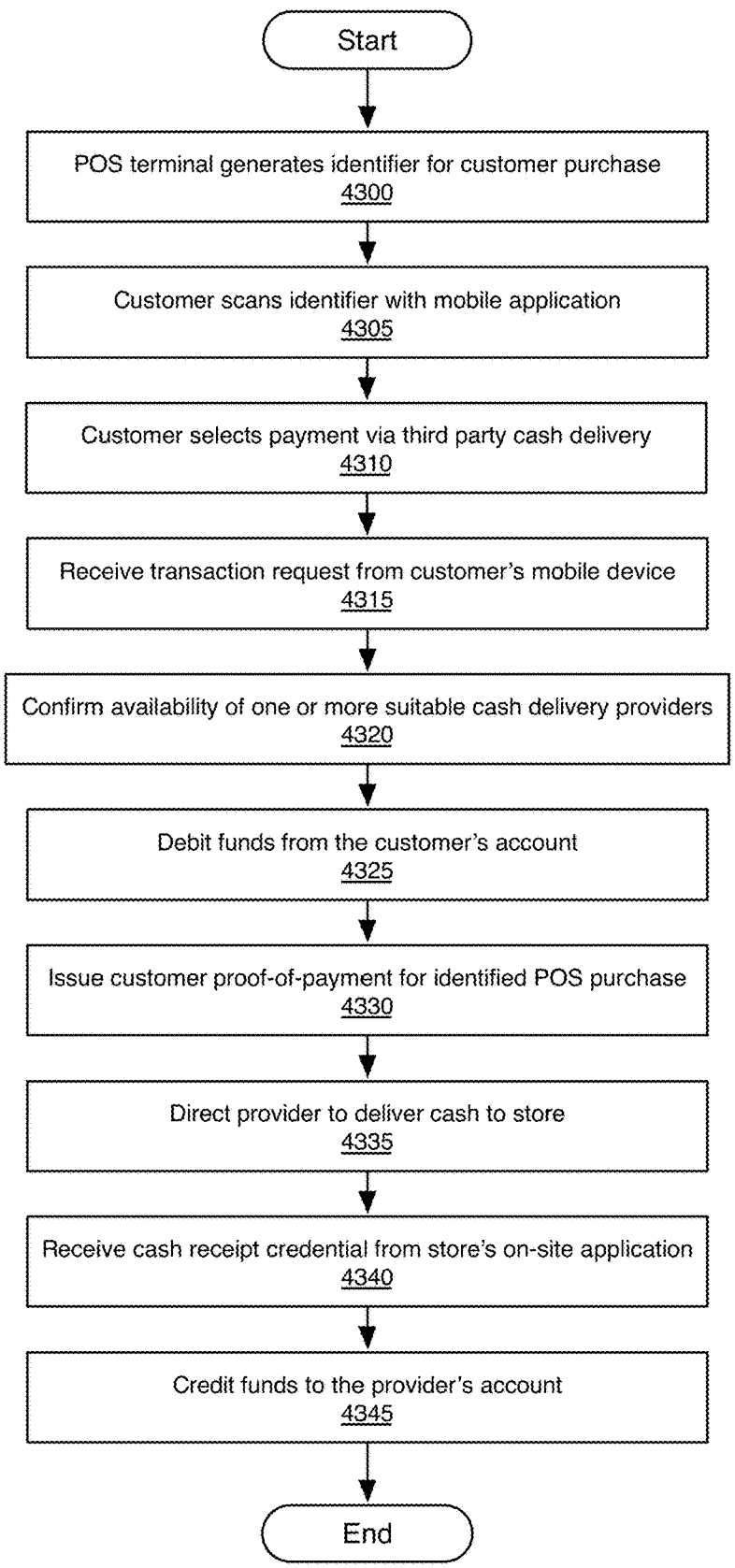

FIG. 43 shows a flowchart of a method that enables customers to make purchases via third-party cash deliveries to merchants. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 43 should not be construed as limiting the scope of the invention.

In the initial operation of FIG. 43, it is assumed that the customer has already selected the desired merchandise and that the merchandise has been input into the store's Point-of-Sale (POS) terminal, either by an employee or by the customer at a self-checkout machine. In some alternate embodiments, the customer's mobile device may be used to identify the merchandise to the POS system (e.g., by typing in reference numbers, scanning barcodes/QR codes, or capturing images of products registered in an objection-recognition database), which transmits pricing information back to the mobile device.

In STEP 4300, the terminal generates an identifier for the purchase, such as a transaction number. The identifier may be printed on a receipt or displayed on a screen. The identifier is input into the customer's mobile device, either manually or, e.g., by scanning a QR code in which the identifier is present (STEP 4305). In some embodiments, all necessary transaction information (e.g., total amount due) is embedded within the code scanned by the customer, while in other embodiments the mobile device uses the identifier to query the merchant's POS system and obtain additional transaction information. Alternatively, in embodiments where the merchandise has been input via a mobile application, the identifier may be generated on the mobile device and transmitted to the POS system.

Once the proposed transaction is displayed to the customer on the mobile device, the customer authorizes a payment to the merchant via third-party cash delivery (STEP 4310), and the mobile device transmits the transaction request to a cryptographic ledger platform (e.g., FIG. 1, above). The platform receives the request (STEP 4315), then confirms the availability of one or more suitable providers to deliver cash to the merchant (STEP 4320). In this specific operation, the word "availability" may encompass not only the present availability of an identifiable provider, but also in some embodiments the expected future availability of one or more suitable providers, based on the platform's records of past network activity. In some embodiments, certain providers may travel to stores delivering or receiving cash on a predictable schedule, and the platform may take expected future trips into account when evaluating availability.

In STEP 4325, the platform debits funds from the customer's account, in whatever currency was authorized. In some embodiments, this may be a digital version of the same fiat currency that will be delivered as cash, while in other embodiments it may be a different currency, such as cryptographic currency forked from the local currency. If a different currency is debited, some merchants will prefer not to be exposed to the risk of price fluctuations, so the currency may automatically be converted on an exchange into a digital version of the same currency that will be delivered (e.g., cryptographic currency forked using a proof of cash or proof of balance mechanism described herein). Alternatively, in some embodiments, the platform or other agents on the network may provide collateral or other insurance to protect participating merchants from the risk of exchange-rate fluctuations, avoiding the need for immediate conversion.

In STEP 4330, after debiting funds from the customer's account, the platform issues the customer a proof-of-payment certificate bearing the transaction identifier issued by the merchant's POS terminal. The certificate may be sent by the platform to a mobile application executing on the user's mobile device. The customer is then able to leave the store, using the proof-of-payment certificate to demonstrate that the merchandise has been legitimately acquired. For example, if the store has printed a pre-payment receipt, the customer can show that receipt and the proof-of-payment certificate to a loss-prevention employee at the door. Alternatively, if the list of purchased items is included, the proof-of-payment certificate may be used on its own.

In STEP 4335, when a suitable provider is available, the platform directs the provider to deliver cash to the store in an amount corresponding to the customer's purchase. In a preferred embodiment, the instructions transmitted to the provider's device include a QR code containing the transaction identifier, which is scanned into the POS terminal at the time of cash delivery, enabling the POS system to record that cash delivery for that specific transaction has been completed. In STEP 4340, the POS system transmits a cash-receipt credential to the platform, which credits the funds to the provider's account (STEP 4345). In some embodiments, the credential is a token issued to the POS system by the platform after debiting funds from the customer's account. In other embodiments, the credential is simply a securely signed message containing the transaction identifier.

Figure 44:
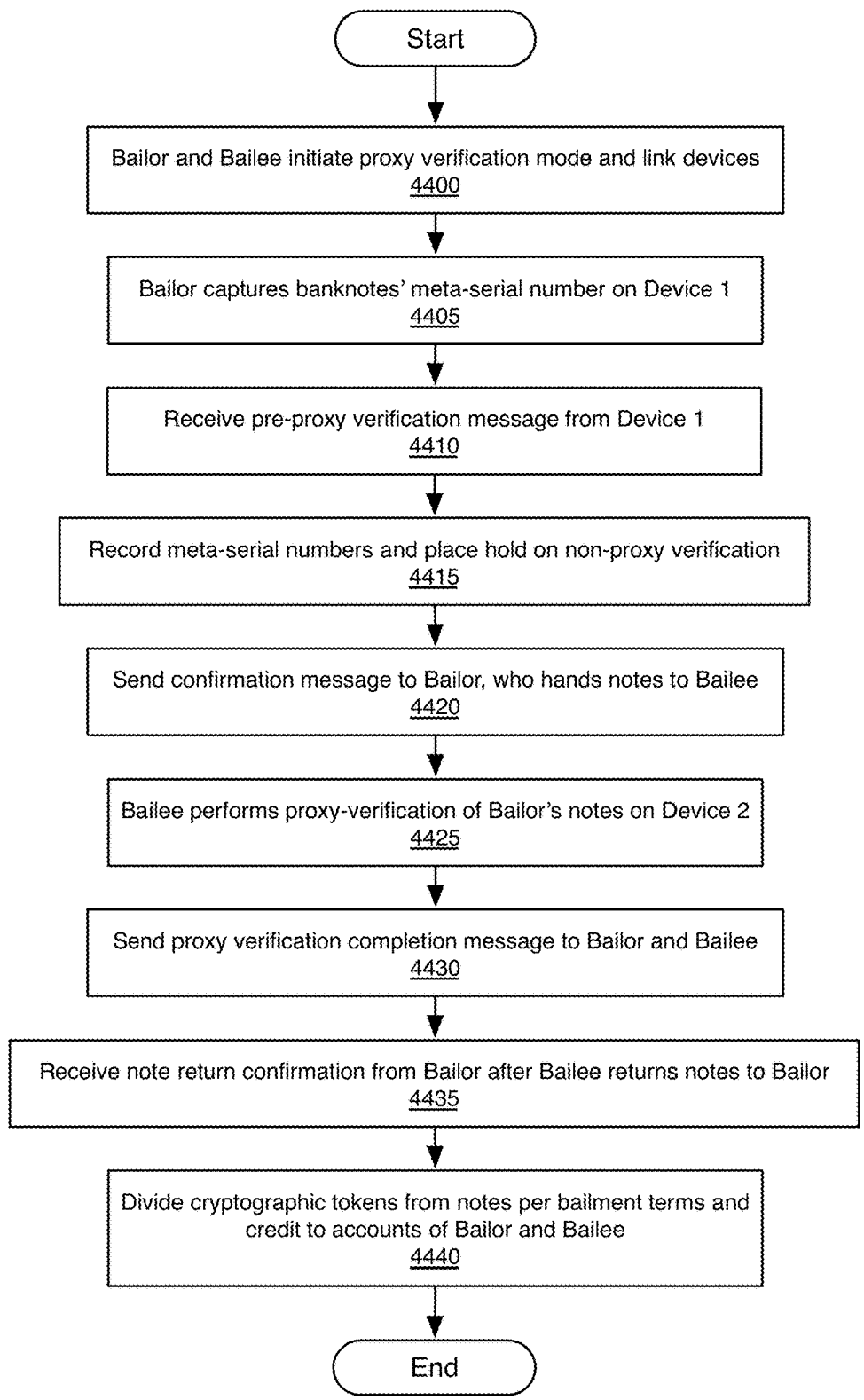

FIG. 44 shows a flowchart of a method that enables a banknote owner whose device cannot perform remote verification to access cryptographic tokens stored within his or her notes by temporarily entrusting them to a bailee who performs proxy-verification with a more capable device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 44 should not be construed as limiting the scope of the invention.

In STEP 4400, the bailor and bailee initiate a proxy-verification mode within the application, and they link their devices together so that the cryptographic ledger platform can supervise the transaction. In a preferred embodiment, this linkage is established through a screen in the mobile application on the bailee's device displaying a QR code alongside the terms of the offered arrangement, such as a flat fee or percentage of cryptographic tokens verified; to accept those terms, the bailor scans the screen with the bailor's device, and transmits the QR code to the cryptographic ledger platform (e.g., FIG. 1, above). As an additional fraud-prevention measure, in some embodiments, the terms may be hashed and included in the QR code when it is generated. Note that when the bailor entrusts the bailor's banknotes to the bailee, the device of the bailee is linked through the platform to the bailor, and that because the bailor is a user of the platform, the bailee's device may in some relevant contexts be referred to as a "device associated with a user" or even, when logical, a "device of a user."

Before entrusting the notes to the bailee, the bailor captures the meta-serial numbers via the bailor's device (STEP 4405), Device 1, then transmits a pre-proxy-verification message to the platform listing those meta-serial numbers (STEP 4410). In some embodiments, the meta-serial numbers may be input manually, but in a preferred embodiment they are captured using Device 1's camera, since images too low quality for ultimate proof of cash verification may still be sufficient for preliminary OCR.

In STEP 4415, the platform records the meta-serial numbers of the notes that the bailor will entrust to the bailee, and places a temporary hold on token issuance for those notes outside of proxy verification on the bailee's linked device, Device 2. This hold prevents the bailee or anyone else from surreptitiously removing the tokens with a different device while the notes are in the bailee's care. Once the hold is in place, in STEP 4420, the platform sends a confirmation message to the bailor, instructing the bailor to hand the notes to the bailee.

In STEP 4425, the bailee uses his or her device, Device 2, to perform proof of cash remote verification on the notes, including event-execution and image capture and transmission. In STEP 4430, once all notes have been verified, the platform transmits a proxy-verification completion message to both devices. The bailee returns the notes to the bailor, who sends the platform a message from Device 1 confirming that the notes have been returned (STEP 4435). In the embodiment depicted in FIG. 44, receipt of this message is required before the cryptographic ledger platform releases any cryptographic tokens to the bailee, so that the bailee will have a financial incentive to return the notes. If desired, tokens may be released to the bailor prior to note-return confirmation, but in FIG. 44, for simplicity, the funds are released to both parties as the last step in the transaction (STEP 4440). The quantity of tokens from the bailor's notes paid to the bailee will depend on the commercial arrangement between the parties.

The proxy-verification process shown in FIG. 44 requires the note owner to entrust his or her bills to the owner of Device 2. When that is undesirable, an alternate implementation may be employed, in which the (pseudo) bailee uses Device 2 to remotely verify the notes while they are held up by the bill owner or lain flat on a surface within the bill owner's control. In one embodiment, the meta-serial numbers may be initially captured in the aforementioned manner for pre-verification transmission to the platform, and remote verification may then be completed using the method shown in FIG. 44.

In another alternate embodiment, the owner of Device 2 may become a bailor by entrusting Device 2 to the bill owner, who operates Device 2 in proxy-verification mode linked to the bill owner's account. Rather than requiring a note-return confirmation message before the funds are released, in that embodiment the platform may require a device-return confirmation message from the owner of Device 2, authenticated by a security factor other than possession of the device itself, such as a password or fingerprint. Upon receiving the authenticated device-return confirmation message, the platform releases the funds to the bill owner's account.

Figure 45A:
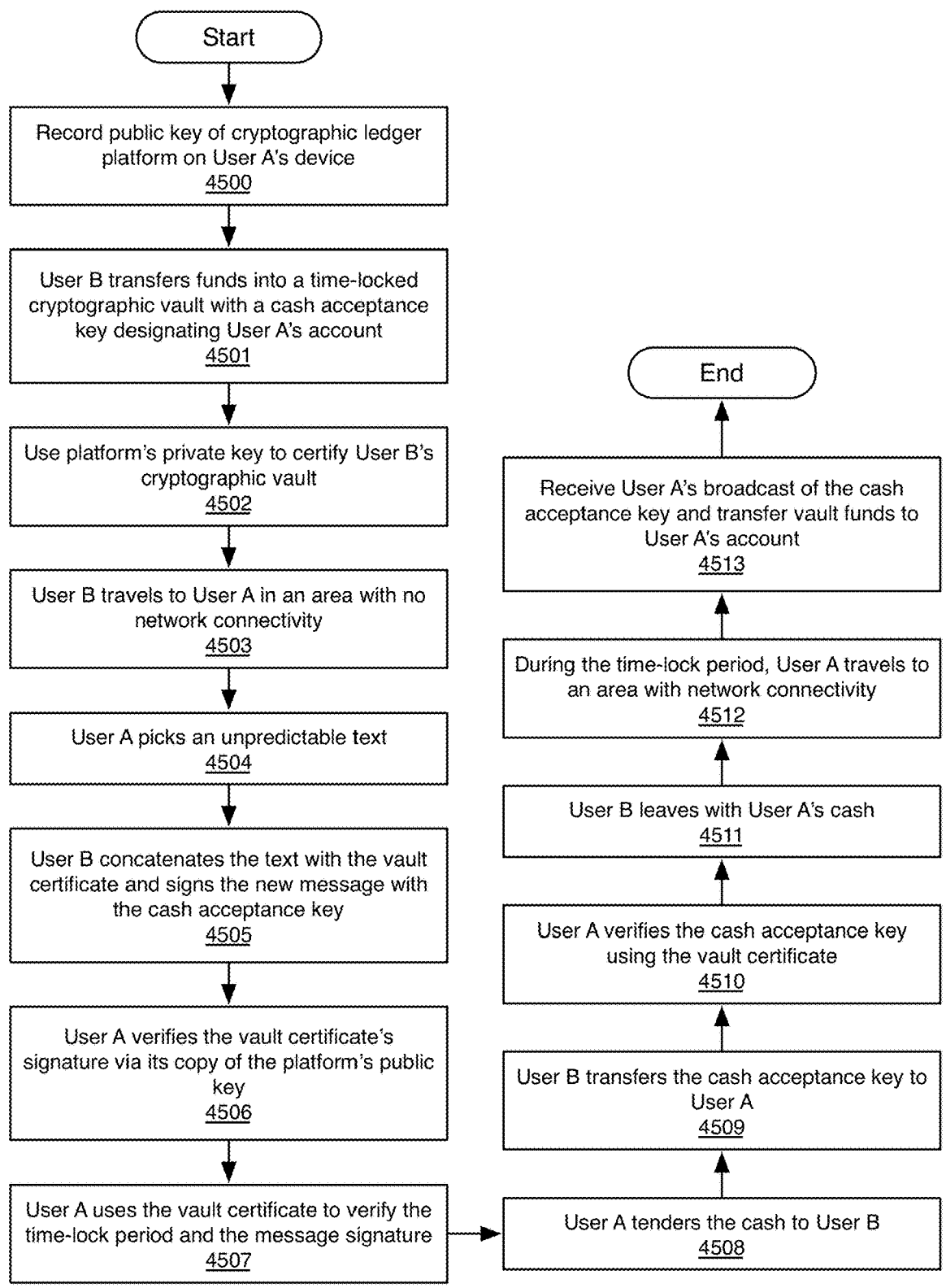
Figure 45B:
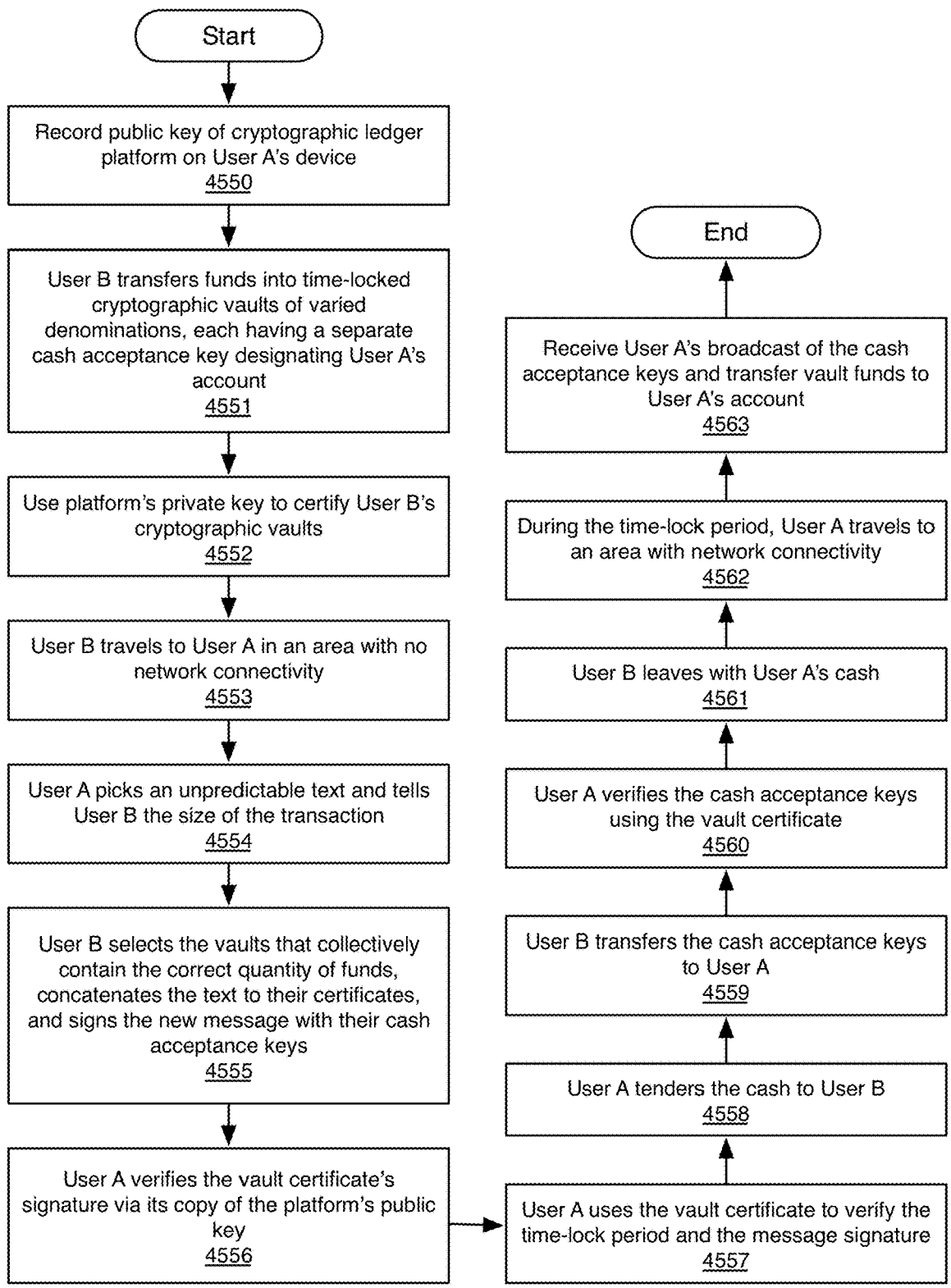

FIGS. 45A and 45B show flowcharts of methods for performing in-person exchanges in areas without network connectivity, using a time-locked cryptographic vault with a cash-acceptance key that overrides the time-lock by transferring the funds to the cash-providing party's account. While the various steps in these flowcharts are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIGS. 45A and 45B should not be construed as limiting the scope of the invention.

The first exemplary embodiment, shown in FIG. 45A, requires the cash-receiving party to know in advance the quantity of funds that will be transacted. In STEP 4500, the cash-possessing party, User A, obtains the platform's public key, and stores it on his/her device. This may be accomplished at a time when User A has network connectivity or through other methods known to those skilled in the art, such as delivery in a tamper-proof container or including the public key in the firmware of User A's device. Although in FIG. 45A User A receiving and recording the public key is depicted as the first step, this step may be delayed, so long as User A simply obtains the key prior to verifying the platform's signature.

In STEP 4501, User B transfers the funds into a time-locked cryptographic vault. In this example, the vault is a smart contract that prevents User B from reclaiming the funds during the time-lock period. Once the time-lock period expires, User B can recover the funds using its private key. During the time-lock period, a different private key controlled by User B, the cash-acceptance key, can be used to transfer the funds to an account controlled by User A. In some embodiments, User B may know the public key corresponding to a private key controlled by User A, and is thereby able to specify User A's address in the smart contract. In other embodiments, the vault contract may specify a smart contract requiring some other security-factor(s) of User A, such as biometric verification or control of User A's email address or social-media accounts. Alternatively, the vault contract may specify an address controlled by a reliable third-party such as a bank or escrow company, with directions to hold the funds until User A claims them.

For simplicity, it has been assumed that the countdown to expiration of the time-lock period begins when the funds are deposited in the vault. In an alternate embodiment, the countdown is not initiated until User B attempts to reclaim the funds using its private key. During the pendency of that transaction, User A may transmit the private cash-acceptance key and the funds will instead be transferred to User A's account.

In STEP 4502, once User B's funds have been deposited in the vault, the platform uses its private key to sign a certificate confirming the presence of the funds in the vault and the terms of the vault contract. In STEP 4503, User B takes this certificate and travels into the area without network connectivity where the exchange with User A will occur.

When Users A and B meet, in STEP 4504, User A picks an unpredictable text and conveys it to User B. The content of the text is irrelevant, as long as User B could not have known it in advance. For example, User A may invent a knock-knock joke and tell it to User B. In one embodiment, the unpredictable text is a pseudo-random alphanumeric code generated by User A's device.

In STEP 4505, User B uses a mobile application to create a new message. The message is created by the mobile application by appending the unpredictable text to the vault certificate, then signing that message with the cash-acceptance key. This demonstrates that User B possesses the cash-acceptance key, because incorporation of the unpredictable text as an input means that the signed message could not have been generated earlier by another party who possessed the cash-acceptance key.

User B provides the signed message to User A. In STEP 4506, User A is able to verify the authenticity of the vault certificate by confirming that the signature matches the public key stored on User A's device. The authenticated certificate includes the public cash-acceptance key from the vault contract, which User A uses to verify the message signature that User B created using the private cash-acceptance key (STEP 4507). The certificate also specifies when the time-lock period expires, which allows User A to confirm that he or she will have sufficient time to return to an area with network connectivity before the vault unlocks.

In STEP 4508, User A tenders the cash to User B, who accepts it by providing the private cash-acceptance key to User A (STEP 4509). User A verifies the private cash-acceptance key using the public cash-acceptance key from the authenticated vault certificate (STEP 4510). Once that verification is complete, User B is free to leave with User A's cash (STEP 4511). In STEP 4512, before the end of the time-lock period, User A travels to an area with network connectivity and uses the private cash-acceptance key to transfer the funds from the vault into the account designated by the vault contract (STEP 4513).

FIG. 45B is an extension and modification of the method shown in FIG. 45A, which eliminates the requirement that User B know the size of the transaction in advance. STEPS 4550, 4552, 4553, and 4556-4562 of FIG. 45A are materially similar to STEPS 4500, 4502, 4503, 4506-4512 of FIG. 45B and will not be repeated in detail. The first difference from FIG. 45A is that, in STEP 4551, rather than transferring all of the funds it may exchange into a single vault, User B separates them into sums of varying denominations, then transfers each sum into its own vault with a separate cash-acceptance key.

In STEP 4554, when Users A and B meet, User A tells User B the quantity of cash that will be provided. User B then uses that number to determine the quantity of funds that must be provided to User A, then selects a set of vaults that collectively contain that quantity of funds (STEP 4555). The unpredictable text provided by User A is combined with those vaults' certificates, and User B then signs the message with the cash acceptance key for each of the selected vaults.

In one embodiment, all of the selected vaults' certificates are ordered and concatenated, then the unpredictable text is appended to create the message contents, then the cash-acceptance key for the first certificate is used to sign the message, then that signed message is signed with the cash-acceptance key for the second certificate, and so on in a pattern that iterates until the final message is signed using the cash-acceptance key corresponding to the last certificate.

The remainder of the method of FIG. 45B is effectively similar to that shown in FIG. 45A, except that multiple certificates and cash acceptance keys are used. In the final step (4563), User A claims the funds in all selected vaults using the vaults' respective private cash acceptance keys.

In some embodiments, the method shown in FIGS. 45A and 45B may omit the selection of an unpredictable text and the signing of a message with the cash-acceptance key. Instead, User B may simply tender the vault certificate and private cash-acceptance key to User A, who then authenticates them and tenders the cash. The aforementioned tender sequence may also be reversed.

In another alternate embodiment, rather than User B demonstrating control of the vault funds by signing an unpredictable message with the private cash-acceptance key, User B's identity may be specified in the vault certificate signed by the cryptographic ledger platform. The certificate may either enable User A to directly recognize User B, such as by including a passport-style photograph or other biometric, or it may reference a unique identifier on a trusted physical credential, such as a passport.

In one embodiment, to prevent User B from fraudulently reclaiming the vault funds if User A fails to regain network connectivity before the vault's time-lock period expires, the time lock is replaced with a multi-signature vault contract from which funds can only be transferred using a cash-acceptance private key controlled by User B and a separate private key controlled by User A. In one embodiment, to prevent User B's funds from being trapped in the vault in the event of User A's disappearance, the signature requirements for unlocking the vault may be loosened (e.g. by entrusting a third key to a trusted third party and requiring ⅔ signatures to transfer the vault funds).

Figure 46:
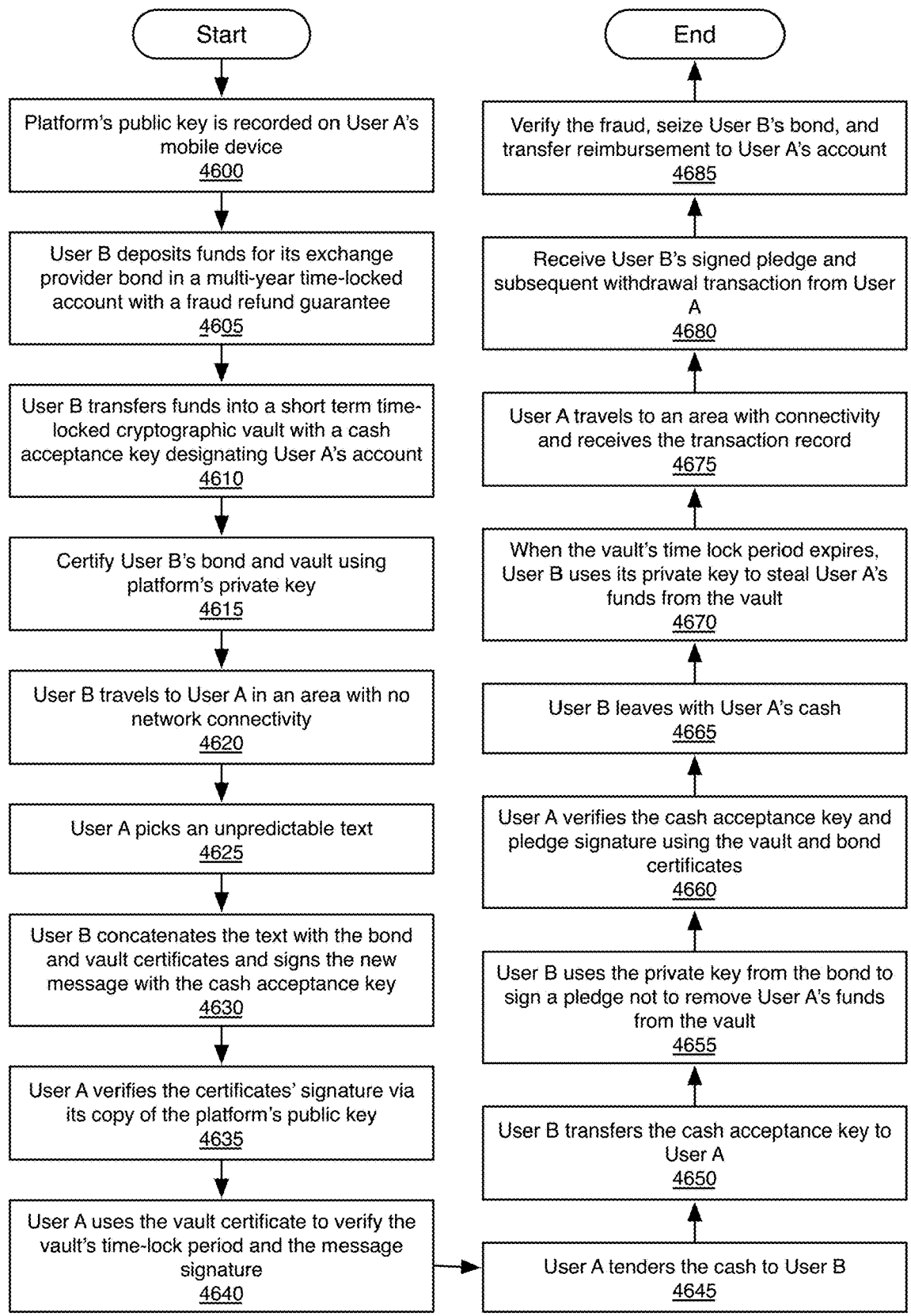

FIG. 46 shows a flowchart of a method wherein the time-locked vault method of FIGS. 45A and 45B is extended through the addition of a second smart contract with a much longer time-lock period. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 46 should not be construed as limiting the scope of the invention.

In the exemplary embodiment of FIG. 46, the second smart contract, which may include a multi-year time lock, serves as a bond guaranteeing that User B will not fraudulently reclaim funds from the vault in the event that User A is unable to transmit the cash acceptance key before the vault's time lock expires. STEPS 4600, 4610-4625, 4635-4650, 4675 of FIG. 46 are materially similar to STEPS 4500-4512 of FIG. 45A and will not be repeated in detail.

The first difference from FIG. 45A is that, in STEP 4605, User B transfers its own funds into the bond contract, but in some embodiments the funds may be transferred on User B's behalf by one or more third-party underwriters. The bond contract permits the bond funds to be seized during the time-lock period if a counterparty such as User A transmits (1) a message from User B certifying User A's ownership of the vault funds signed by User B with a private key corresponding to a private key listed in the bond contract and (2) a transaction returning the vault funds to User B after the time-lock expired performed using User B's private key from the vault contract.

The cryptographic ledger platform certifies the bond using the same private key it uses to sign the vault certificate, so User A is able to verify both certificates using its stored copy of the corresponding public key. In STEP 4630, User B concatenates the text with both the bond and vault certificates and signs a new message with the cash acceptance key. After transferring the cash-acceptance key, in STEP 4655, User B signs a message with the private bond key pledging not to remove the vault funds, and User A verifies the signature using the public bond key listed on the authenticated bond certificate (STEP 4660). It is still preferable for User A to guarantee the security of its funds by regaining network connectivity and transmitting the cash-acceptance key before the vault's time lock expires, but if the cash-acceptance key is not transmitted in time and User B steals the funds from the vault (STEP 4670), then User A can obtain compensation by transmitting proof of the theft before the bond's long-term time lock expires (STEPS 4680 and 4685).

In one or more embodiments, a single bond is used to guarantee multiple vault-based transactions with diverse counterparties, and if a single counterparty transmits the requisite proof of fraud, the cryptographic ledger platform blacklists User B and seizes the bond funds to provide compensation for other fraud victims who may emerge. In one or more embodiments, rather than immediately transferring full compensation to the first victim to demonstrate proof of fraud, the bond contract may be configured with a post-fraud time lock so that other victims have an opportunity to transmit their proofs of fraud, and in the event that the proven losses exceed the bond amount, the funds may be distributed pro rata.

In one or more embodiments, rather than merely pledging not to steal the vault funds, User B may use a private key designated by the bond contract to pledge that it will use the cash-acceptance key to release the vault funds to User A before a specified time (e.g., expiration of the vault's time-lock), and the bond contract may be configured to provide compensation for violation of that pledge.

Although FIGS. 45A, 45B, and 46 may refer to "users performing" cryptographic verifications, this is not intended to convey a manual process. In these examples, the actual process of generating and verifying keys and signatures is executed by applications executing on the user's devices in response to a request from the user and/or platform.

Figure 47:
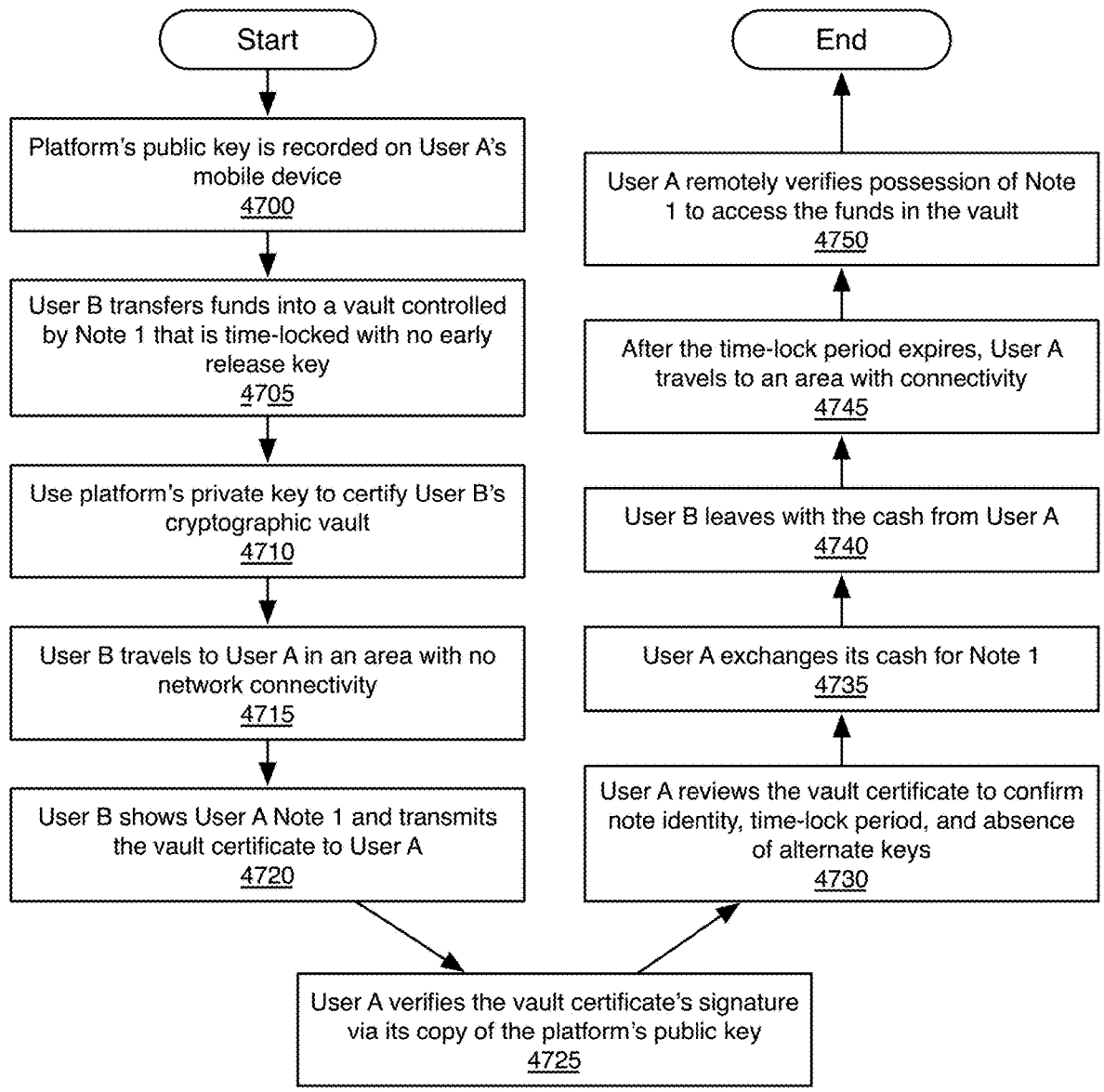

FIG. 47 shows a flowchart of a method for performing in-person exchanges in areas without network connectivity, by using Proof-of-Cash to control access to an irreversibly time-locked vault. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 47 should not be construed as limiting the scope of the invention.

In the exemplary embodiment of FIG. 47, it is not required for User B to designate User A in the vault contract, so the method works even if Users A and B have no prior contact before encountering each other in an area with no network connectivity. Furthermore, after the exchange, User A can wait an indefinite amount of time before connecting to the network and accessing the funds. STEPS 4700, 4710, 4715, 4725-4745 of FIG. 47 are materially similar to STEPS 4500-4512 of FIG. 45A and will not be repeated in detail.

As in FIGS. 45A, 45B, and 46, User A must have a copy of the cryptographic ledger platform's public key, and User B must transfer the funds into a time-locked vault. However, in the method shown in FIG. 47, the vault contract enforces an absolute time lock, with no mechanism to remove the vault funds before expiration of the time-lock period. Once the time-lock ends, the vault contract permits the funds to be transmitted to an arbitrary account or address by any party who completes proof-of-cash remote verification of a banknote with a specified meta-serial number.

A vault certificate is created and authenticated using the same sub-methods shown in FIGS. 45A, 45B, and 46. In STEP 4705, User B transfers funds into a vault controlled by Note 1 that is time-locked with no early release key. In STEP 4720, rather than demonstrating possession of a cash-acceptance key, User B demonstrates possession of the meta-serialized note specified in the vault certificate, and User A examines the note to ensure its authenticity. The signed vault certified also confirms that no other key exists to permit the vault funds to be released, either during or after the time-lock period. User A provides cash in exchange for the note, and User B is then free to leave. After the time-lock expires, User A eventually regains network connectivity and accesses the vault funds by performing proof-of-cash verification of the note (STEP 4750).

For simplicity, only a single vault and note are shown in FIG. 47, but in one or more embodiments, the method may be extended to multiple notes controlling multiple vaults with varied sums, in the same manner that the method in FIG. 45A is extended in FIG. 45B to multiple keys controlling multiple vaults with varied sums.

In some embodiments of the method shown in FIG. 47, control of the vault funds may be loosened in a manner acceptable to User A, so that loss of the specified note will not permanently orphan the funds. For example, the vault contract may be configured so that if the funds remain unclaimed in the vault on the 10th anniversary of the time-lock period's expiration, then the funds will automatically be distributed to the accounts of various charities.

Embodiments of the invention may have one or more of the following advantages. One challenge in bootstrapping cryptographic currencies is the problem of staking asynchrony, in which early adopters of a virtual currency are able to acquire disproportionately large stakes relative to later users, since growth in the popularity of the new currency alters the value of both the ledger's native asset and the resource staked to acquire it. For example, in the year 2018, billions of US Dollars' worth of capital would be needed to acquire sufficient SHA-256 hashing power necessary to mine a material fraction of contemporary Bitcoin coinbases, whereas equivalent Bitcoin currency could have been mined in 2009 using a single personal computer. This limits the public adoption of all cryptocurrencies, since it causes them to function like pyramid schemes, where early adopters reap huge rewards and late comers are penalized.

Worse, it produces security vulnerabilities in proof of stake-based ledgers, wherein consensus is reached by weighing votes according to ownership of assets within some designated staking resource(s). The consensus algorithms employed by such ledgers rely on the axiom that no malicious actor can acquire a stake greater than a minimum threshold (e.g. ½ or, if message delivery time is unbounded, ⅓), so it is often assumed that the cost of subverting such a ledger is at least that fraction of the staking resource's present market capitalization. In reality, staking asynchrony means that a >50% stake valued at billions of dollars today could have been acquired for virtually nothing during the early stages of a bootstrapped cryptocurrency. A malicious actor possessing such a stake would rationally maximize the value of its initial attack by allowing the value of the ledger it secretly controls to grow as much as possible before revealing its ability to subvert the consensus mechanism; thus, the apparent security of a proof of stake cryptocurrency in the past is not reliable evidence about the present or future integrity of its consensus system.

The aforementioned proof of balance and proof of cash systems mitigate the problem of staking asynchrony by preventing severely imbalanced stake distribution and by correcting the incentives for participation in the cryptographic ledger platform to prevent a handful of early adopters from acquiring control. Furthermore, by piggybacking on the distribution of one or more fiat currencies, the mechanism for bootstrapping the cryptographic currency can rely upon a token of value with existing wide distribution.

A related problem to staking asynchrony involves the accuracy of the system at detecting counterfeit notes. The more exemplar data is available to the proof of cash module (e.g., 120 of FIG. 1) for training the algorithmic models that perform proof of cash validation, the more accurately the system can distinguish authentic and counterfeit bills. In one embodiment, an optimal source of exemplar data, measured by both size and composition, is the images captured by users of the network scanning their paper money with their smartphones. The more money is scanned, the better the proof of cash technology will work.

Unfortunately, this creates a window of vulnerability that may be exploited. Adversaries who know that the anti-counterfeiting abilities of the network will be at their nadir when first launched may devote all their resources to scanning counterfeit bills during that period, thereby acquiring large ill-gotten stakes of cryptographic tokens. Rather than using proof of cash functionality alone, a system utilizing proof of balance functionality disclosed herein can mitigates this problem by preventing counterfeiters from exploiting the proof of cash system to obtain disproportionate advantage in the network. In one or more embodiments of the invention, the cryptographic ledger platform 100 of FIG. 1 is configured to utilize both proof of cash and proof of balance functionality using one or more predefined thresholds for distribution of each. For example, a per-user threshold can define a maximum ratio of physical fiat currency to digital fiat currency (or vice versa) claimed in the platform per participating user. In this way, each user can be required to claim a certain percentage of stake using digital proof of balance verification, and thus mitigate the effect of potential counterfeiters. In one or more embodiments of the invention, the cryptographic ledger platform 100 is configured to set an aggregate threshold or ratio of proof of cash and/or proof of balance claimed tokens for the entire ledger. Thus, one or more caps of proof of cash or proof of balance issued tokens can be utilized.

Another advantage of utilizing proof of balance mechanisms disclosed herein is that some users may not have access to mobile devices whose sensors are accurate enough to complete proof of cash verification. Proof of balance technology mitigates the risk of theft of physical cash and can be effected without specific mobile device hardware.

Another major obstacle is the chicken-and-egg problem of how to make a cryptographic currency useable as money in the real world, given that consumers only want to use forms of money that merchants accept, while merchants only accept forms of payment consumers want. One existing solution implemented by digital exchanges like Coinbase is software that connects users' smartphones to Point-of-Sale terminals via NFC or QR-codes so that users may pay in cryptocurrency like Bitcoin. Because the cryptocurrency can be immediately converted into fiat money via the exchange at the time of payment, merchants are able to quote prices in fiat money, while processing transactions from customers who wish to pay in cryptocurrency, and avoiding the volatility of actually holding cryptocurrency for an extended period.

One limitation of these systems is that they require merchants to receive the ultimate fiat payment either in an account at the participating exchange or in an account at some other financial institution. This makes it impractical for these systems to be implemented in many regions of the developing world, where billions of people, including merchants, are underserved by traditional banking infrastructure. Proof of cash systems disclosed herein can enable merchants to receive cryptographic currency payments by accepting local fiat banknotes. Fiat banknotes having corresponding cryptographic tokens enclosed thereon can be a useful tool for merchant adoption, providing a physical "account" resource for safe storage and retrieval of cryptographic token balances.

Even in the developed world, cryptographic money has been unable to reach mass adoption in part because a consumer with cryptocurrency stored on a smartphone has no practical means of using the money to acquire goods and services in person from businesses. Payments can only be made to the small number of merchants who have gone out of their way to integrate crypto-enabled payment systems into their point-of-sale terminals. Even then, a coincidence of wants must exist between the particular crypto-payment platform adopted by the merchant and user. An equivalent problem has prevented smartphone-based payment systems such as Apple Pay and Samsung Pay from replacing older payment systems such as credit and debit cards, since there are strong network effects favoring incumbent payment technologies. Proof of cash technology disclosed herein circumvents complicated payment system requirements and expensive transaction fees. For example, the proof of cash module 120 of FIG. 1 can be utilized to store cryptographic currency tokens within physical banknotes that the merchant already possesses and transacts with regularly. An extra layer of value residing within an existing resource can be an appealing incentive for participating in the network.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 48:
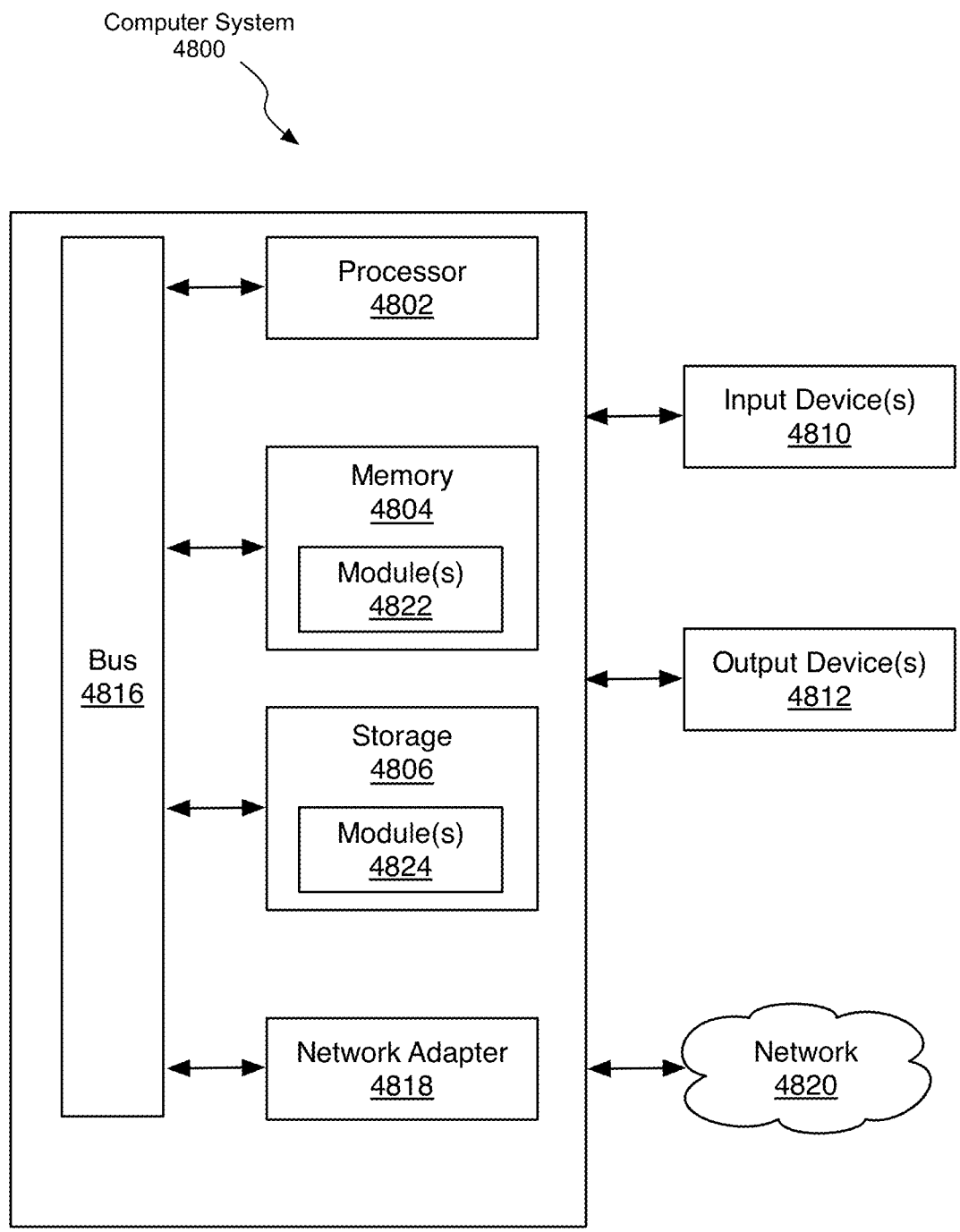
FIG. 48 shows a computer system in accordance with one or more embodiments.

For example, as shown in FIG. 48, a computing system 4800 may include one or more computer processor(s) 4802, associated memory 4804 (e.g., random access memory (RAM), cache memory, flash memory, etc.), one or more storage device(s) 4806 (e.g., a hard disk, an optical drive such as a compact disk (CD) drive or digital versatile disk (DVD) drive, a flash memory stick, etc.), a bus 4816, and numerous other elements and functionalities. The computer processor(s) 4802 may be an integrated circuit for processing instructions. For example, the computer processor(s) may be one or more cores or micro-cores of a processor.

In one or more embodiments, the computer processor(s) 4802 may be an integrated circuit for processing instructions. For example, the computer processor(s) 4802 may be one or more cores or micro-cores of a processor. The computer processor(s) 4802 can implement/execute software modules stored by computing system 4800, such as module(s) 4822 stored in memory 4804 or module(s) 4824 stored in storage 4806. For example, one or more of the modules described in FIG. 1 (e.g., the proof of balance module 110) can be stored in memory 4804 or storage 4806, where they can be accessed and processed by the computer processor 4802. In one or more embodiments, the computer processor(s) 4802 can be a special-purpose processor where software instructions are incorporated into the actual processor design.

The computing system 4800 may also include one or more input device(s) 4810, such as a touchscreen, keyboard, mouse, microphone, touchpad, electronic pen, or any other type of input device. Further, the computing system 4800 may include one or more output device(s) 4812, such as a screen (e.g., a liquid crystal display (LCD), a plasma display, touchscreen, cathode ray tube (CRT) monitor, projector, or other display device), a printer, external storage, or any other output device. The computing system 4800 may be connected to a network 4820 (e.g., a local area network (LAN), a wide area network (WAN) such as the Internet, mobile network, or any other type of network) via a network interface connection 4818. The input and output device(s) may be locally or remotely connected (e.g., via the network 4820) to the computer processor(s) 4802, memory 4804, and storage device(s) 4806.

One or more elements of the aforementioned computing system 4800 may be located at a remote location and connected to the other elements over a network 4820. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various replicated services and applications accessible via the Internet. These cloud-based services (e.g., software as a service, platform as a service, infrastructure as a service, etc.) may be accessible through a Web browser or other remote interface.

One or more elements of the above-described systems (e.g., FIGS. 1-8) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1-8) and/or flowcharts (e.g., FIGS. 30-47). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A method for bootstrapping a decentralized cryptographic ledger representing a forked version of an original fiat currency based on stake in the original fiat currency, comprising:

designating a staking period representing a window of time;

receiving, from a remote computing device, data indicating that a portion of the original fiat currency was associated with a first user at one or more elapsed times within the staking period;

verifying, based on a defined validation procedure, authenticity of at least some of the data received;

determining, based on the authenticated data, an external stake in the original fiat currency attributed to the first user, wherein the external stake represents an amount of ownership in the original fiat currency;

calculating a first stake of ownership for the first user in the forked version of the original fiat currency by applying a first conversion rate to the external stake;

altering, after commencement of the staking period, a state of the cryptographic ledger to record a first set of digital tokens representing the first stake of ownership;

designating a conclusion of the staking period associated with a snapshot of the cryptographic ledger;

receiving, after designating the conclusion of the staking period, a request to retroactively claim a second stake in the forked version of the original fiat currency for a second user; and processing the request to retroactively claim a second stake in the forked version of the original fiat currency, wherein processing the request comprises:

determining a second external stake in the original fiat currency attributed to the second user based on additional data indicating that a second portion of the original fiat currency was associated with the second user during the staking period;

calculating a second stake of ownership for the second user in the forked version of the original fiat currency by applying a second conversion rate to the second external stake, wherein the first conversion rate is greater than the second conversion rate such that the first user is rewarded for early participation; and altering a second state of the cryptographic ledger to record a second set of digital tokens representing the second stake of ownership, wherein the first set of digital tokens and the second set of digital tokens are usable to participate in a consensus protocol for the cryptographic ledger that assigns voting power in proportion to stakes in the forked version of the original fiat currency.

2. The method of claim 1, wherein at least one token of the first set of digital tokens represents a claim to a native digital asset.

3. The method of claim 1, further comprising:

identifying an asset or claim recorded on at least one selected from a group consisting of a decentralized cryptographic ledger, a centralized cryptographic ledger, a federated cryptographic ledger, a shard of a cryptographic ledger, a cryptographic state channel, a cryptographic side-chain, and a cryptographic child-chain; and using the asset or claim to determine content of at least one token of the first set of digital tokens.

4. The method of claim 1, further comprising:

calculating a size of the external stake in the original fiat currency based on a plurality of stake values corresponding to segments within the window of time, wherein weights assigned to the segments are either equal or varied, and wherein calculating the size of the external stake is performed using at least one selected from a group consisting of smallest stake size, greatest stake size, mean stake size, median stake size, and most frequent stake size.

5. The method of claim 4, further comprising:

designating an advance staking period representing a second window of time preceding the window of time, wherein the second window is predefined;

receiving, in advance of the second window, authorization to verify a third stake in the original fiat currency;

receiving, after a beginning of the second window, a third set of data indicating that a third portion of the original fiat currency was associated with the first user at a second set of times;

verifying authenticity of at least a subset of the third set of data received;

calculating, based on an authenticated subset of the third set of data, the third stake in the original fiat currency attributed to the first user;

calculating a size of the third stake in the original fiat currency based on a plurality of stake values of the first user corresponding to a set of segments within the second window of time; and altering, after commencement of the advance staking period, a third state of the cryptographic ledger to reward the first user for early participation based on the size of the third stake in the original fiat currency.

6. The method of claim 4, further comprising implementing multi-currency staking by:

designating a second staking period for a second fiat currency, wherein the second staking period represents a second window of time, and wherein the second window of time overlaps in whole or in part with the first window of time;

receiving, from a second remote computing device, a second set of data indicating that a portion of the second fiat currency was associated with a third user at a second set of times during the second staking period;

verifying, based on a second defined validation procedure, authenticity of at least a subset of the second set of data received;

determining, based on an authenticated subset of the second set of data, a stake in the second fiat currency attributed to the third user;

calculating a size of the stake in the second fiat currency, based on a second plurality of stake values of the third user corresponding to a second set of segments within the second window of time;

deriving, based on the size of the stake in the second fiat currency, a size of an equivalent stake in the original fiat currency, wherein the size of the equivalent stake is determined by an external ratio derived from at least one exchange rate between the original fiat currency and the second fiat currency; and altering a third state of the cryptographic ledger based on (i) the size of the stake in the second fiat currency and (ii) the size of the equivalent stake in the original fiat currency.

7. The method of claim 1, wherein the portion of the original fiat currency associated with the first user comprises at least one specific serialized banknote, wherein the validation procedure incorporates proof-of-cash authentication, the method further comprising:

executing one or more authentication events on a mobile device, wherein consequences of the authentication events are captured during the scanning of the banknote; and programmatically detecting, in sensor data captured by the mobile device while scanning the banknote, presence of one or more anti-spoofing indicators and presence of one or more anti-counterfeiting indicators, wherein at least a single detected indicator relates to an authentication event of the one or more authentication events.

8. The method of claim 7, wherein at least one token of the first set of digital tokens represents a prize in a sweepstakes or lottery, such that proof-of-cash authentication of one or more specific serialized banknotes substitutes for redeeming a winning lottery ticket or sweepstakes entry.

9. The method of claim 1, wherein the portion of the original fiat currency associated with the first user comprises at least one specific serialized banknote, wherein the remote computing device is a hardware verifier to which the banknote was submitted for automated inspection, wherein the data is at least one selected from a group consisting of a transmission confirming that the hardware verifier determined that the banknote was authentic and a transmission containing sensor data captured by the hardware verifier, and wherein the validation procedure comprises confirming that the data was transmitted by the hardware verifier and that the hardware verifier was properly certified at the time it inspected the banknote.

10. The method of claim 1, wherein the portion of the original fiat currency associated with the first user comprises one or more banknotes of a specified total value, wherein the remote computing device is a mobile device associated with a designated party responsible for inspecting the banknotes, and wherein the data comprises a message indicating that the designated party determined the banknotes are authentic.

11. The method of claim 10, wherein the designated party retains the banknotes after determining their authenticity, the method further comprising:
 altering a third state of the cryptographic ledger based on a change in ownership of the banknotes, wherein the change in ownership is accompanied by transferring a quantity of funds to an account or wallet associated with the first user, such that the first user receives compensation for providing authentic banknotes to the designated party.

12. The method of claim 11, further comprising:
 receiving a second message identifying serial numbers of the banknotes in advance of tendering them to the designated party for inspection;
 recording an ownership of the specific serialized banknotes by the first user; and
 after the designated party decides to retain the banknotes, recording the change in the ownership of the banknotes.

13. The method of claim 11, wherein the quantity of funds transferred to the first user is provided by a third party to the designated party, the method further comprising:
 receiving authorization from the third party to transfer the quantity of funds to the first user upon delivering the banknotes to the designated party, and wherein the designated party is an individual selected by the third party;
 verifying availability of the quantity of funds through at least one selected from a group consisting of confirming the presence of the quantity of funds in an account associated with the third party, placing a hold on the quantity of funds in the account associated with the third party, and moving the quantity of funds into an external account; and
 upon the designated party receiving the banknotes and determining their authenticity, transferring the quantity of funds to an account associated with the first user.

14. The method of claim 11, further comprising:
 transmitting an identity of the designated party to a mobile device associated with the first user while withholding an identity of the first user from the mobile device associated with the designated party;
 prompting the first user to visually confirm the identity of the designated party before approaching to initiate a tender; and
 disclosing, after the first user chooses to proceed with tendering the banknotes to the designated party for inspection, the identity of the first user to the designated party, wherein the disclosure is accomplished by at least one selected from a group consisting of (i) revealing, to the designated party by the first user, a credential transmitted to the mobile device associated with the first user and (ii) revealing, after receiving an authorization message from the mobile device associated with the first user, the identity of the first user on the mobile device associated with the designated party.

15. A system for bootstrapping a decentralized cryptographic ledger representing a forked version of an original fiat currency based on a user's stake in the original fiat currency, the system comprising:
 a computer processor configured to:
  designate a staking period representing a window of time;
  receive, from a remote computing device, data indicating that a portion of the original fiat currency was associated with a first user at one or more elapsed times during the staking period;
  verify, based on a defined validation procedure, authenticity of at least some of the data received;
  determine, based on the authenticated data, an external stake in the original fiat currency attributed to the first user, wherein the external stake represents an amount of ownership in the original fiat currency;
  calculate a first stake of ownership for the first user in the forked version of the original fiat currency by applying a first conversion rate to the external stake;
  alter, after commencement of the staking period, a state of the cryptographic ledger to record a first set of digital tokens representing the first stake of ownership;
  designate a conclusion of the staking period associated with a snapshot of the cryptographic ledger;
  receive, after designating the conclusion of the staking period, a request to retroactively claim a second stake in the forked version of the original fiat currency for a second user; and
  process the request to retroactively claim a second stake in the forked version of the original fiat currency, wherein processing the request comprises;
   determining a second external stake in the original fiat currency attributed to the second user based on additional data indicating that a second portion of the original fiat currency was associated with the second user during the staking period;
   calculating a second stake of ownership for the second user in the forked version of the original fiat currency by applying a second conversion rate to the second external stake, wherein the first conversion rate is greater than the second conversion rate such that the first user is rewarded for early participation; and
   altering a second state of the cryptographic ledger to record a second set of digital tokens representing the second stake of ownership, wherein the first set of digital tokens and the second set of digital tokens are usable to participate in a consensus protocol for the cryptographic ledger that assigns voting power in proportion to stakes in the forked version of the original fiat currency.

16. The system of claim 15, the computer processor further configured to:
 calculate a size of the external stake in the original fiat currency during the staking period based on a plurality of stake values corresponding to segments within the window of time, wherein weights assigned to the segments are either equal or varied, and wherein calculating the size of the external stake is performed using at least one selected from a group consisting of smallest stake size, greatest stake size, mean stake size, median stake size, and most frequent stake size.

17. The system of claim 15, wherein the portion of the original fiat currency associated with the first user comprises at least one specific serialized banknote, wherein the validation procedure incorporates proof-of-cash authentication, the system further comprising:
a mobile device configured to:
execute one or more authentication events, wherein consequences of the authentication events are captured during the scanning of the banknote; and
a second computer processor configured to:
programmatically detect, in sensor data captured by the mobile device while scanning the banknote, presence of one or more anti-spoofing indicators and presence of one or more anti-counterfeiting indicators, wherein at least a single detected indicator relates to an authentication event of the one or more authentication events.

18. The system of claim 15, wherein the portion of the original fiat currency associated with the first user comprises one or more banknotes of a specified total value, wherein the remote computing device is a mobile device associated with a designated party responsible for inspecting the banknotes, and wherein the data comprises a message indicating that the designated party determined the banknotes are authentic.

19. The system of claim 18, wherein the designated party retains the banknotes after determining their authenticity, the computer processor further configured to:
alter a third state of the cryptographic ledger based on a change in ownership of the banknotes, wherein the change in ownership is accompanied by transferring a quantity of funds to an account or wallet associated with the first user, such that the first user receives compensation for providing authentic banknotes to the designated party.

20. The system of claim 19, further comprising:
a currency exchange hub, wherein the currency exchange hub is a cloud-based service executing on a computing device, the currency exchange hub configured to:
receive a second message identifying serial numbers of the banknotes in advance of tendering them to the designated party for inspection;
record an ownership of the specific serialized banknotes by the first user; and
after the designated party decides to retain the banknotes, record the change in the ownership of the banknotes.

21. The system of claim 19, further comprising:
a currency exchange hub, wherein the currency exchange hub is a cloud-based service executing on a computing device, the currency exchange hub configured to:
transmit an identity of the designated party to a mobile device associated with the first user while withholding an identity of the first user from the mobile device associated with the designated party;
request a prompt to be shown to the first user to visually confirm the identity of the designated party before approaching to initiate a tender; and
disclose, after the first user chooses to proceed with tendering the banknotes to the designated party for inspection, the identity of the first user to the designated party, wherein the disclosure is accomplished by at least one selected from a group consisting of (i) revealing, to the designated party by the first user, a credential transmitted to the mobile device associated with the first user and (ii) revealing, after receiving an authorization message from the mobile device associated with the first user, the identity of the first user on the mobile device associated with the designated party.

22. A non-transitory computer-readable storage medium comprising a plurality of instructions for bootstrapping a decentralized cryptographic ledger representing a forked version of an original fiat currency based on stake in the original fiat currency, the plurality of instructions configured to execute on at least one computer processor and enable the computer processor to:
designate a staking period representing a window of time;
receive, from a remote computing device, data indicating that a portion of the original fiat currency was associated with a first at one or more elapsed times during the staking period;
verify, based on a defined validation procedure, authenticity of at least some of the data received;
determine, based on the authenticated data, an external stake in the original fiat currency attributed to the first user, wherein the external stake represents an amount of ownership in the original fiat currency;
calculate a first stake of ownership for the first user in the forked version of the original fiat currency by applying a first conversion rate to the external stake;
alter, after commencement of the staking period, a state of the cryptographic ledger to record a first set of digital tokens representing the first stake of ownership;
designating a conclusion of the staking period associated with a snapshot of the cryptographic ledger;
receiving, after designating the conclusion of the staking period, a request to retroactively claim a second stake in the forked version of the original fiat currency for a second user;
processing the request to retroactively claim a second stake in the forked version of the original fiat currency, wherein processing the request comprises:
determining a second external stake in the original fiat currency attributed to the second user based on additional data indicating that a second portion of the original fiat currency was associated with the second user during the staking period;
calculating a second stake of ownership for the second user in the forked version of the original fiat currency by applying a second conversion rate to the second external stake, wherein the first conversion rate is greater than the second conversion rate such that the first user is rewarded for early participation; and
altering a second state of the cryptographic ledger to record a second set of digital tokens representing the second stake of ownership, wherein the first set of digital tokens and the second set of digital tokens are usable to participate in a consensus protocol for the cryptographic ledger that assigns voting power in proportion to stakes in the forked version of the original fiat currency.

23. The non-transitory computer-readable storage medium of claim 22, the plurality of instructions further configured to enable the computer processor to:
calculate a size of the external stake in the original fiat currency based on a plurality of stake values corresponding to segments within the window of time, wherein calculating the size of the external stake is performed using at least one selected from a group consisting of smallest stake size, greatest stake size, mean stake size, median stake size, and most frequent stake size.

24. The non-transitory computer-readable storage medium of claim 22, wherein the portion of the original fiat currency associated with the first user comprises at least one specific serialized banknote, wherein the validation procedure incorporates proof-of-cash authentication, the plurality of instructions further configured to enable the computer processor to:
  send a request to a mobile device to execute one or more authentication events, wherein consequences of the authentication events are captured during scanning of the banknote;
  receive sensor data captured by the mobile device while scanning the banknote; and
  programmatically detect, in the sensor data, presence of one or more anti-spoofing indicators and presence of one or more anti-counterfeiting indicators, wherein at least a single detected indicator relates to an authentication event of the one or more authentication events.

* * * * *